(12) United States Patent
Eriksson

(10) Patent No.: US 12,348,176 B2
(45) Date of Patent: Jul. 1, 2025

(54) SYSTEMS AND METHODS FOR SOLAR PANEL MOUNTING

(71) Applicant: Aaron Eriksson, Santa Fe, TN (US)

(72) Inventor: Aaron Eriksson, Santa Fe, TN (US)

(\*) Notice: Subject to any disclaimer, the term of this patent is extended or adjusted under 35 U.S.C. 154(b) by 218 days.

(21) Appl. No.: 17/879,725

(22) Filed: Aug. 2, 2022

(65) Prior Publication Data

US 2022/0393635 A1    Dec. 8, 2022

Related U.S. Application Data

(63) Continuation-in-part of application No. 17/077,786, filed on Oct. 22, 2020, now Pat. No. 11,451,187, which is a continuation-in-part of application No. 16/331,124, filed as application No. PCT/US2019/014628 on Jan. 22, 2019, now Pat. No. 11,139,773.

(60) Provisional application No. 62/619,273, filed on Jan. 19, 2018.

(51) Int. Cl.
*H02S 20/23* (2014.01)
*H02S 30/10* (2014.01)
*F24S 25/00* (2018.01)

(52) U.S. Cl.
CPC .............. *H02S 20/23* (2014.12); *H02S 30/10* (2014.12); *F24S 2025/804* (2018.05)

(58) Field of Classification Search
CPC .......... H02S 20/23; H02S 30/00; H02S 30/10; F24S 2025/021; F24S 2025/022; F24S 2025/804; F24S 20/67; F24S 25/615
See application file for complete search history.

(56) References Cited

U.S. PATENT DOCUMENTS

| 3,320,706 A * | 5/1967 | Elliott ...................... E04D 3/38 |
| | | 52/471 |
| 4,212,291 A | 7/1980 | Erb |
| 4,223,667 A * | 9/1980 | Paymal .................. F24S 20/67 |
| | | 126/621 |

(Continued)

FOREIGN PATENT DOCUMENTS

| CA | 2727131 A1 * | 7/2011 | .............. F24S 25/33 |
| CN | 111371385 A * | 7/2020 | ......... E04D 13/0445 |

(Continued)

OTHER PUBLICATIONS

Eriksson; U.S. Appl. No. 16/331,124, filed Mar. 6, 2019.

(Continued)

*Primary Examiner* — Jessie T Fonseca
(74) *Attorney, Agent, or Firm* — Fitch, Even, Tabin & Flannery LLP

(57) ABSTRACT

Systems and methods for mounting solar panels include a curb assembly coupled to a top surface of a roof. An end of a solar panel rests on a portion of the assembly. An astragal is located with a portion of the astragal extending over the edge of the solar panel. A fastener is engaged through the astragal and the curb assembly such that a portion of the astragal contacts and compressively engages the top surface of the supported solar panel edge, whereby the solar panel is mounted to the roof. Moreover, systems and methods cleaning solar panels of a solar panel system installed on an exterior surface are also described.

20 Claims, 48 Drawing Sheets

(56) References Cited

U.S. PATENT DOCUMENTS

| | | | |
|---|---|---|---|
| 4,282,860 A * | 8/1981 | Koizumi | F24S 10/503 |
| | | | 126/630 |
| 6,065,256 A | 5/2000 | Joko | |
| 6,105,570 A * | 8/2000 | Chang | F24S 10/755 |
| | | | 126/657 |
| 6,182,403 B1 | 2/2001 | Mimura | |
| 9,431,953 B2 | 8/2016 | Stearns | |
| 9,745,754 B1 | 8/2017 | Narita | |
| 9,876,463 B2 | 1/2018 | Jasmin | |
| 11,139,773 B2 | 10/2021 | Eriksson | |
| 11,451,187 B2 | 9/2022 | Eriksson | |
| 2002/0129849 A1 | 9/2002 | Heckeroth | |
| 2011/0036028 A1 | 2/2011 | Beck | |
| 2011/0138710 A1 | 6/2011 | Reisdorf | |
| 2015/0288320 A1 | 10/2015 | Stearns | |
| 2016/0111835 A1 | 4/2016 | Nayar | |
| 2016/0111996 A1 | 4/2016 | Stephan | |
| 2016/0111997 A1 | 4/2016 | Ganshaw | |
| 2016/0226434 A1 * | 8/2016 | Tomlinson | F24S 25/00 |
| 2016/0268958 A1 | 9/2016 | Wildes | |
| 2017/0033730 A1 | 2/2017 | Almy | |
| 2018/0031279 A1 | 2/2018 | Haddock | |
| 2018/0375461 A1 | 12/2018 | Stearns | |
| 2019/0013772 A1 | 1/2019 | Bamat | |
| 2019/0273461 A1 * | 9/2019 | Karkheck | F24S 25/634 |
| 2020/0389121 A1 | 12/2020 | Stephan | |
| 2021/0041144 A1 | 2/2021 | Eriksson | |
| 2021/0075363 A1 | 3/2021 | Eriksson | |
| 2021/0408961 A1 | 12/2021 | Eriksson | |

FOREIGN PATENT DOCUMENTS

| | | | | |
|---|---|---|---|---|
| EP | 2103755 A2 * | 9/2009 | | E04D 3/30 |
| EP | 2725309 | 4/2014 | | |
| JP | H06318729 A * | 11/1994 | | |
| JP | 08284350 | 10/1996 | | |
| KR | 101582886 B1 * | 1/2016 | | |
| WO | WO-2011007201 A1 * | 1/2011 | | E04D 3/363 |
| WO | WO-2013133900 A2 * | 9/2013 | | F24S 25/615 |
| WO | 2019144154 | 7/2019 | | |

OTHER PUBLICATIONS

Eriksson; U.S. Appl. No. 17/077,786, filed Oct. 22, 2020.
Eriksson; U.S. Appl. No. 17/473,104, filed Sep. 13, 2021.
PCT; International Search Report for PCT/US2019/014628 mailed Apr. 25, 2019.
USPTO; Non-Final Office Action issued in U.S. Appl. No. 17/077,786 mailed Dec. 22, 2021.
USPTO; Non-Final Office Action issued in U.S. Appl. No. 16/331,124 mailed Feb. 2, 2021.
USPTO; Notice of Allowance issued in U.S. Appl. No. 16/331,124 mailed Jun. 8, 2021.
USPTO; Notice of Allowance issued in U.S. Appl. No. 17/077,786 mailed May 27, 2022.
USPTO; Non-Final Office Action issued in U.S. Appl. No. 17/473,104 mailed Oct. 23, 2023.
USPTO; Final Office Action issued in U.S. Appl. No. 17/473,104 mailed May 20, 2024.
USPTO; Non-Final Office Action issued in U.S. Appl. No. 17/473,104 mailed Sep. 30, 2024.

* cited by examiner

Integrated Grounding System

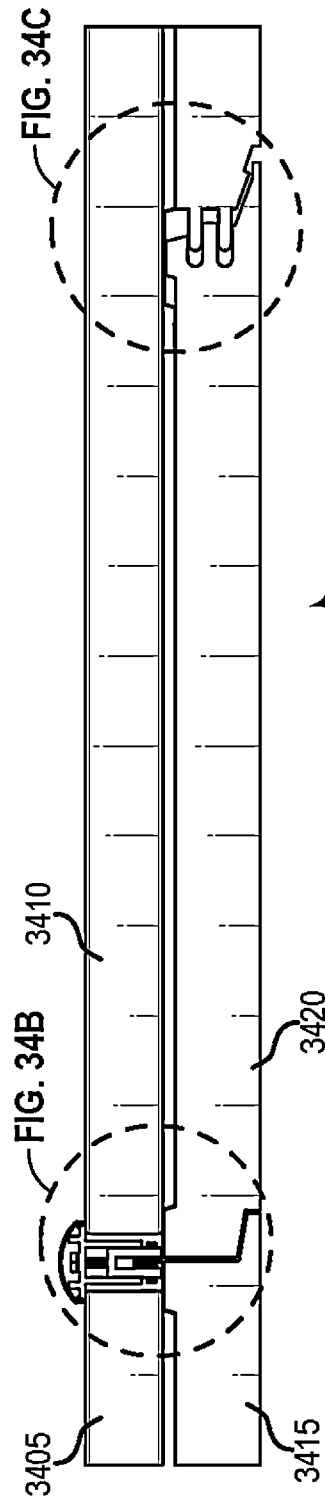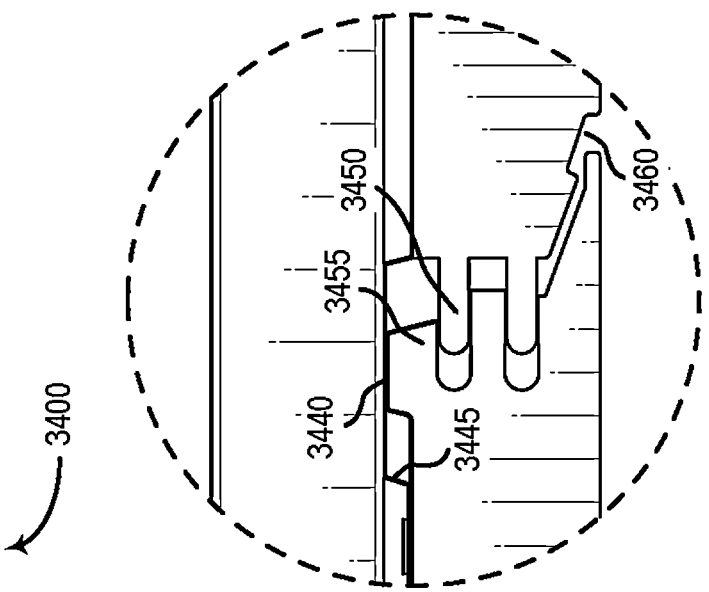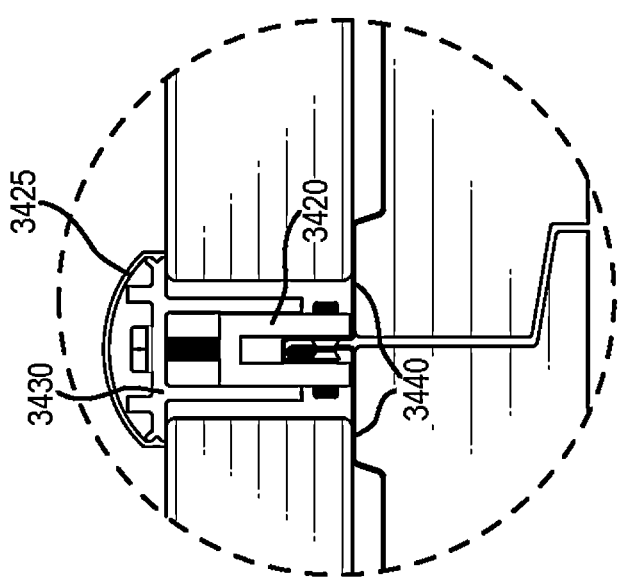

SYSTEMS AND METHODS FOR SOLAR PANEL MOUNTING

This application is a continuation-in-part of U.S. application Ser. No. 17/077,786, filed Oct. 22, 2020, for SYSTEMS AND METHODS FOR SOLAR PANEL MOUNTING, which is a continuation-in-part of U.S. application Ser. No. 16/331,124, filed Mar. 6, 2019, for METAL BUILDING ROOF MOUNT FOR SOLAR ARRAY, now U.S. Pat. No. 11,139,773, which is a national stage application, filed under 35 U.S.C. 371, of International Application No. PCT/US2019/014628, filed Jan. 22, 2019, for METAL BUILDING ROOF MOUNT FOR SOLAR ARRAY, which in turn claims the benefit of U.S. Provisional Application No. 62/619,273, filed Jan. 19, 2018, all of which are incorporated in their entirety herein by reference.

BACKGROUND OF THE INVENTION

1. Field of the Invention

The present invention relates generally to solar panels, solar heating, and other solar based systems for rooftop positioning on buildings. More particularly, it relates to a system for mounting solar panel arrays of photovoltaic or heating in solar heating arrays or the like on building rooftops which have a roof formed of engaged metal rooftop panels or homes having a wood roof or similar planar rooftop installations. The system provides cooperatively engageable metal roof panels for forming a rack system with a sealed roof of the building, which so engaged, concurrently provides a plurality of vertically projecting sections of adjacent panels. These projecting sections formed as part of each adjacent roof panel form above support members for supporting a solar panel for photovoltaic or water heating or another frame-engaged array, elevated above the formed roof and form a passage therebetween. An engageable astragal is positionable (e.g., configurable) to secure the solar panels and seal the passage between projecting sections of adjacent roof panels.

2. Discussion of the Related Art

In recent years, it has become more popular in the United States and many foreign countries for building owners to install solar panels and solar heating and other solar-based devices on the rooftops of such building. Such installations of solar panel arrays generate electricity which can power the building itself or be communicated to the local grid. Many state and national governments offer tax incentives to building owners who make the financial commitment to install solar panels on such buildings.

Conventional metal roof systems, however, perform acceptable weatherproofing functions but such metal roof panels are currently configured for engagement to each other and underlaying support surfaces. However, they are not configured to incorporate solar panel attachment as part of the formed roof panels and roof structure.

Solar panel and solar heating attachment to roofs, via conventional racking, is not a designed or intended use of any other roofing system. While racked solar panel engagement to roofs is allowable, the piercing of the metal roof panels to mount the various components for holding solar panels in an array on the metal rooftop, is not desirable because the more screws and fasteners which pierce the seal of a roof panel, the more likely it is to leak over time. Further, solar system engagement mounting components and fasteners and the like are designed and sold separately from the roof panels, and the panels themselves have no structural accommodation to hold the solar panels or their mounting system.

As a consequence, solar racking systems continue to employ a conventional rail mounting system for the solar panel array, in both tilt leg and flush mount configurations. They do not, however, integrate the solar panels with the metal roof system itself and, thus, do not provide both roofing panels adapted for engagement to each other which also configure on the roof for a seamless engagement with the solar panel array.

Such a lack of integration between metal roofing panels and the solar array engaged with them has caused conventional solar panels to be mounted a distance above the underlying metal roof panels. Such causes problems such as an uplifting force from wind communicating between the solar panels and the metal roof panels which can cause significant damage. Further, conventional systems having a gap up to five inches or more between the solar panels, and roof panels allow birds and small animals to climb into the gap where they nest. This animal occupancy can wreak havoc with the mechanics of tilting solar panels along with leaves and debris which can enter the gap.

Using the solar racking system as a functional roof also allows for future expansion of the solar panel collection area or additional insulation across the entire roof. It reduces barriers to entry by lowering initial cost and allowing the owner to add and remove panels as needed to accommodate changing usage requirements, take advantage of new technology, requirements, or market conditions as needed.

The forgoing examples of related art as to solar panel and solar heating systems and their engagement to metal rooftops, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY

The device herein disclosed and described provides a solution to the shortcomings in prior art with regard to engaging solar panels, solar heating components, and other solar arrays to the rooftops of buildings having metal roofs. While, for convenience, the language herein is directed primarily to photovoltaic solar panels, the mounting system herein is also configurable to hold solar heating panels, and other solar-energized components on a rooftop of a metal building. As such, when the term solar panel is employed herein, any boxed or paneled component which is rooftop-mounted on a metal building is to be considered included.

The integrated metal roof and solar mounting system herein, is configured to allow conventional solar photovoltaic arrays to be installed with a metal roofing system using the same construction means and methods that are conventionally already widely used in the roofing industry. Thus, no exceptional training or tools are required for the installation of the metal roof panels herein, to the underlying structure.

One core element to the system herein is the provision of metal roofing sections, which are adapted for attachment to the underlying support surface for the roof in a conventional screw type engagement. However, rather than conventional planar opposing side edges for each metal roof panel, the opposing side edges of the metal roof panels of the system herein include the addition of vertically projecting portions running along opposing side edges. Each such metal roof panel is a unitary planar structure which on opposing sides has a bend which forms projecting side portions. One side portion extends substantially normal to the planar portion in between. The opposing side portion is adapted to slidably engage with that of an adjacent metal roof panel to allow for adjustment. By planar is meant substantially flat, although, corrugations or channels are formed in a conventional fashion which run parallel to the opposing sides of the metal roof panel and, thus, substantially parallel to the projecting portions on both sides.

Also provided is an astragal which is employable to compress and secure a solar panel to the roof formed by the metal panels. This astragal additionally forms a seal over adjacent roof panels in another particularly preferred component of the device and method herein. The formation of the metal roof panels with opposing projecting and slidably engaged side edges, and the inclusion of the astragal herein which is configured to hold the solar panels and concurrently seal the two adjacent roof panels and their respective projecting edges, effectively merges two historically different scopes of work into one, and roofing and solar panels become a solar roof system.

The roofing system herein increases the performance of the solar collection of the array, and with the system herein, the solar materials provide additional insulation factors that improve the heat loss/gain profile of the roof. This is accomplished with the system herein by its configuration which traps a layer of air between the solar panels and metal roof panels which also provide shade to the roof surface formed of the engaged metal panels herein.

Still further the system herein provides channels and gaps which protect the electrical conductors of the solar panels in the formed array. Additionally, for aesthetic reasons the system herein allows for insulation blanks to be positioned where needed to improve the seamless aesthetic of the installation of the solar array of panels along valleys and gables. Still further, by combining the solar panels and roof and underlying structure into a single function, the value of the tax credit to the building owner can increase substantially.

A system for solar panel installation is described. One or more aspects of the system include a left panel configured for coupling onto a substantially planar surface and including a left panel first end, a left panel second end opposite to the left panel first end, and a left panel middle portion connecting the left panel first end and the left panel second end. One or more aspects of the system further include a right panel configured for coupling onto the substantially planar surface and including a right panel first end, a right panel second end, and a right panel middle portion connecting the right panel first end and the second panel second end. In some aspects, the left panel first end and the right panel first end are configured to couple together to form a continuous panel joint projecting outward from the substantially planar surface, wherein the panel joint includes a left engagement contour on a left side of the continuous panel joint and a right engagement contour on a right side of the continuous panel joint. In some aspects, the left engagement contour is configured to interlock with a contoured end of a frame of a left solar module spanning over at least a portion of the left panel and the right engagement contour is configured to interlock with a contoured end of a frame of a right solar module spanning over at least a portion of the right panel.

A method for solar panel installation is described. One or more aspects of the method include coupling a left panel to a substantially planar surface, the left panel including a left panel first end, a left panel second end opposite to the left panel first end, and a left panel middle portion connecting the left panel first end and the left panel second end; and coupling a right panel to the substantially planar surface, the right panel including a right panel first end, a right panel second end, and a right panel middle portion connecting the right panel first end and the second panel second end. One or more aspects of the method further include coupling the left panel first end to the right panel first end to form a continuous panel joint projecting outward from the substantially planar surface, wherein the panel joint includes a left engagement contour on a left side of the continuous panel joint and a right engagement contour on a right side of the continuous panel joint. One or more aspects of the method further include interlocking a contoured edge of a frame of a left solar panel with the left engagement contour such that the contoured edge is coupled to the left engagement contour and the left solar panel is spanning over at least a portion of the left panel; and interlocking a contoured edge of a frame of a right solar panel with the right engagement contour such that the contoured edge is coupled to the right engagement contour and the right solar panel is spanning over at least a portion of the right panel.

A method for cleaning solar panels of a solar panel system installed on an exterior surface is described. One or more aspects of the method include attaching a solar panel cleaning system to the solar panel system, wherein the solar panel cleaning system comprises a cleaning apparatus, wherein the solar panel system includes a plurality of parallel weather-cap rails, wherein the parallel rails alternate with rows of solar panels, wherein the attaching is a movable attachment whereby the solar panel cleaning system is configured for movement along the direction of the rails; moving of the solar panel cleaning system along the direction of the rails, whereby the cleaning apparatus is moved over the solar panels in one row; and activating the cleaning apparatus, whereby the solar panels in the one row are cleaned.

With respect to the above description, before explaining at least one preferred embodiment of the herein disclosed metal roofing system with integrated solar panel engagement and the method therefor, it is to be understood that the disclosed system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other roof and solar panel structures, methods and systems for carrying out the several purposes of the present invention. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The above and other aspects, features and advantages of several embodiments of the present invention will be more apparent from the following more particular description thereof, presented in conjunction with the following drawings.

The accompanying drawings, which are incorporated herein and form a part of the specification, illustrate some, but not the only or exclusive, examples of embodiments and/or features of the invention. It is intended that the embodiments and figures disclosed herein are to be considered illustrative rather than limiting. In the drawings:

FIGS. 34A-34C show an example of a solar panel support system using standing seam structural insulated panels according to aspects of the present disclosure.

Figure 1:
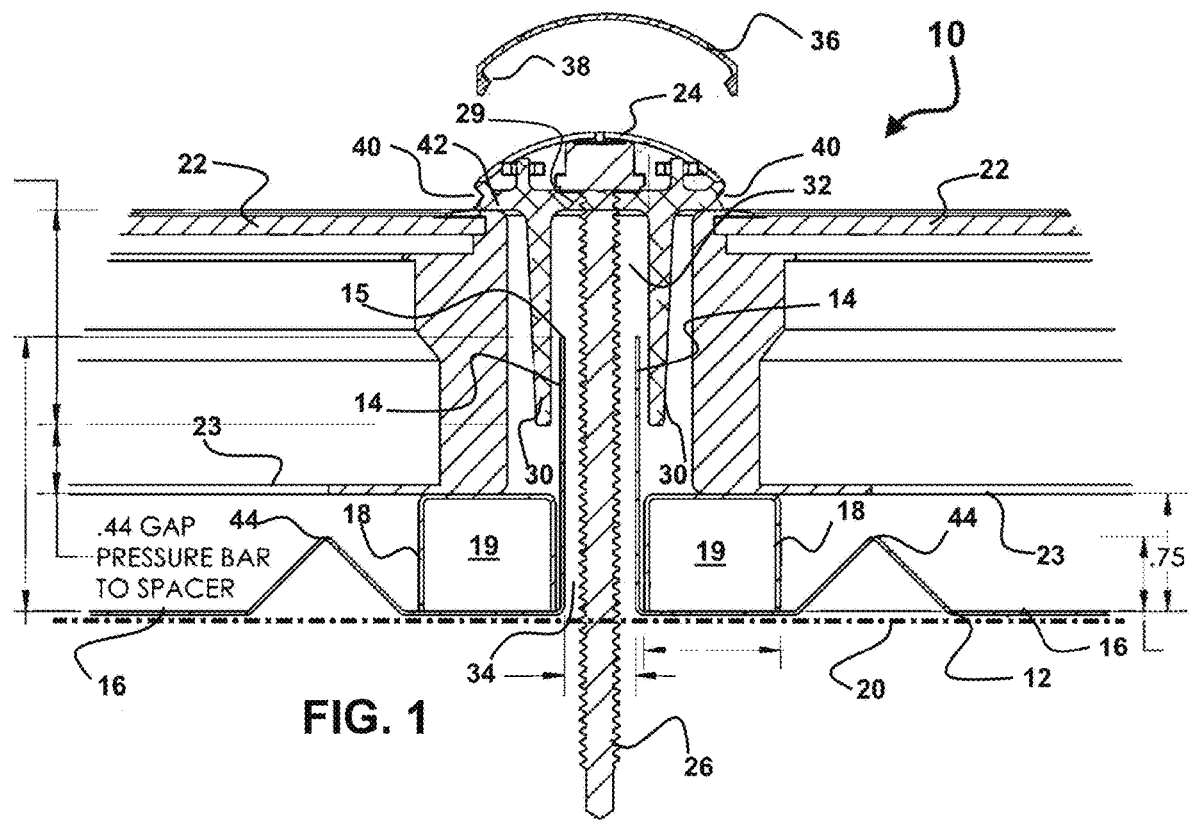
FIG. 1 shows a sectional view of the system herein showing the metal roof panels formed with side edges which project substantially normal to the metal panel therebetween, and showing the astragal and engageable cap which hold the solar panels and form a seal between adjacent metal roof panels.

Other aspects of the present invention will be more readily understood when considered in conjunction with the accompanying drawings, and the following detailed description, neither of which should be considered limiting.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Conventional solar panel designs (e.g., other solar panel designs not implementing one or more aspects of the present disclosure) may be insufficient. For instance, conventional solar panel designs may leave wiring exposed, may not shed water, may be difficult to clean, may be visually unappealing, may readily house animals such as pigeons and other pests that may nest in exposed structural elements, etc. In some cases, from underneath certain conventional solar panel designs, wiring and attachments may be visible and unsightly, in addition to the sky being visible through the gaps between solar panel modules. As such, when it rains, dirt and debris may accumulate (e.g., and water, dirt, and other remnants may drip onto whatever is below the solar panel design through the gaps between solar panel modules).

Various aspects of the structural beam support systems disclosed herein may advantageously reduce overall steel tonnage, increase speed of installation (e.g., by shifting significant fabrication effort into a factory setting to reduce field fabrication), and neatly encapsulate all the internal workings of the photovoltaic generation system (e.g., while efficiently shedding water and increasing electricity production through convection and reflection, while provided limited/restricted access for birds and other pests, etc.). The configuration of the structural beam support systems disclosed herein further enable and introduce new design possibilities such as radiused, tapered, curved and even complex variably recurved shapes. Moreover, as described in more detail herein, described structural support systems and associated cleaning techniques may demand little manual attention, and may require little to no downtime for corresponding solar energy facilities.

In various aspects of the present disclosure, the terms 'solar panel,' 'solar module,' and 'solar panel module' may be used interchangeably (e.g., to refer to a single photovoltaic panel that is an assembly of connected solar cells). Further, term 'solar array' may be used to describe an aggregation of solar panels/modules (e.g., that together form a discrete electrical system).

In this description, the directional prepositions of up, upwardly, down, downwardly, front, back, top, upper, bottom, lower, left, right and other such terms refer to the nose engagement device as it is oriented and appears in the drawings and are used for convenience only; they are not intended to be limiting or to imply that the device has to be used or positioned in any particular orientation.

Now referring to drawings in FIGS. 1-11, wherein similar components are identified with like numerals, FIG. 1 shows a depiction of a sectional view of the engaged components of the device 10 herein, enabling the method herein of FIGS. 7-11 where a rack system is formed for positioning of solar panels thereon above a metal or wood or other roof structure.

Figure 9:
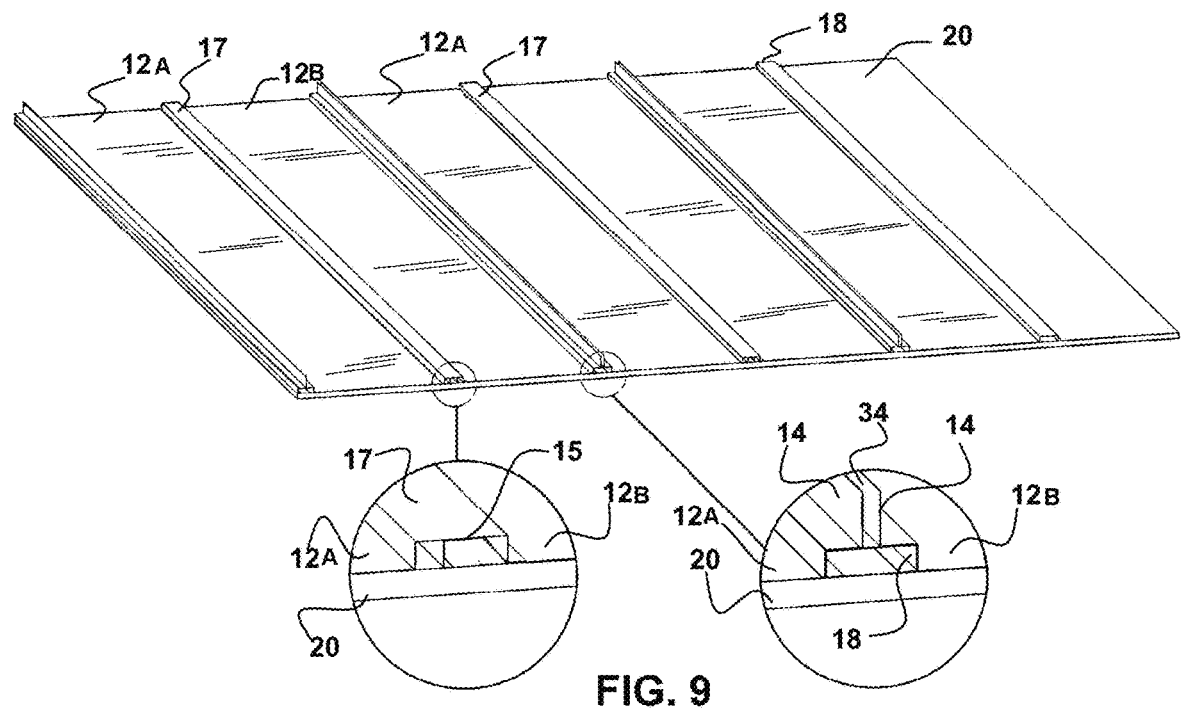

In FIG. 1 is shown the novel metal roof panels 12 each of which is formed with side edges having formed projecting portions 14. In some cases there may be only one projecting portion 14 along one edge of a roof portion of the roof panel 12, such as shown in FIG. 9 in the enlarged sections. In this mode, a first roof portion 12A engages a second roof portion 12B along a folded edge 15 located on the opposite side of each from the projecting portion 14 thereof. Thus, the roof panel 12 is formed by the first roof portion 12A engaged to the second roof portion 12B along the folded edge 15 of each to form the full roof panel 12.

In some installations the roof panels will be formed in a unitary structure with projecting portions 14 running along both side edges. In other roof panels 12 where more adjustment for positioning is desired, the folded edges 15 on the opposite sides of roof portions 12A and 12B from the projecting portion 14, allow for a sliding engagement to adjacent roof portions to form the roof panels 12 and to adjust the roof panels 12 slightly side to side during installation. This allows for a slight adjustment of the size of the formed openings 41 for the solar panels 22 between the projecting portions 14 on opposite sides of the formed roof panel 12. This sliding engagement of folded edges 15 of two roof portions 12A and 12B (FIG. 9) also forms a secondary supporting member 17 (FIGS. 9-11) for holding center portions of the solar panels 22 elevated which is particularly preferred.

The projecting portions 14, along one side edge of the roof panels 12, are formed by a bend in the metal material along the side edge. Each projecting portion 14 extends from the side edge on which it is positioned, at an angle substantially normal to the planar mid-section 16 of the metal roof panels 12. By substantially normal is meant plus or minus 10 degrees from perpendicular.

As shown in FIG. 1, each roof panel 12, whether formed of two engaged roof portions or a roof panel 12 in one section, sits atop an underlying support structure 20 shown in dotted line.

Screws 26 engaged to the underlying support structure impart force against the support members 18 to hold them and to hold the metal roof panels 12 sandwiched under them, in position. Such underlying support structures for example include a metal roof of an existing building or a wood or shingled roof. Also shown are the support members 18, which abut and overlay the projecting portions 14 of the adjacent roof panels 12, which are positioned thereon and can support the solar panel 22, thereon. The support members 18 may be formed in two sections as in FIG. 1, or in a single section shown in FIG. 1A or 1B which is preferred, since it positions a seal formed by the bent portions of the roof panel 12 over the top of the support member 18 leading to the projecting portion 14. This positions the roof panel 12 in the mode of FIGS. 1A and 1B, above any communication of the screw 26 through the underlying roof structure.

An astragal 24, shown in FIG. 1, is placed in operative compressive engagement with adjacent solar panels 22 which is particularly preferred in all modes of the system 10 herein. A screw 26 is engaged through a central portion 29 thereof during installation, to hold the astragal 24 to the underlying support surface 20. This screw 26 can be adjusted to impart a measured compression to the astragal 24, which in turn will contact and engage the edges of the solar panels 22 or frames surrounding them in a compressive sealed contact therewith. This compressive engagement will also impart force to the bottom side of the solar panel 22 against the support members 18 and will compressively engage projecting contact points 28 (FIG. 2) on opposing sides of the astragal 24 against the perimeter edge of the solar panel 22 to compressibly engage it and hold it in place.

Depicted in FIG. 1, also, are parallel ribs 30 having a gap 32 therebetween. This gap 32 is aligned with an opening 34 positioned between the two projecting portions 14 which are on one respective side of each of the two roof panels 12. With the screw 26 operatively engaged with the underlying surface 20, and the astragal 24 compressibly engaged against the adjacent solar panels 22, the gap 32 and opening 34 between projecting portions 14, align to provide the path for the screw 26 to be engaged with the underlying support surface 20.

Figure 1A:
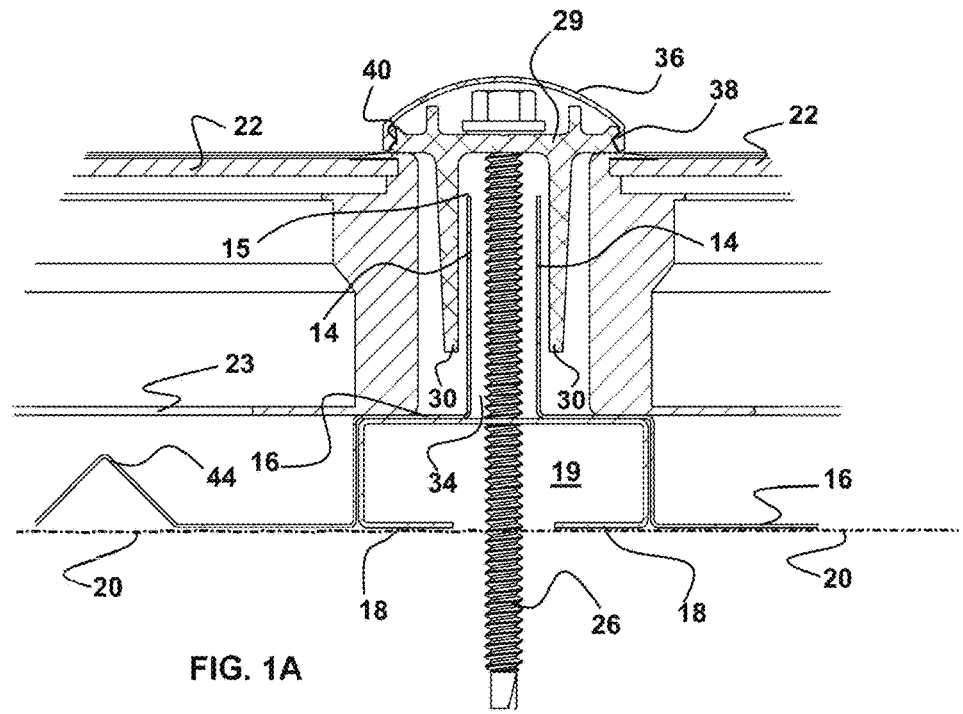
FIG. 1A is a sectional view of another mode of the system herein similar to that of FIG. 1, except that it employs a single support member which is positioned underneath the roofing panels rather than on top as in FIG. 1.

Additionally, the two ribs 30 are formed of a length projecting from the center portion 29, to extend past the distal ends 15 of the projecting portions 14 when the screw 26 is tightened to compress the astragal 24 against the solar panels as in FIGS. 1 and 1A. This forms a moisture seal to prevent fluid which might get past the compressive engagement and seal of the astragal 24 against the adjacent solar panels 22 and prevent such from getting into the opening 34 between adjacent roof panels 12.

Figure 1B:
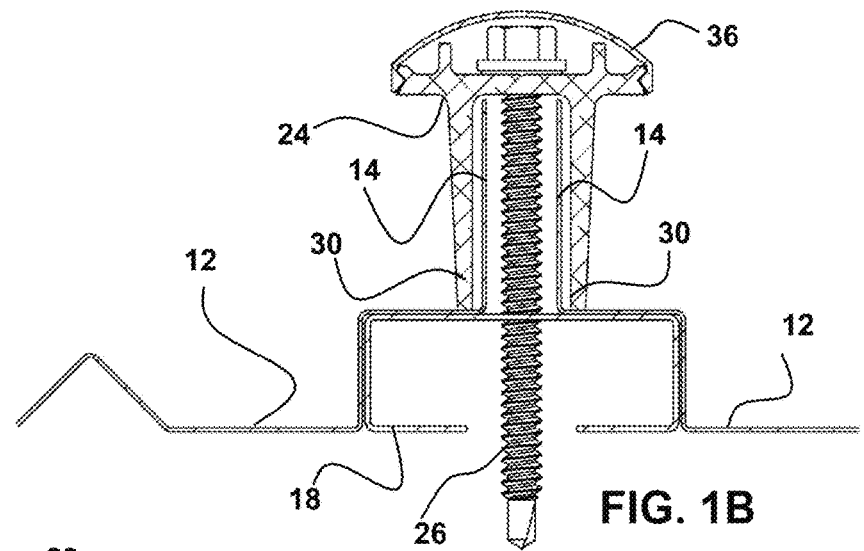
FIG. 1B shows the astragal engaged to an underlying support member and holding adjacent panels in a compressed sandwiched engagement, without a solar panel engaged which can be added at a subsequent time by loosening the screw and inserting solar panels under the opposing edges of the astragal.

Also shown in FIGS. 1, 1A, and 1B, is an engageable cap 36 which has side edges 38 which are configured to engage into recesses 40 in the opposing sides of the astragal 24. The cap 36 is formed of a flexible or elastic material which allows the side edges 38 to temporarily when the cap 36 is pushed against the surfaces of the astragal 24 above the recesses 40 and deflect and then compress into the recesses 40. Once the edges 38 engage into the recesses 40 they form a water tight seal over the top and sides of the astragal 24.

While not shown in detail in FIG. 1, the interior cavities 19 of the support members 18 or more preferable, the area within the opening 34 between the projecting portions 14, both define passages which may be employed for positioning of wiring for both the solar panels 22 and any controllers or the like. The opening 34 works especially well since prior to positioning of the astragal 24 thereover, the wires are easily tucked into the opening 34 and then covered with the astragal 24.

Shown in FIG. 1B, is a unique functional aspect of the system 10 herein, where the solar panels 22 have not yet been installed or have been removed. This is particularly preferred because there are instances where solar panel installation is delayed, or where they must be removed and replaced. Using the system 10 herein, the support members 18 can be installed onto the underlying support structure, and the roof panels 12 can be operatively positioned with the projecting portions 14 extending thereabove. The astragal 24 can then be engaged to form a seal with the ribs 30 contacting the support member 18 by tightening the screw 26. Once the solar panels become available, or are repaired and ready for replacement, the screw 26 may be loosened temporarily, and the solar panels 22 can be installed as in FIG. 1A. The utility provided by the system 10 as shown in FIG. 1A is particularly important because there are times when solar panels are damaged and must be removed and replaced, or when the panels arrive too late for a winter installation. The ability to form the mounting system 10 herein which forms the racks for easy installation, and or removal and reinstallation of subsequently installed solar panels 22 gives the contractor an advantage.

Figure 2:
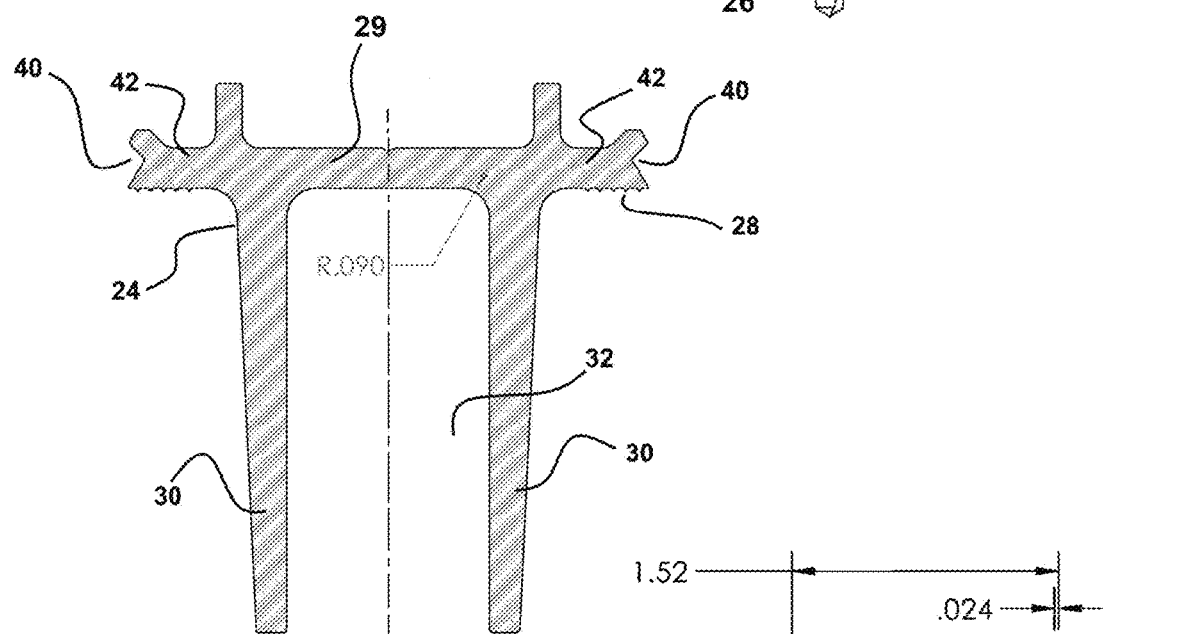
FIG. 2 shows a side view of the astragal herein employed as in FIG. 1.

Shown in FIG. 2 is an end view of the typical astragal 24 herein employed as in FIG. 1. The projecting contact points 28 can be seen on the lower edges of opposing projecting ledges 42 projecting in opposite directions on opposing sides of the body forming the astragal 24. These points 28 have been found to better engage with the surface of the solar panels 22 and form a secure contact and seal therewith. Also shown are the ribs 30 projecting from the center portion 29 a distance for surrounding the opening 34 between the two projecting portions 14. Also depicted are the two recesses 40 formed into the edges of the ledges 42 which engage to the side edges 38 formed on the flexible cap 36.

Figure 3:
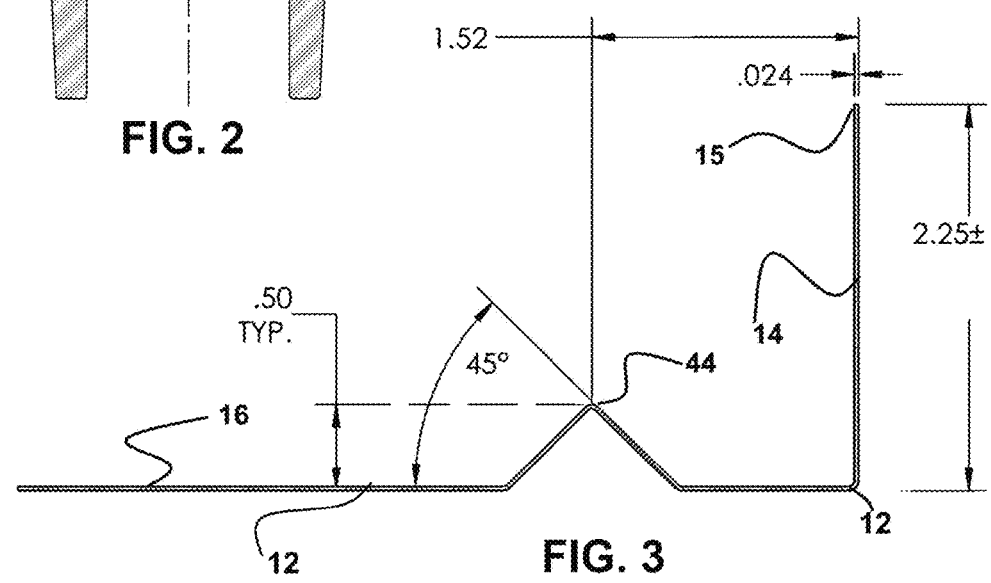
FIG. 3 shows the metal roofing panel herein provided having projecting portions formed along opposing side edges of the metal panel.

In FIG. 3 is shown one side edge of the metal roofing panel 12 per the device 10 and method herein. As depicted, the projecting portions 14 can extend from one or both side edges of the roof panel 12. As noted, the projecting portions 14 run substantially normal to the planar mid section 16 of the panel 12. As also noted, in a particularly preferred mode of the system 10 which uses two roof portions 12A and 12B (FIG. 9) engaged at folded edges 15 which forms the secondary support members 17, the opposite side edges of the formed roof panels 12 from the projecting portion 14 of each, can be configured with the folded edge 15 as in FIGS.

Figure 10:
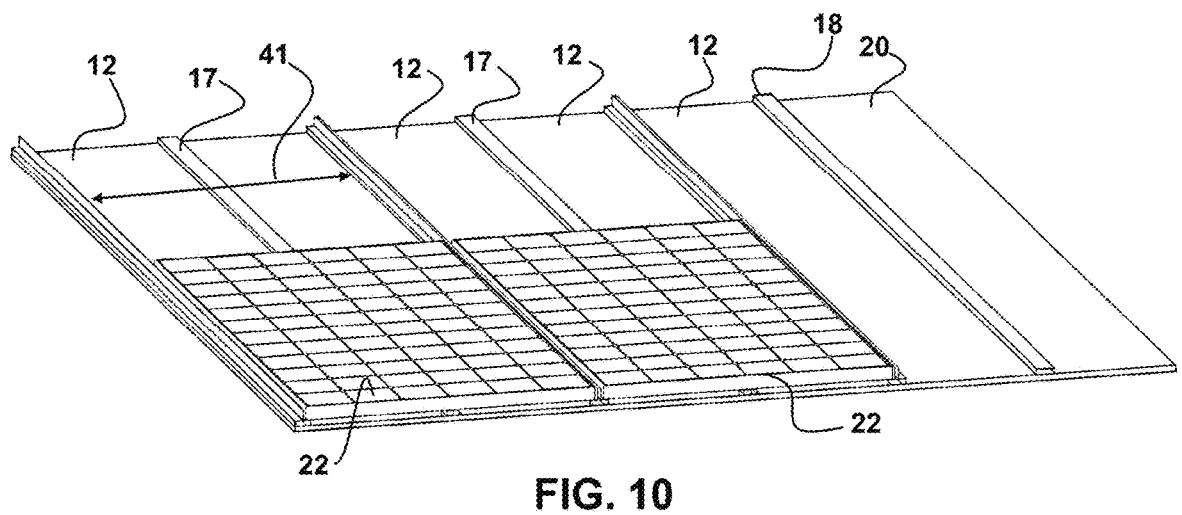
Figure 11:
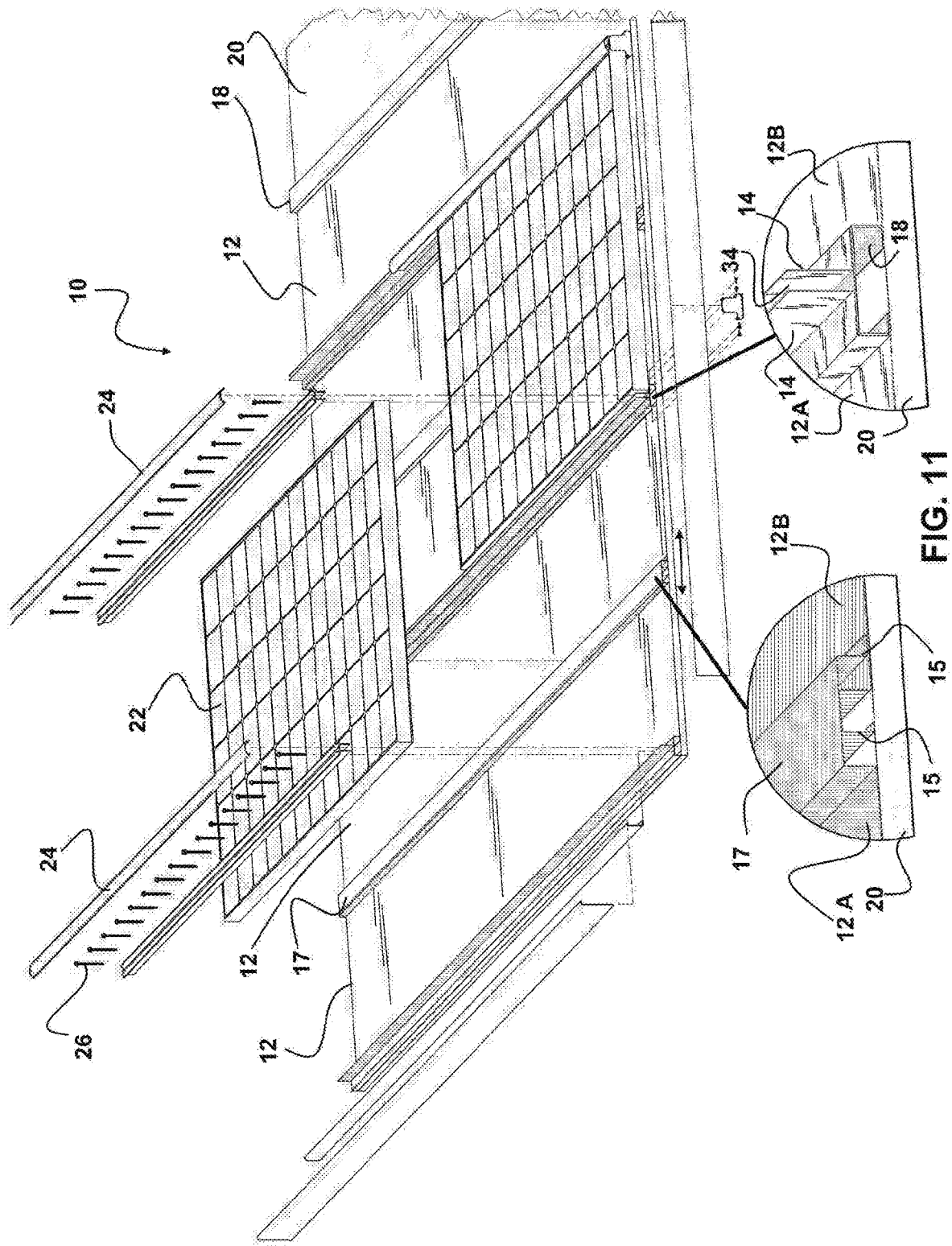

9 and 11. When engaged over each other, the folded edges 15 form the secondary support member 17 shown in FIGS. 9-11.

Where both side edges of the roof panels 12 have the projecting portion 14 and the roof panel is formed in a single sheet, support members 18 may be positioned on the underlying structure instead of forming the secondary support members 17. However, by forming the roof panels 12 in a first and second portion 12A and 12B as noted herein, each having folded edges 15 such that they will engaged and form the secondary support members 17, additional support is provided to the solar panels 22. This additional support is provided without the need or expense for extra support members 18 such as shown in FIGS. 9-11. Optionally the folded edges 15 can be formed to slide slightly upon each other, to allow for a side to side adjustment of the first and second portions 12A and 12B of roof panel 12, (FIG. 9) to provide additional function in that the size of the openings 41 (FIG. 10) can be adjusted if needed.

Figure 4:
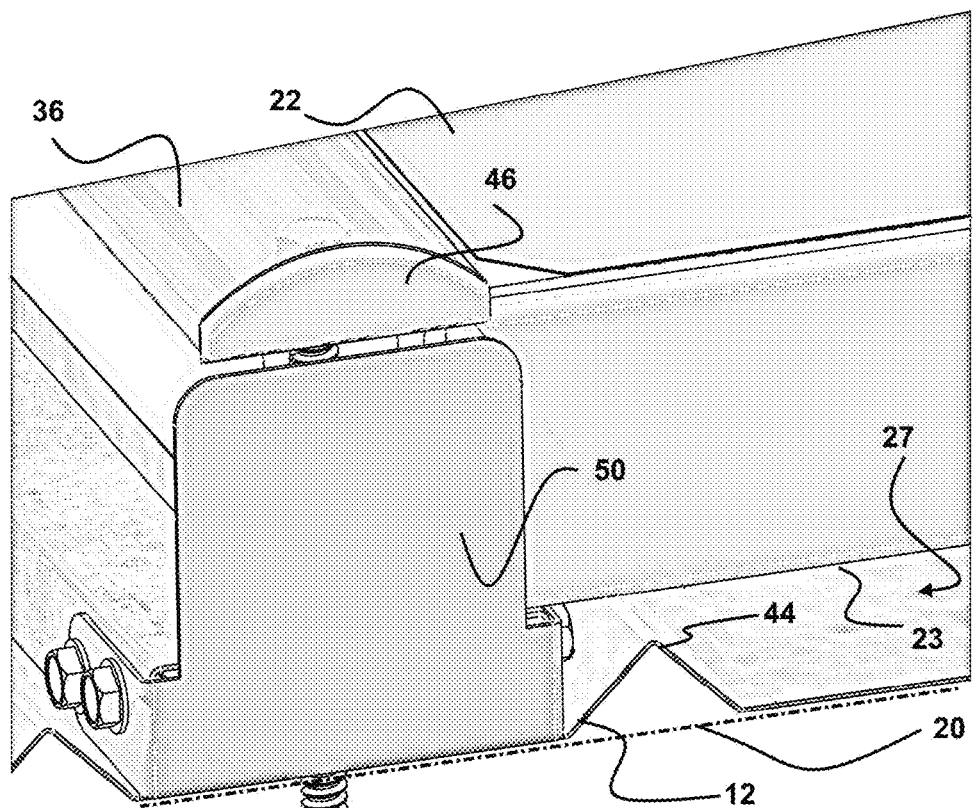
FIG. 4 shows the system herein in a perspective end view showing a cap engaged along the astragal which holds the solar panels atop the underlying support members and showing the very small gap between the back of the solar panel and planar portions of the roof.
Figure 5:
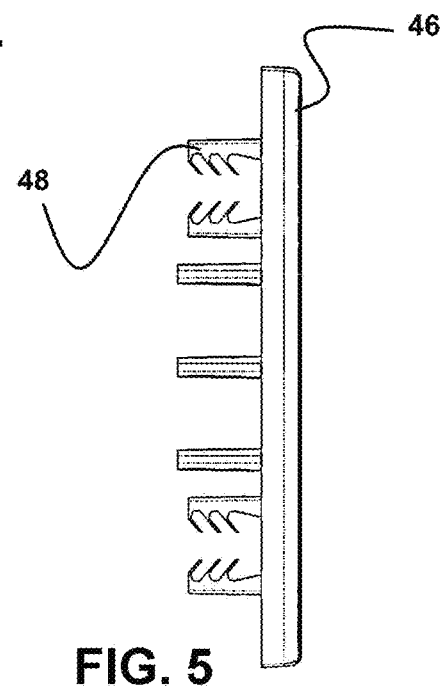
FIG. 5 shows an end view of an end cap engageable with the astragal as in FIG. 4.
Figure 6A:
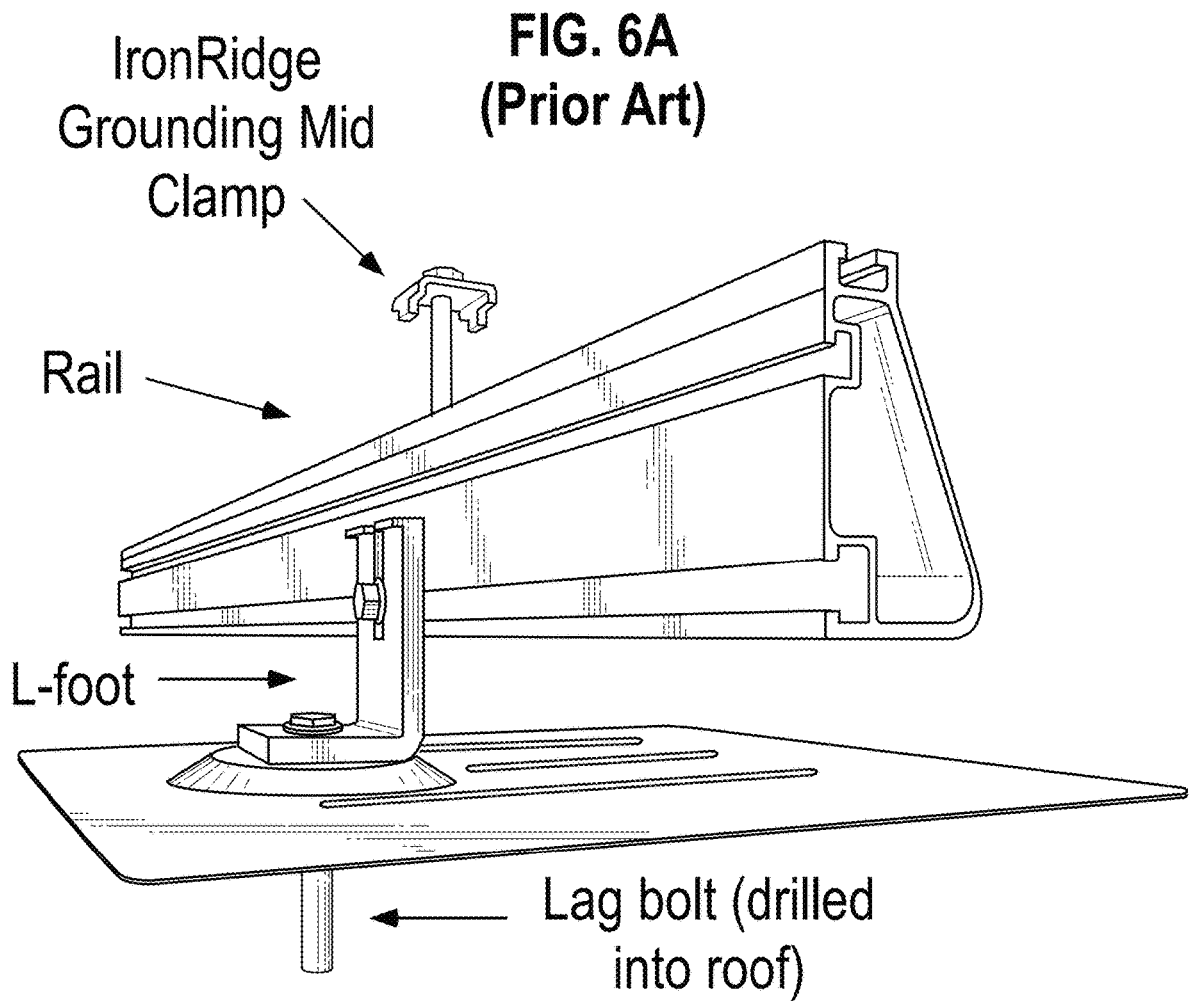
FIGS. 6A-6D depict a conventional solar panel installation wherein the metal roof panels are not integral to the installation and instead the solar panels are supported on a frame supported by posts with a large gap between the frame and roof surface.
Figure 6B:
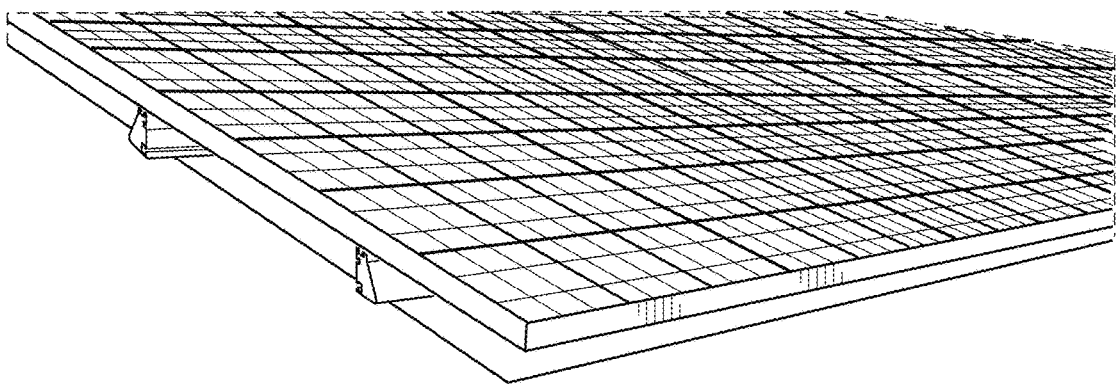
Figure 6C:
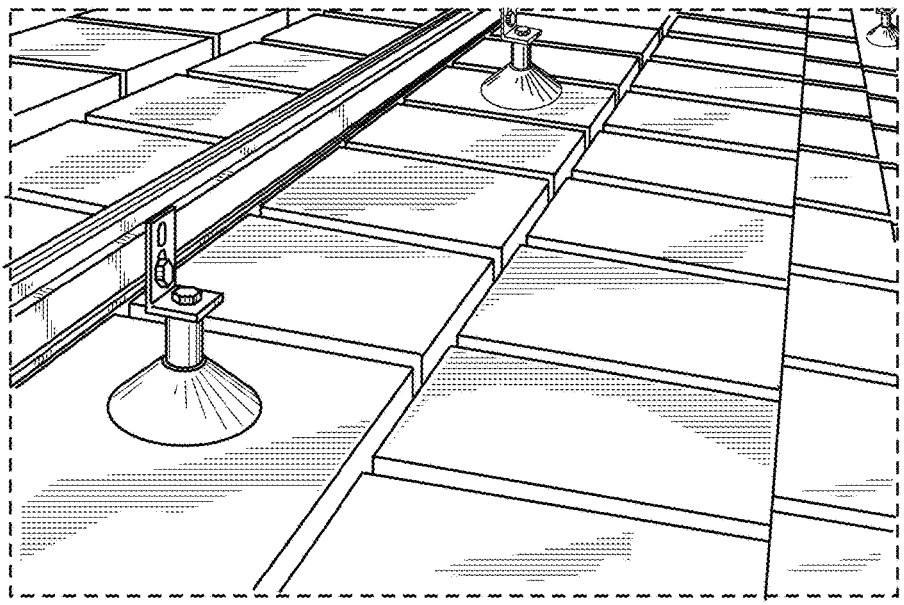
Figure 6D:
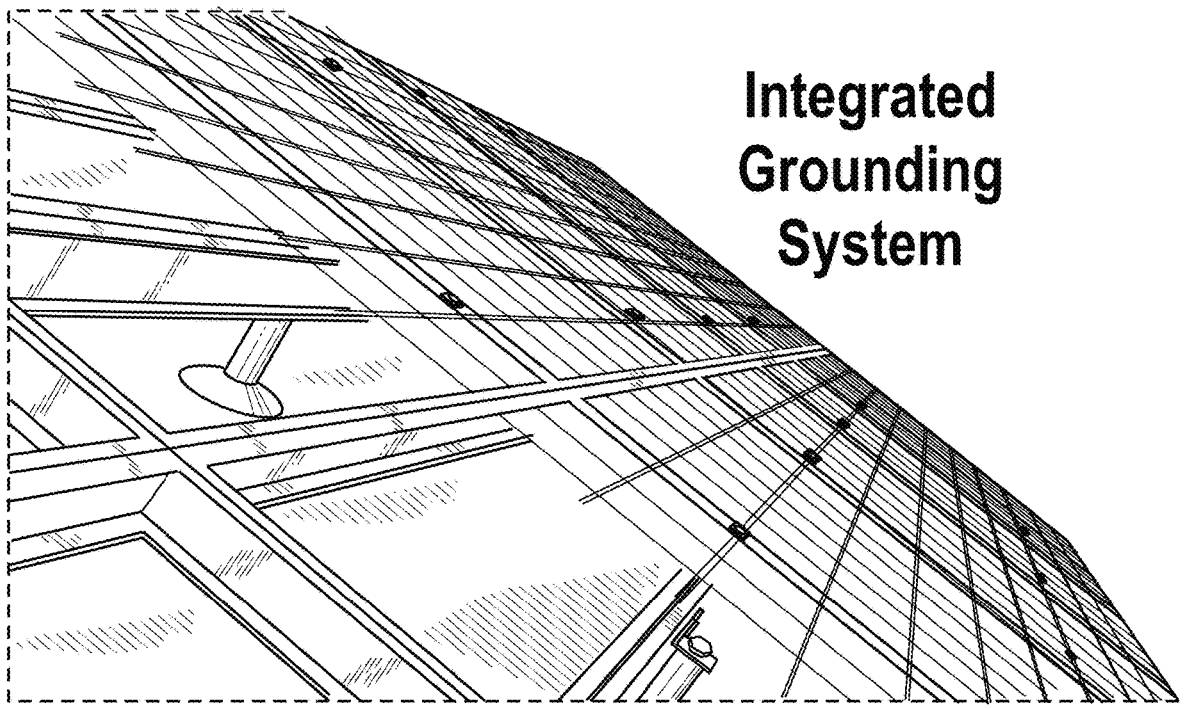

FIG. 4 depicts the device herein in a perspective end view of the device 10 in an assembled mode, showing the cap 36 engaged along the astragal 24. The astragal 24 is engaged by the screw 26 to the underlying support structure 20 and compressibly engages the ledges 42 against the solar panel 22 edge. An end cap 46 is shown engaged to the upper side edge of the astragal 24 using projecting prongs 48 (FIG. 5). An end cap 50 is also shown covering the open ends of the support members 18 and the gap 32 and covers the opening 34 shown in FIG. 1.

As can be seen in FIG. 1 and FIG. 4, using the system herein, a very small gap 27 is formed between the rear surface 23 of the solar panel 22 and the upper surface of the roof panel 12. Such is preferably between ½ to ¾ of an inch and can be smaller if the peak of the formed ridges 44 are less than inch above the surface of the mid section 16 of the roof panel 12. Such prevents lift from wind and the intrusion of animals and birds underneath the solar panels 22 and a secondary cover not shown can be provided to cover this gap 27. The gap 27 provides a passage for venting heat from the solar panels 22.

The end cap 46 can be formed to fit inside the cap 36 on top of the solar modules. This requires that the astragal 24 to shortened sightly shorter than the solar modules to provide space for the end cap 46. The end cap 46 in all modes is preferably formed of a compliant material (for example rubber or foam) and it could also serve as an expansion joint between sections of the astragal 24 to prevent thermal expansion stresses while concurrently eliminating any gaps.

FIG. 5 shows an end view of the end cap 46 engageable with the top portion of the astragal 24 as in FIG. 4. The prongs 48 are configured to removably engage in recesses 40 formed in the astragal 24 as can be seen in FIG. 1.

FIGS. 6A-6D are for reference and depict a typical prior art view of the mounting of conventional solar panel systems on rooftops, which those skilled in the art will be familiar with. As can be seen, the roof panels conventionally are separate from and form no part of the engagement system, which is mounted on purlins and rafters elevated above the roof. In conventional systems, many more holes are drilled through the support structure such as a roof and they are not covered by any sealing system such as herein.

FIGS. 7-11 show components of the system 10 herein being installed onto an existing roof of a metal or wood roof of a building to form a rack system adapted for the easy and secure positioning of solar panels thereon. As shown in FIGS. 7-11 the roof panels 12 can be formed of a first section 12A and second section 12B, which engage at respective folded edges 15 opposite respective projecting portions 14 thereon.

Figure 7:
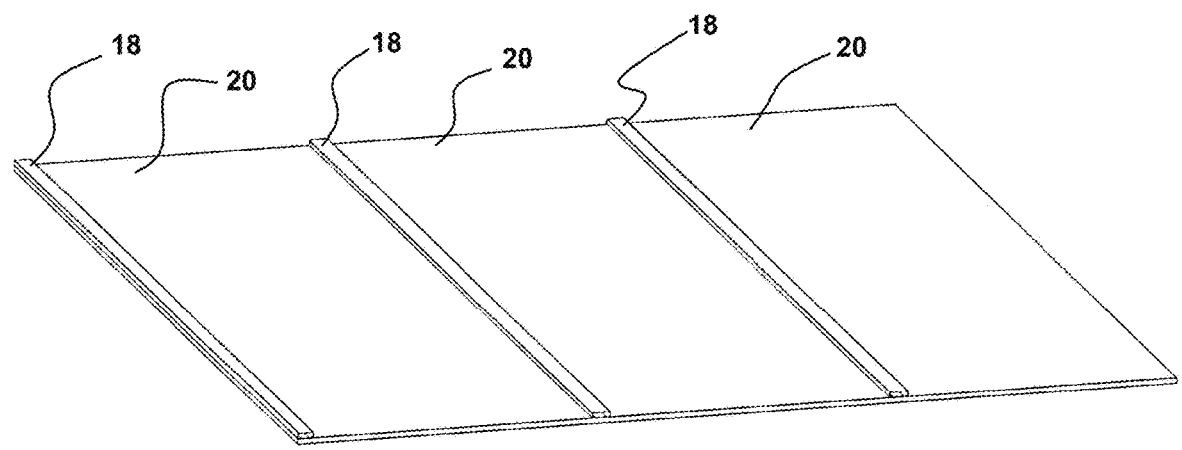
FIGS. 7-11 show components of the system herein being installed onto an existing roof of a metal or wood roof of a building to form a rack system adapted for the easy and secure positioning of solar panels thereon.

In the system 10 herein, in a first step, shown in FIG. 7, support members 18 are positioned on the support structure 20 such as an underlying roof surface of a building. Where the roof panels 12 have projecting portions 14 on both opposing side edges, extra support members 18 may be installed to provide center support to overlying solar panels 22 if needed.

Where the roof panels 12 are formed in sections 12A and 12B, with a first side edge having the projecting portion 14 and the opposing second side edge having a folded edge 15 configured to engage over and with a similar folding edge 15 of an adjacent roof panel 12, the engagement forms the secondary support member 17. This secondary support member provides support to the solar panels 22 and maintains the gap 32 between them and the underlying support structure 20.

This mode of the system 10 herein is preferable since it allows for smaller sections 12A and 12B to form the roof panels 12 which are easier to handle in wind and weather. It is additionally preferred since it forms an overlapping seal of the folded edges 15 as well as a strong secondary support member 17 to help support the solar panels 22 better.

Figure 8:
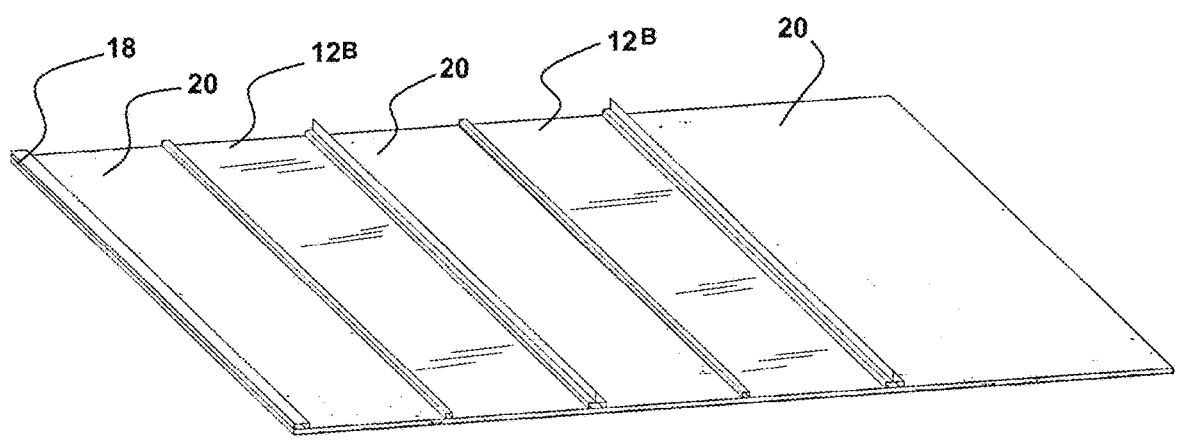

In FIG. 8 is shown the positioning of portions of the roof panels 12 to be formed in the manner shown in FIG. 9, upon the support members 18 shown installed in FIG. 7. Each roof panel portion 12B has a first side edge with the projecting portion 14 and an opposing second side edge with a folded edge 15 such as shown in FIGS. 9 and 11 where the folded edges 15 overlap.

This is followed by the positioning of the rest of the roof panel portions 12A shown in FIG. 9, wherein each of the support members 18 have a pair of parallel projecting portions 14 of adjacent roof panels 12 thereabove, and each of the folded edges 15 on the second side edges of the roof panels 12 are overlapped to form the secondary support members 17.

Thereafter as shown in FIG. 10, the solar panels 22 are placed within openings 41 formed between the support members 18 which have the two projecting portions 14 of roof panels 12 extending thereabove. Central areas of the openings 41 have the formed secondary support members 17 therein to support the underside of the solar panels 22. The width of the formed openings 41 between the projecting portions 14 on opposing sides of each formed roof panel 12 is adapted for positioning the solar panels 22 therein.

Whether the roof panels 12 are formed in a single unit with projecting portions 14 on both opposing sides as in FIG. 1, or as two roof panel portions having engaged folded edges 15 as in FIGS. 7-11, the width of the openings 41 is configured to position sides of the solar panels 22 over the support members 18 and adjacent the projecting portions so they are engaged by the contact points 28 of the ledges 42 extending from the center portion 29 of the astragal 24 when the screw 26 is tightened.

Finally, FIG. 11 shows the system 10 herein, formed from the roof panels 12 of FIGS. 7-10 where second sides of the roof panels 12 overlap and form the secondary support members 17.

However, if roof panels 12 having projecting portions formed on both opposing side edges are employed, the assembly of the system 10 shown in FIG. 11 is substantially the same but for the positioning of additional support members 18 where the secondary support members 17 are formed by roof panels 12 with the folded edges 15 on second sides.

Figure 12:
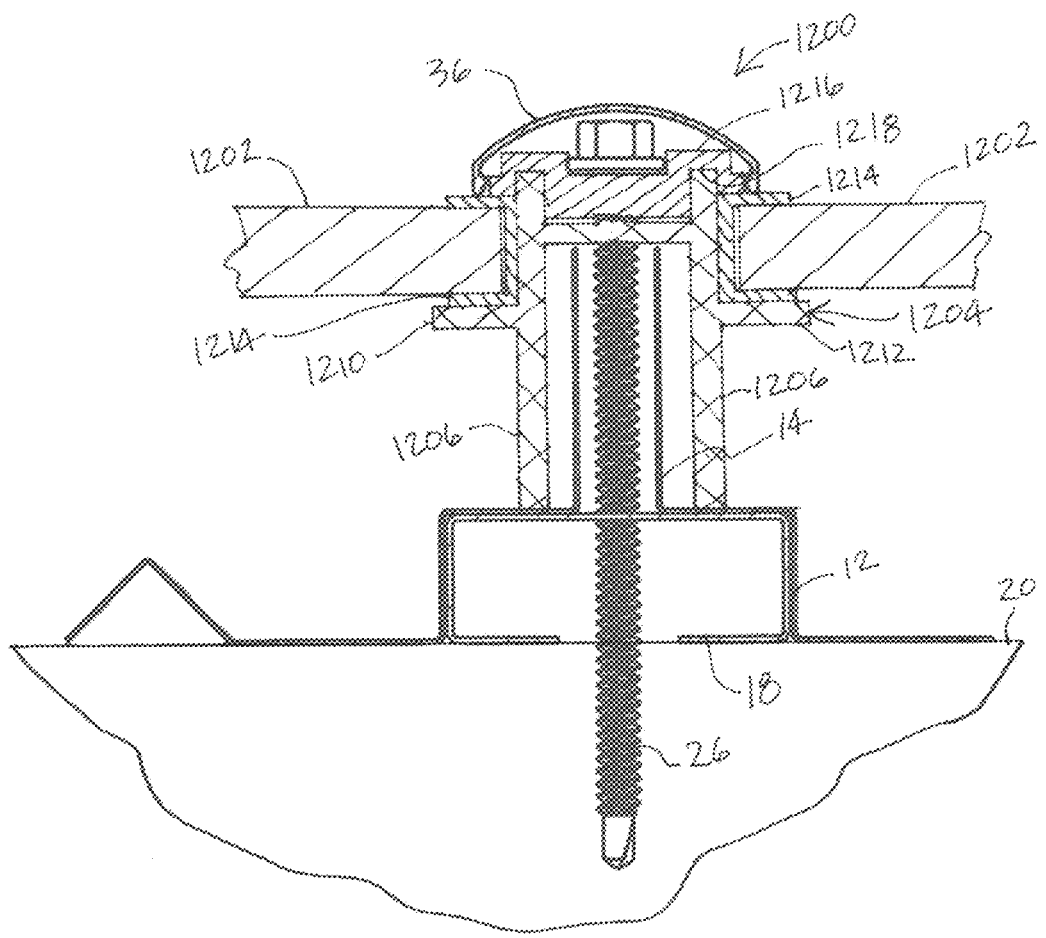
FIG. 12 is a sectional view of a system to support and seal between frameless solar panels in another embodiment of the present invention.

Referring next to FIG. 12, a sectional view of a system 1200 to support and seal between frameless solar panels is shown in another embodiment of the present invention. Shown are engageable cap 36, screw 26, support member 18, projecting portions 14, roof panels 12, underlying support structure 20, frameless solar panels 1202, a frameless astragal 1204, parallel ribs 1206, center portion 1208, left shelf 1210, right shelf 1212, rubber gasket 1214, pressure bar 1216, and notches 1218.

System 1200 is configured to support frameless solar panels. As shown frameless solar panels 1202 are thinner than the framed solar panels 22. The height of the panels above the roof is affected by the amount of space required underneath the solar panels 1202 for microinverters, optimizers, wiring, and/or other elements located between the solar panels 1202 and the roofing.

The frameless astragal 1204 includes two vertical, substantially parallel ribs 1206 that bear on and are supported by the support member 18. By substantially is meant a maximum angular difference of less than 10 degrees.

A center, substantially horizontal portion 1208 is interposed between the two ribs to form an H-shape. A left shelf 1210 extends horizontally outward from the left side of the astragal 1204, and a right shelf 1212 extends horizontally outward from the right side of the astragal 1204. The left shelf 1210 and the right shelf 1212 are located at the same height. An edge of each solar panel 1202 bears on and is supported by the proximate shelf 1210, 1212. Each shelf 1210, 1212 and rib 1206 has a width and thickness suitable for required strength and serviceability requirements for structural support of the frameless solar panel 1202. In some embodiments the rubber gasket 1214 is interposed between the frameless solar panels 1202 and the frameless astragal 1204. The rubber gasket 1314 protects the unprotected glass edge of the solar panels 1202 from breakage.

The continuous pressure bar 1216 is seated on top of the frameless astragal 1204. The pressure bar 1216 includes two downward-facing notches 1218 configured to receive the upper ends of the parallel ribs 1206. The pressure bar 1216 extends outward on each side, generally parallel to the proximate shelf 1210, 1212, to cover a portion of the proximate frameless solar panel 1202 end. Each side end of the pressure bar 1216 includes the recess for receiving the engageable cap 36. In some embodiments the pressure bar 1216 is aluminum, but may be of any suitable material. The pressure bar 1216 received the solar panels 1202 and secures them to the frameless astragal 1204 and the support member 18. The pressure bar 1216 also provides an anchor point for the engageable weathercap 36. The generally vertical screw 26 is engaged through a central portion of the pressure bar 1216 and the central portion 1208 of the frameless astragal 1204 and is secured into the support member 18 below. Screw 26 as shown in the illustration secures the entire assembly to the underlying roof deck, as well as securing the pressure bar 1216 to the underlying strut 1204 however additional shorter fasteners such as self-tapping screws could be used to secure the pressure bar 1216 to the underlying frameless astragal 1204 as needed to pinch the frameless glass edge of the solar panel 1202 between the frameless astragal 1204 and the pressure bar 1216 to make sure that the solar panel 1202 is firmly secured.

The screw 26 can be adjusted to both secure the frameless astragal 1204 to the support member 18 and to provide compress the pressure bar 1216 to the top of the frameless solar panel 1202. The screw couples the pressure bar to the frameless astragal, whereby the frameless solar panel is constrained against vertical movement by being interposed between the frameless astragal shelf and the corresponding side portion of the pressure bar. As the bottom edge of the solar panel 1202 is supported by the corresponding shelf 1210, 1212, the downward pressure applied to the frameless solar panel by the screw 26 adjustment will provide additional restraint to the connection by engaging the edges of the solar panels 1202 or frames surrounding them in a compressive sealed contact between the frameless astragal 1204 and the pressure bar 1208. In this way the frameless solar panels 1202 are compressibly engaged and held in place.

As described with respect to previous embodiments the system 1200 similarly allows the support members 18 to be installed onto the underlying support structure, and the roof panels 12 can be operatively positioned with the projecting portions 14 extending thereabove before installation of the frameless astragal 1204. The frameless astragal 1204 is then later installed. When solar panels 1202 are repaired or replaced the screw 26 may be loosened temporarily, and the solar panels 22 can be reinstalled.

In other embodiments the frameless astragal 1204 or the astragal 24 can be combined with various embodiments of solar panels and/or roof panels to result in a system that is more suitable for the structural characteristics of the glass-based solar panels and is more efficient in the use of materials. For example, the roof panel system may be narrower and include simpler astragal and roofing profiles. The revised roof panel system may be used in conjunction with frameless or mini-frame solar panels.

Figure 13:
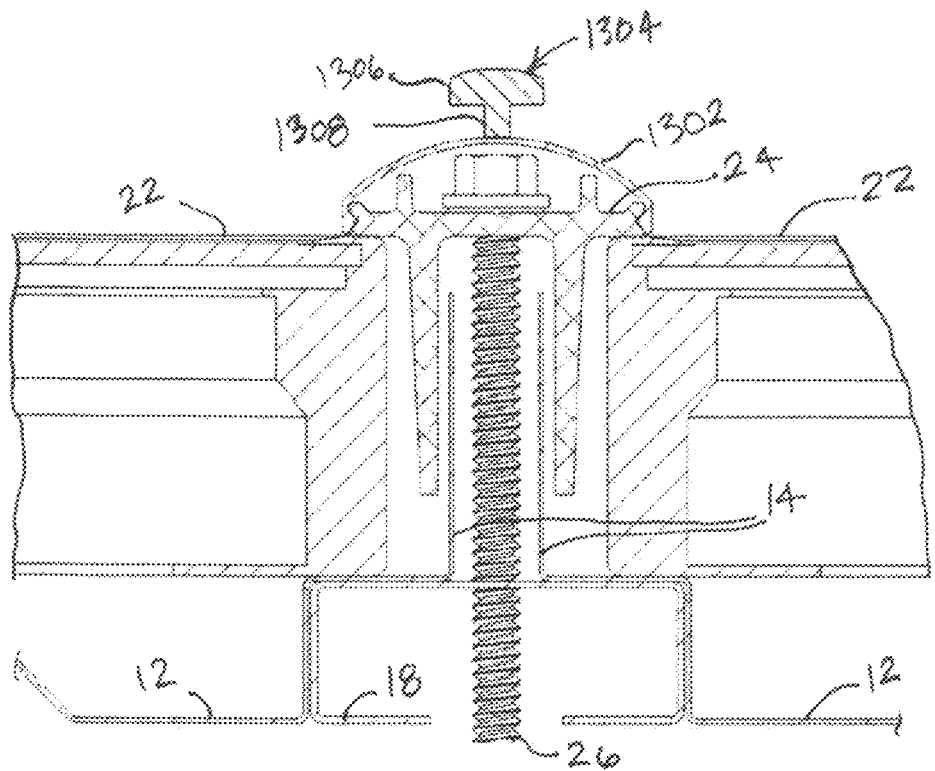
FIG. 13 is a sectional view of a system to support and seal between solar panels, including a rail extension, in another embodiment of the present invention.

Referring next to FIG. 13, a sectional view of a system 1300 to support and seal between solar panels including a rail extension is shown in another embodiment of the present invention. Shown are screw 26, support member 18, projecting portions 14, roof panels 12, solar panels 22, astragal 24, engageable cap 1302, rail extension 1304, head 1306, and web 1308.

The embodiment shown in FIG. 13 includes the engageable cap 1302 with the rail extension 1304 coupled to and extending upward from the engageable cap 1304. The engageable cap 1302 may include aspects of engageable cap 36 shown in FIGS. 1, 1A, and 1B. The rail extension 1304 includes the head 1306 and the generally vertical web 1308 extending downward from the head 1306, with an end of the web 1308 distal to the head 1306 coupled to the engageable cap 1302. In some embodiments the rail extension 1304 is integral with the engageable cap 1302.

The rail extension 1304 is configured to support and allow for linear movement along the rail extension 1304 for a building accessory or accessories. In some embodiments the rail is configured for an automated solar panel cleaning apparatus. The solar panel cleaning apparatus would grip onto the rail extension 1302 and work its way around the solar panels by sliding along the rail extension 1302 using either a dry process or a wet process to clean the solar panels. For smaller solar panel arrays a simple, hand-operated mechanical apparatus would be suitable, and for larger commercial arrays, an electrically powered and/or automated cleaning apparatus would be more suitable. Cleaning of solar panels installed on a roof or parking structure is typically difficult to clean with ground-based equipment such as up-and-over manlifts, hand-held pressure washers, long pool brushes, and squeegees. The addition of the rail extension is advantageous in that it allows a secure attachment point and guidance needed for manual/automated, roof-based cleaning equipment for the solar panels. In some embodiments the roofing/solar panel system includes a charging location where the automated solar panel cleaning apparatus would be stored for charging while not in operation. Additionally, the location of the rail extension can assist in hiding the visibility of the attachments for aesthetic purposes.

In other embodiments the rail extension 1304 is configured for operation of other types of modules. In yet another embodiment, the rail extension can be coupled to other linear building elements. For example, a rail extension could be used in conjunction with a curtainwall structure for window cleaning operations (instead of hanging people off of the side of high rise buildings). The rail extension could be added by replacing an engageable cap of existing curtainwall systems. While the rail extension cross-sectional shape is shown in FIG. 13 as similar to a traditional rail shape, it should be understood that the cross-sectional shape may be of any suitable shape for the attached apparatus.

In some embodiments the rail extension 1304 is formed specifically to engage a cleaning apparatus which may be friction or power driven manual or robotic and guided along the rail over the solar panels. Furthermore and importantly the continuous rail provides an anchor point for cleaning apparatuses which currently is not available as a feature of solar panel racking. The rail can be formed in various ways to facilitate cleaning by different devices.

The continuous cap is a unique and distinguishing feature of the system and provides numerous advantages over current systems. The continuous engageable cap as disclosed in various embodiments herein also provides a primary flashing to direct water flows over the solar panels rather than under them. The engageable cap also prevents buildup of dust in the gaps between the panels. The engageable cap also improves the visual appeal of the system by eliminating visual obstructions and presenting a solar array, as one item rather than many disparate items cobbled together.

In other embodiments of the system to support and seal between solar panels a wiring gutter box/channel may be installed between the roofing panel and the underside of the solar panel, with the gutter box/channel running perpendicular to the roofing seams. The gutter box/channel in some embodiments is used for wiring for the solar panel system and can be placed to facilitate placement of vent penetrations where needed. In some embodiments the gutter box/channel includes a snap-on cover and/or has a formed vinyl seal below the gutter box/channel.

In other embodiments of the system to support and seal between solar panels, low-rise plumbing vent terminations are configured to be installed in and operate in conjunction with the system. The low-rise plumbing vent terminations are specially adapted to work with the roof system by being formed low to the roof so not to interfere with the placement of solar modules.

In other embodiments of the system to support and seal between solar panels, low-rise integrated water and HVAC heater vent or supply air weatherheads are configured to be installed in and operate in conjunction with the system.

In other embodiments of the system to support and seal between solar panels, the system is configured to allow for installation of low profile solar panels specifically adapted for engagement to the roofing system and sized, finished and configured to appear similar to the solar panels commercially available for electricity production. In this way both solar water heating and solar photovoltaic electricity production can be accomplished on a single rooftop, with minimal to no negative aesthetic impact.

Figure 14:
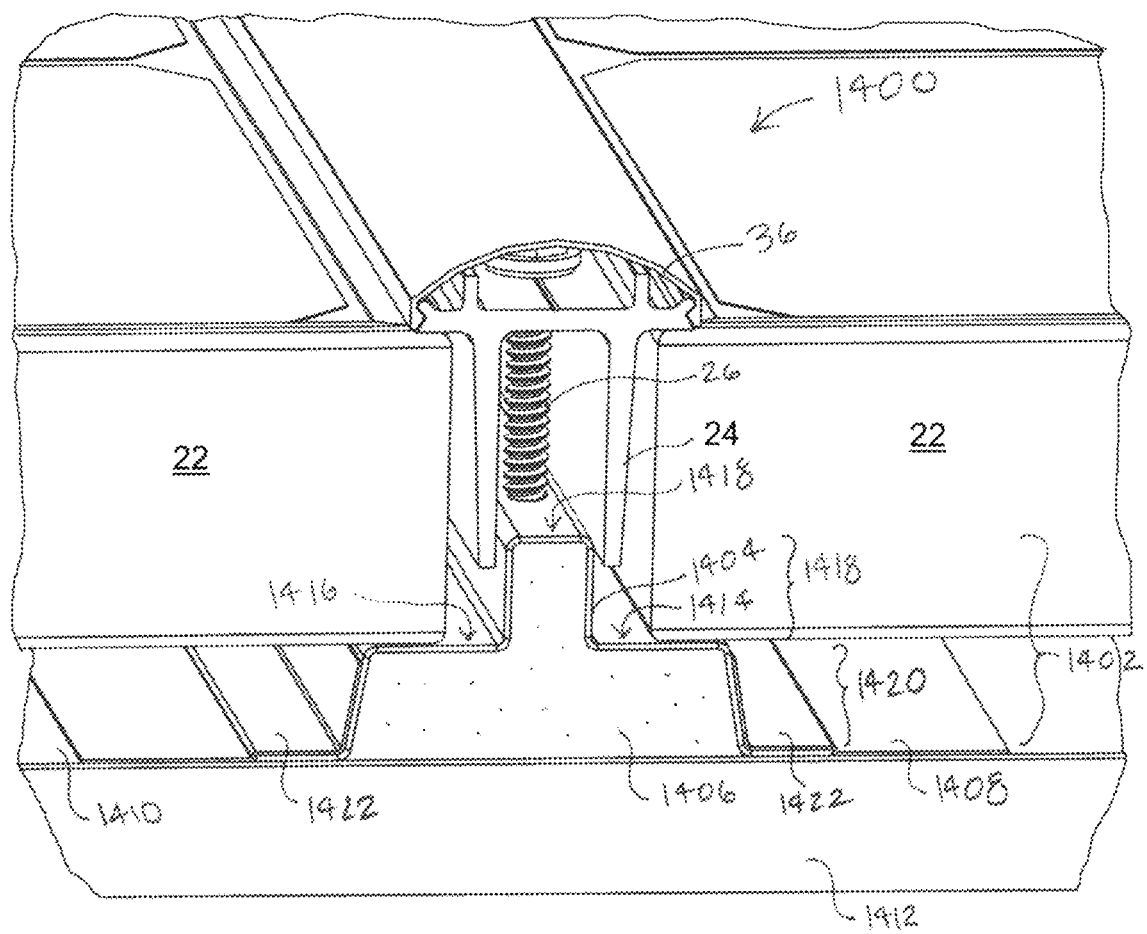
FIG. 14 is a perspective end view of a system to support and seal between solar panels, including a curb assembly, in yet another embodiment of the present invention.
Figure 15:
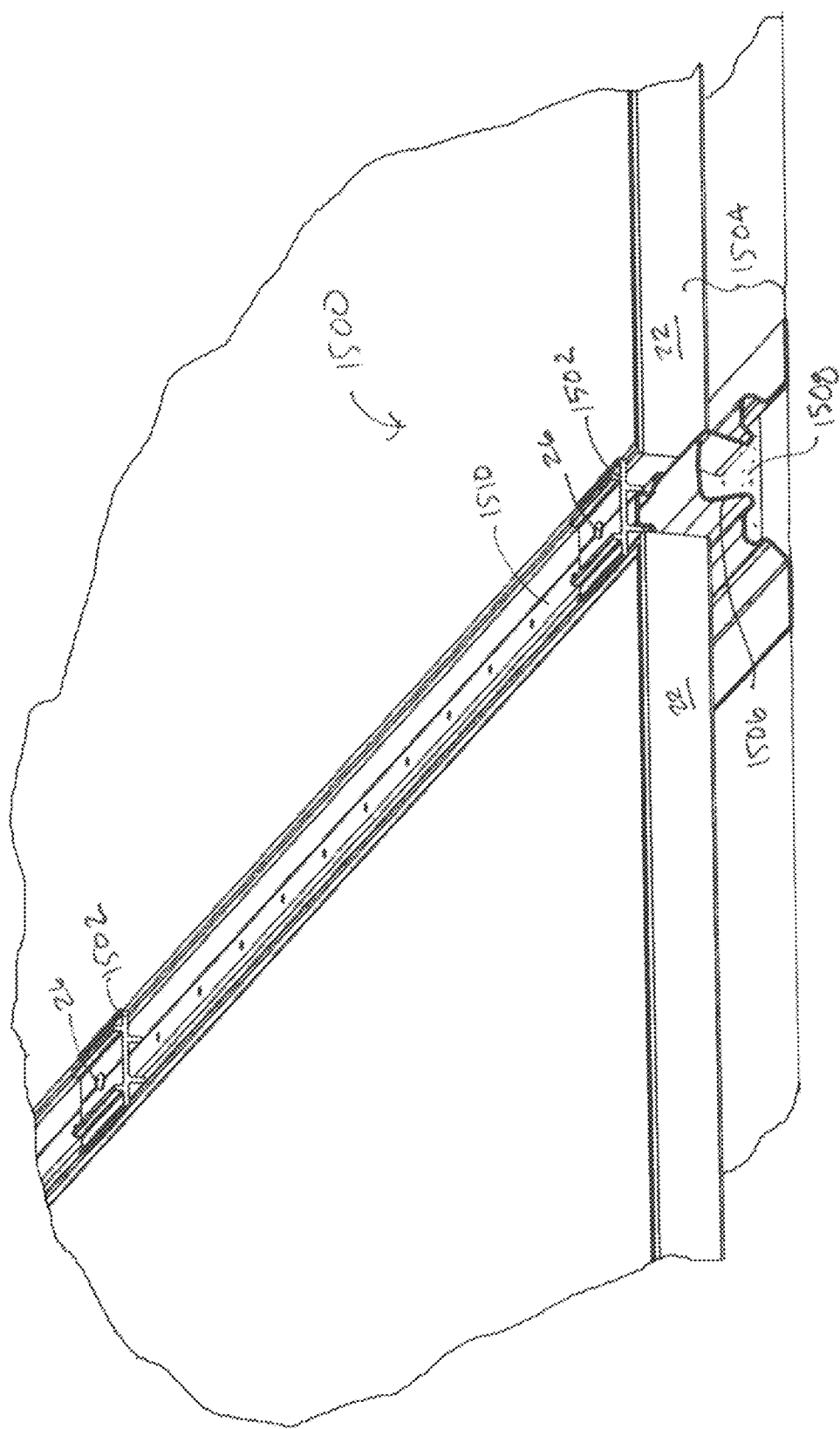
FIG. 15 is a perspective end view of an alternative embodiment of the system of FIG. 14.

Referring next to FIG. 14, a perspective end view of a system 1400 including a support curb is shown in yet another embodiment of the present invention. Shown are the solar panels 22, astragal 24, screw 26, engageable cover 36, a curb assembly 1402, a shaped steel plate 1404, a foam filler 1406, a waterproof membrane skirt 1408, roof membrane 1410, and roof assembly 1412. A perspective cross-sectional view of the curb assembly is shown in FIG. 15

The system 1400 shown in FIG. 14 includes the curb assembly 1402 comprising the shaped steel plate 1404, foam filler 1406, and the waterproof membrane skirt 1408. The roof assembly 1412 is fully constructed and waterproofed with the rolled waterproofed membrane 1412 prior to installation of the curb assembly 1402. The curb assembly 1402 is coupled to the roof and is shaped in a general inverted T-shape, with the flanges of the T-shape forming a lower rectangular portion 1420 with two shelf surfaces 1414 1416 (one on either side of the curb assembly) and a stem of the tee 1418 extending upward vertically between the two shelf surfaces 1414 1416. A solar panel 22 end is supported by each lower shelf surface 1414 1416. The astragal 24 is coupled to the stem 1418 via the fastener 26, which fastens the solar panels 22 to the roof 1412 as previously described. The curb assembly 1402 is in some embodiments continuous under the solar panels 22 in order to provide continuous support to the solar panels 22.

As previously described, the curb assembly 1402 forms the general inverted T-shape including the generally rectangular curb 1420 forming the flange of the inverted T-shape and the centered upward center projection 1418 forming the web. The shaped steel plate 1404 is shaped to provide the exterior shape of the curb assembly 1402. The shaped steel plate 1404 also includes the side extensions 1422 extending generally horizontally outward from the lower edge of the rectangular curb portion 1420. While the curb assembly shown is with reference to the curb assembly 1402 of FIG. 14 It will be understood that the description also applies to the curb assembly 1500 of FIG. 15.

The foam filling 1406 is shaped to match the interior surface of the shaped steel plate 1404 and configured such that when the foam filling 1406 is coupled to the steel plate, the underside surface of the foam filling 1406 generally matches the underside surfaces of the side extensions 1422 (i.e. the underside of the curb assembly 1402 is generally flat). A strip of waterproof membrane, the waterproof membrane skirt 1408, is juxtaposed with the underside surfaces of the foam filling 1406 and the extensions 1422. The waterproof membrane skirt 1408 extends horizontally past the extent of the extensions 1422 such that there is sufficient weld length to the underlying roofing system. In some embodiments the length past the extent of the extensions 1504 is between 2" and 6". The waterproof membrane skirt 1408 in some embodiments is permanently coupled to the steel plate 1404. In some embodiments the coupling is by heat or adhesive coupling. The foam filling 1406 is of sufficient firmness to engage with the other components. In some embodiment the foam filling comprises FPS foam with a 2.5 lb density.

FIG. 15 shows a system 1500, which is an alternative embodiment of the system of FIG. 14. In the embodiment of FIG. 15 a continuous metal clip 1510 snaps over the vertical tee-stem projection of a curb assembly 1504. The curb assembly 1504 comprises a steel plate 1506 and a foam filling 1508. The curb assembly 1504 is shaped and designed to receive the metal clip 1510. The clip 1510 creates a firm ledge for attachment of the solar panel 22, which when tightened to the astragal 24 (which is shortened and spaced along the clip 1510 in this embodiment) further secures the attachment of the solar panel 22 to the underlying curb assembly 1504. In the embodiment of FIG. 15 screws are placed through the foam curb prior to overlaying the roofing membrane material and the continuous clip 1510 is engaged when screwed to the astragal 24 above by the fastener 26 and compressed by the solar modules/panels 24 to attach more tightly to the curb assembly 1504. In some applications using a clip instead of the continuous astragal provides a cost reduction while still providing sufficient mounting structure. Additionally, use of the intermittent clip can make it easier to remove the engageable cover and to replace solar panels if necessary.

The embodiments of attachment of FIGS. 14 and 15 use existing means and methods for sealing roof membranes such that it can be used with all commercially available roofing systems. All roofing systems provide for the installation of curbs and flashing on the roof surface and the curb assemblies 1402 1504 provide for a specially adapted curb and flashing to engage with solar modules/panels 22 in the way substantially described previously.

Referring again to FIGS. 14 and 15, in operation the curb assembly 1402 is placed on top of the waterproof membrane 1410, which has been previously installed, so that the waterproof membrane skirt 1408 is juxtaposed with the waterproof membrane as shown in FIG. 14. The waterproof membrane skirt 1408 is coupled to the waterproof membrane 1410 using a method approved by the manufacturer of the waterproofing materials. As located, the curb assembly 1402 provides the two side shelves 1506. Similarly to the previous embodiments, a solar panel 22 end is supported on each shelf 1506 and the astragal 24 is provided such that it is supported by the top of the solar panels 22. During installation screws 26 are engaged through the central portion 29 of the astragal 24, through the curb assembly 1402, and secured into the roof assembly 1412, whereby the curb is coupled to the roof assembly 1412.

Large commercial roofs use rolled materials as the waterproofing element. The solar panel support system integrates with rolled waterproofing materials using the specially designed curb assembly 1402 that interlocks with the astragal 24 and supports the solar panel modules 22 while providing a surface to adhere and flash the roofing material in a manner that allows for use of existing installation means and methods without significant changes.

The curb assembly 1402 comes with the pre-attached waterproofing skirt 1408 which is secured to the underlying surface of the waterproofing membrane 1410 using a method approved by the manufacturer of the waterproofing material. For instance, when using TPO, Thermoplastic Olefin sheet material the installer would simply secure the curb assembly 1410 to the roof assembly 1412 with screws 26 and then run a seamer (an automated heat gun) around the perimeter of the skirting 1408.

Referring again to FIGS. 1, 1A, and 9-17, the mounting systems disclosed include continuous secondary support members to support the underside of the solar panels, which allows in combination with the support along the long sides of the solar panels a structural rigidity to the system such that it may be walked on in much the same way as common roofing materials may be walked on without causing damage to the solar module or to the roof. Current racking and mounting systems for solar modules typical to the industry as shown in FIGS. 6A-6D are too flimsy to accommodate being walked on—but are essentially no-go areas on the roof because the array of multiple panels only has rigid support at the points of attachment, which are spaced out along the length of the racking where roof framing members are available for attachment (usually at intervals from 8 to 10 feet).

By integrating solar panel support shelves/ledges into the underlying material and enclosing the perimeter of the module into the roof panel with a secure attachment via the astragal or clips and continuous engageable cap, these systems can be walked on by service and installation personnel with the ordinary care associated with other roofing systems. This walkability factor has significant potential benefits/implications for firefighting as well, since building departments place restrictions on the placement of solar panels because they require fire access to roofs. As a result of this safety requirement large portions of the roof are not available for installation of solar panels. Fire services require a path to ventilate the roof to cut a large hole at various locations. Currently they do not allow solar panels in this path or at potential ventilation areas for safety reasons. There are some electrical hazards which cause this requirement, but with current systems these have been overcome (rapid shutdown is required) and the only remaining hazard is walkability which is overcome with these systems, thus potentially rendering the entire roof available as a solar collection area without restriction for Fire access.

Figure 16:
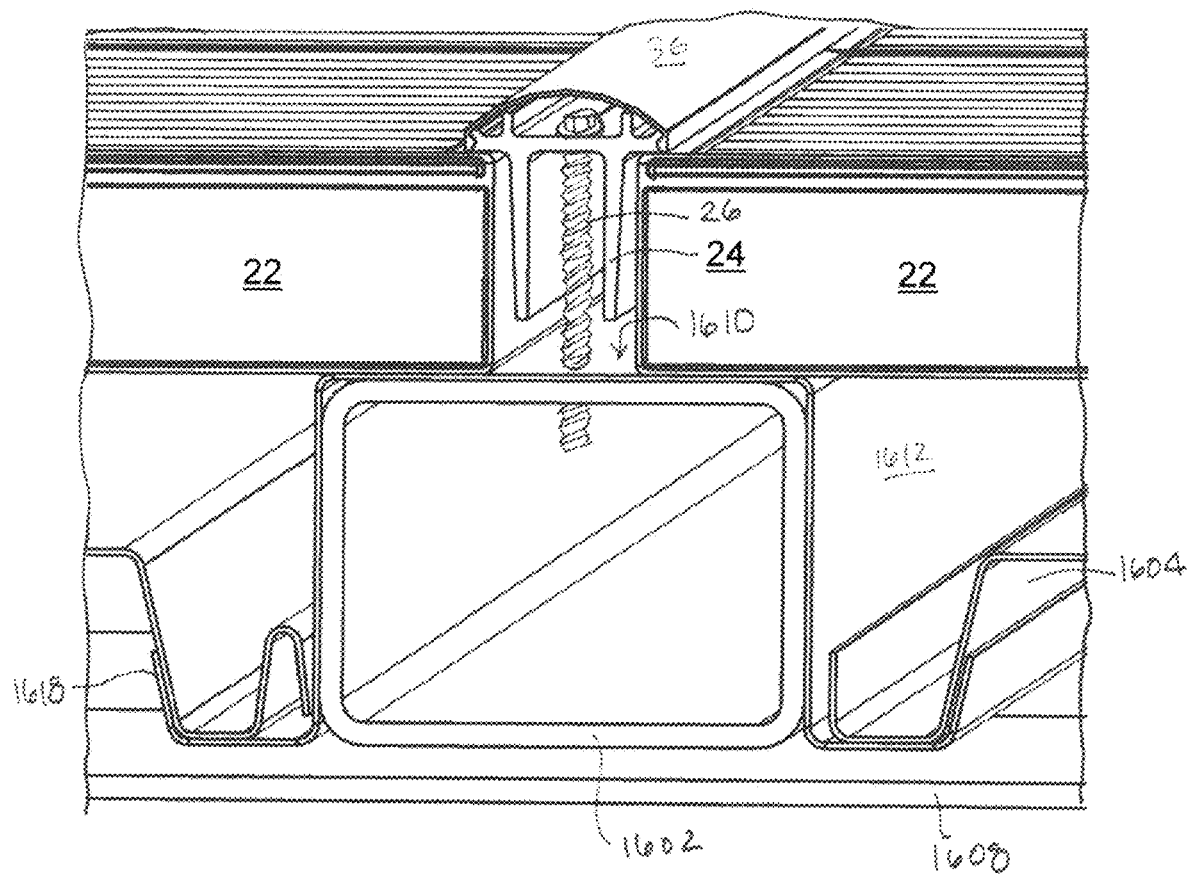
FIG. 16 is a perspective end view of a system to support and seal between solar panels, including a structural beam as a support member, in yet another embodiment of the present invention.

Referring next to FIG. 16, a perspective end view of a system 1600 including a structural beam as a support member is shown in yet another embodiment of the present invention. Shown are the solar panels 22, astragal 24, screw 26, engageable cover 36, a structural beam 1602, structural roof deck 1604, hat flashing 1606, and deck support beam 1608.

In the system 1600 shown in FIG. 16, in lieu of a light-gage support member, a structural beam is used for the solar panel support member. In the embodiment shown in FIG. 16, structural beam 1602 is a rectangular hollow steel section (HSS) having a generally rectangular cross-sectional perimeter shaped, and having a top outer surface 1610, a left outer surface, a right outer surface 1614, and an underside outer surface. It will be apparent to those of ordinary skill in the art that other suitable steel sections, such as wide flange or tee sections, may be used. The hat flashing 1606 is seated on the top outer surface of the beam 1602 and is shaped to generally conform to and juxtapose with the outer surface of the beam 1602, such that the hat flashing 1606 extends across the top surface of the beam and down each of the generally vertical left outer surfaces and right outer surfaces. The hat flashing 1606 also includes a generally horizontal flange 1616 extending outward and away from each of the left outer surface and the right outer surface. A lip 1618 extends generally upward from each flange The deck support beam 1608 is coupled to the underside surface of the structural beam 1602 and a longitudinal axis of the deck support beam 1608 is oriented generally perpendicular to a longitudinal axis of the structural beam 1602. The roof deck 1604 rests on and is supported by the deck support beam 1608 on each side of the structural beam 1602. A portion of the roof deck 1604 proximate to the structural beam 1602 overlaps the proximate lip 1618 and flange 1616 of the hat flashing, thus providing closure for and preventing water intrusion between the roof deck 1604 and the structural beam 1602.

The deck support beam 1608 members shown are channel sections, although any suitable shape may be used. It will be understood that a plurality of parallel deck support members 1608 are typically required to provide the required roof deck support.

Similarly to the embodiments previously shown, the solar panels 22 are seated on the structural beam 1602 (similarly to the support member 18), with a top portion of the hat flashing 1606 interposed between the solar panel and the structural beam 1602. The astragal 24 and engageable cap 36 are installed between the two solar panels 22, with the screw 26 anchoring the astragal 24 to the hat flashing 1606 and the structural beam 1602. In this way the solar panels are compressibly coupled to the structural beam, as previously described.

In the embodiment shown in FIG. 16, the use of the structural beam 1602 instead of an additional support member allows the system 1600 to be thinner, as instead of a separate support member for the solar panels and a structural beam, the two have been combined into the single structural beam 1602 that performs both the function of a structural support of the roof system and a curb and support for the solar panels 22.

Figure 17:
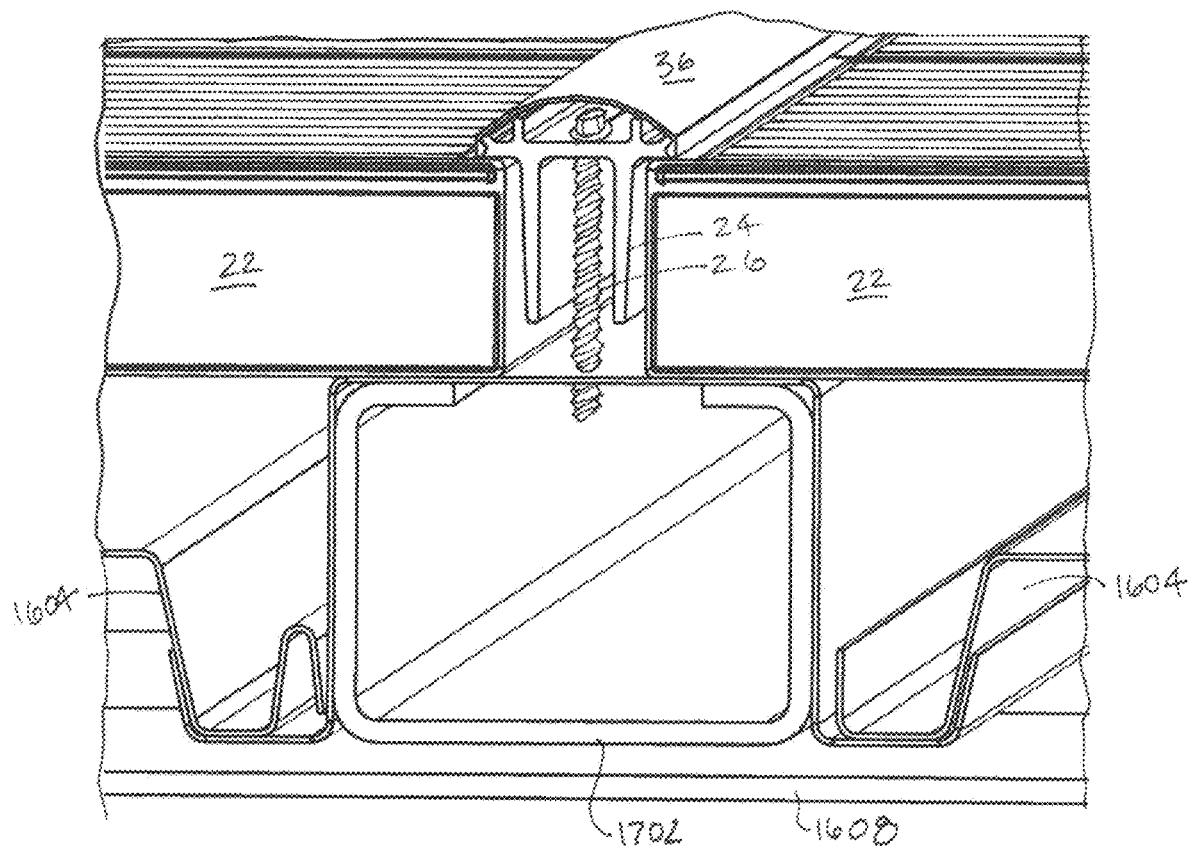
FIG. 17 is a perspective end view of a system to support and seal between solar panels, including a beam as a support member, in yet another embodiment of the present invention.

Referring next to FIG. 17, a perspective end view of a system 1700 including a beam as a support member is shown in yet another embodiment of the present invention. An open HSS beam 1702 is shown. Internal stiffeners (not shown) may be provided to the HSS beam 1702 as required.

Figure 18:
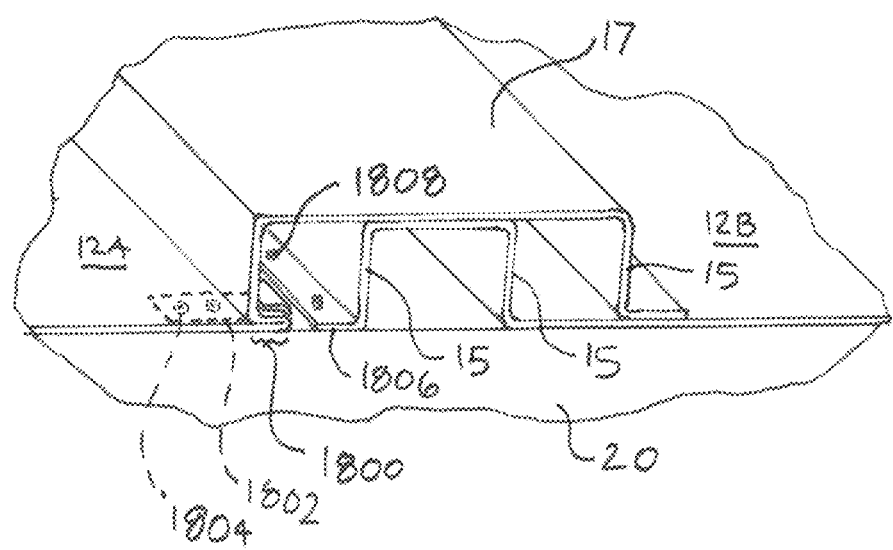
FIG. 18 is a perspective view of a roof panel overlap at a secondary support member in yet another embodiment of the present invention.

Referring next to FIG. 18, a perspective view of a roof panel overlap at the secondary support member 17 is shown in yet another embodiment of the present invention. Shown are the first roof portion 12A, second roof portion 12B, folded edges 15, secondary support 17, underlying support surface 20, hem 1800, clip 1802, hem fasteners 1804, fastener lip 1806, and lip fasteners 1808.

Shown in FIG. 18 is an alternative embodiment of the roof panel overlap shown in FIGS. 9 and 11. In the embodiment shown in FIG. 18, first roof portion 12A includes the horizontal folded hem 1800 which is juxtaposed with the underlying roofing surface 20. Prior to installation of the roof panels 12A and 12B, a plurality of clips 1802 are coupled to the roof surface 20 using the plurality of fasteners 1804 in locations to receive and couple the hem 1800 to the clips 1802 and thus to the roof surface 20.

In the embodiment shown in FIG. 18, the fastener lip 1806 of the second roof panel 12B is folded outward, i.e. extends outward in the direction toward the first roof panels 12A (instead of extending inward back toward roof panel 12B, as shown in FIGS. 9 and 11). During installation, second roof panel 12B is coupled to the underlying roof surface 20 by installing the lip fasteners 1808 through the exposed fastener lip 1806. Prior to installation of the first roof portion 12A, the plurality of clips 1802 are coupled to the roof surface 20 using the clip fasteners 1804 in locations to receive the hem 1800 of the first roof portion 12A. Then the first roof portion 12A is installed with the folded edges 15 of the first roof portion 12A over the folded edges 15 of the second roof portion 12B by coupling the hem 1800 to the plurality of clips 1802. This same system can be used with expansion roof panels that allows for installation of solar modules/panels in a landscape orientation.

The roof panel overlap embodiment of FIG. 18 retains the advantageous features of the embodiment shown in FIGS. 9 and 11, such as being adjustable to receive solar panels of varying widths while still forming an appropriately flashed roof system forming a rain-tight seal. The embodiment of FIG. 18 allows the clip fasteners 1804 to be fully concealed, unlike the roof overlap of FIGS. 9 and 18, which requires exposed fasteners. Additionally, the use of clips is superior to using other direct fasteners such as face screws, as face screws create stress points at the fastener locations due to thermal movement of the metal roofing material. Use of clips allows for thermal movement of the roofing panels, reducing stress on the roofing material and reducing potential for compromising of the waterproofing of the roof. Additionally, the overlapping part of the profile allows for the system of attachment to be adapted to solar modules in various standard/typical sizes.

Figure 19:
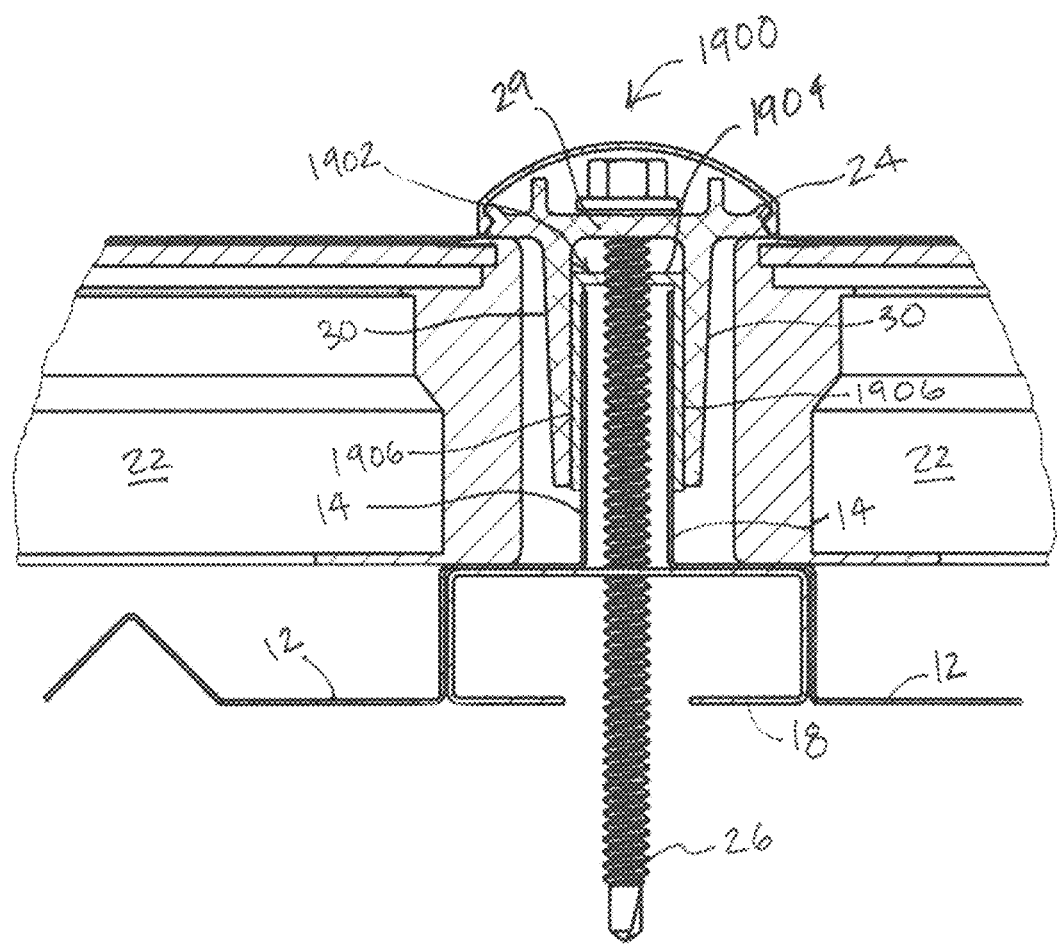
FIG. 19 is a sectional view of a system to support and seal between frameless solar panels is in yet another embodiment of the present invention.

Referring next to FIG. 19, a sectional view of a system 1900 to support and seal between frameless solar panels is shown in another embodiment of the present invention. Shown are screw 26, support member 18, projecting portions 14, roof panels 12, solar panels 22, astragal 24, astragal center portion 29, parallel ribs 30, engageable cap 36, seal 1902, seal center portion 1904, and seal legs 1906.

The system 1900 includes the seal 1902. The seal 1902 is in an inverted U-shape, comprising the horizontal center portion interposed between two legs 1906 generally normal to the center portion 1904 and extending downward from the center portion 1904. The seal 1902 dimensions are such that each leg 1906 of the seal is interposed between the generally vertical projection 14 and the proximate generally vertical astragal parallel rib 30. As shown in FIG. 19, when installed in the system 1900, the center portion 1904 is located beneath the astragal center portion 29. The seal 1902 comprises a waterproof material. In some embodiments the seal 1902 is a waterproof vinyl seal.

For additional weatherproofing and protection, and/or when there is a scheduling gap between dry-in status of the roof and installation of the solar modules, the seal 1902 can be installed under the center portion 29 of the astragal 24. The seal 1902 provides an extra layer of water intrusion protection at the gap between the astragal leg 30 and the projection 14, and/or when the solar panels 22 have not yet been installed. If dissimilar metal contact is deemed to be a problem, then the seal 1902 also provides electrical isolation between the coated roofing material and the aluminum astragal 24. Thus the seal 1902 advantageously provides both electrical isolation and additional weather sealing properties.

Figure 20:
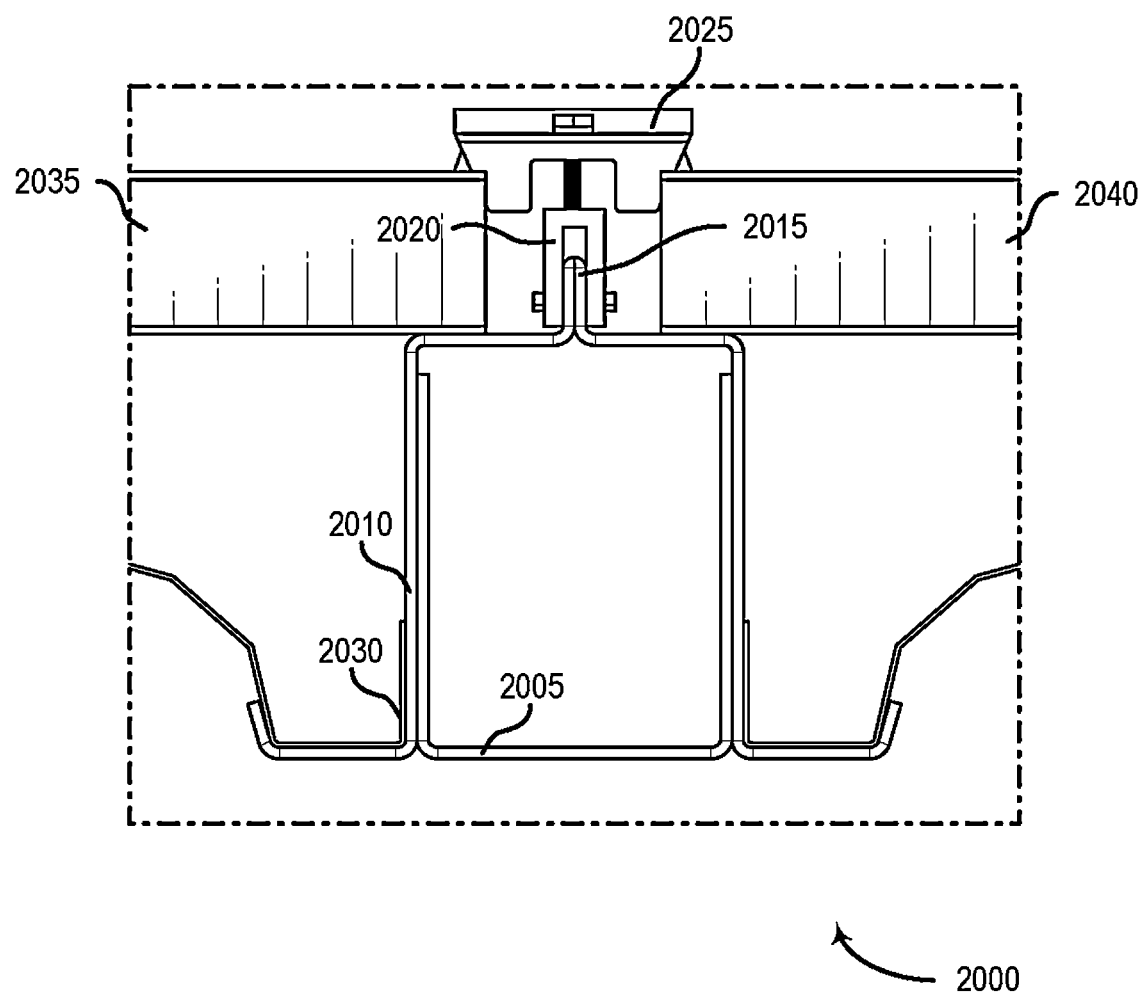
FIG. 20 shows an example of a structural view of a solar panel support system according to aspects of the present disclosure.

FIG. 20 shows an example of a structural view of a solar panel support system according to aspects of the present disclosure. Solar panel installation system 2000 is an example of, or includes aspects of, the corresponding element described with reference to FIGS. 21-24, 27-38, 40, and 41. In one aspect, solar panel installation system 2000 includes beam 2005, roof panel portion 2010, fold 2015, clamp 2020, astragal clip 2025, flashing panel 2030, left solar panel module 2035, and right solar panel module 2040.

Beam 2005 is an example of, or includes aspects of, the corresponding element described with reference to FIG. 21. Roof panel portion 2010 is an example of, or includes aspects of, the corresponding element described with reference to FIG. 21. Fold 2015 is an example of, or includes aspects of, the corresponding element described with reference to FIGS. 21 and 38. Clamp 2020 is an example of, or includes aspects of, the corresponding element described with reference to FIG. 21. Astragal clip 2025 is an example of, or includes aspects of, the corresponding element described with reference to FIGS. 21-23, 27, 28, 30, and 34-36. Flashing panel 2030 is an example of, or includes aspects of, the corresponding element described with reference to FIG. 21. Left solar panel module 2035 is an example of, or includes aspects of, the corresponding element described with reference to FIGS. 21-23, 27, 28, 30, 31, 34, 37, 38, 40, 41, and 43. Right solar panel module 2040 is an example of, or includes aspects of, the corresponding element described with reference to FIGS. 23, 27, 28, 30, 34, 37, 38, 40, and 41.

Figure 21:
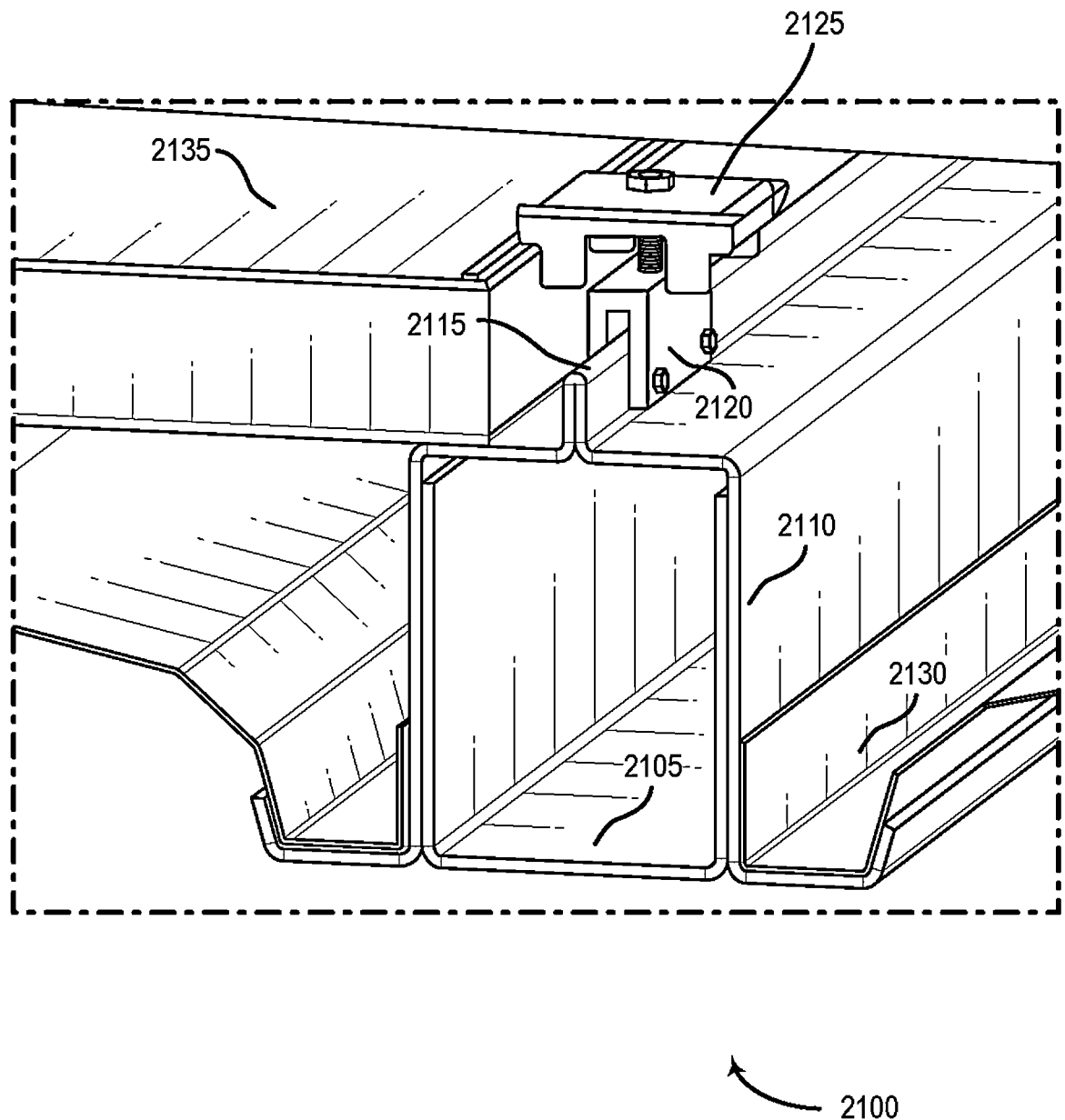
FIG. 21 shows an example of a perspective view of a solar panel support system according to aspects of the present disclosure.

FIG. 21 shows an example of a perspective view of a solar panel support system according to aspects of the present disclosure. Solar panel installation system 2100 is an example of, or includes aspects of, the corresponding element described with reference to FIGS. 20, 22-24, 27-38, 40, and 41. In one aspect, solar panel installation system 2100 includes beam 2105, roof panel portion 2110, fold 2115, clamp 2120, astragal clip 2125, flashing panel 2130, and solar panel module 2135.

Beam 2105 is an example of, or includes aspects of, the corresponding element described with reference to FIG. 20. Roof panel portion 2110 is an example of, or includes aspects of, the corresponding element described with reference to FIG. 20. Fold 2115 is an example of, or includes aspects of, the corresponding element described with reference to FIGS. 20 and 38. Clamp 2120 is an example of, or includes aspects of, the corresponding element described with reference to FIG. 20. Astragal clip 2125 is an example of, or includes aspects of, the corresponding element described with reference to FIGS. 20, 22, 23, 27, 28, 30, and 34-36. Flashing panel 2130 is an example of, or includes aspects of, the corresponding element described with reference to FIG. 20. Solar panel module 2135 is an example of, or includes aspects of, the corresponding element described with reference to FIGS. 20, 22, 23, 27, 28, 30, 31, 34, 37, 38, 40, 41, and 43.

In FIGS. 20 and 21, a sectional view and a perspective view of a solar panel support system using a structural beam 2105 as a support member is shown in another example embodiment of the present invention.

One or more aspects of the solar panel support system shown in FIGS. 20 and 21 may be related to the structural beam 2105 support system shown in FIGS. 16 and 17. For instance, elements of FIGS. 20 and 21 may be examples of, or include aspects of, corresponding elements shown and described with reference to FIGS. 16 and 17.

A support beam 2105 (e.g., a U-shaped support beam 2105) is shown supporting a roof panel portion 2110, where the roof panel portion 2110 has a fold 2115 extending upward along the length of the support beam 2105. A U-shaped clamp 2120 is screwed to the fold 2115 via set screws. The astragal clip 2125 is fastened to the u-shaped clamp 2120 by a vertical fastener (e.g., such that the astragal clip 2125 is not anchored directly to the support beam 2105). The astragal clip 2125 is installed between two solar panel modules (e.g., as described in more detail herein).

The composite structural shape comprising the nesting combination of the U-shaped support beam 2105 and the overlying roof panel portion 2110 provides additional strength (e.g., double the strength) in the axis supporting the most load by creating a double thickness in the vertical elements of the structural member. The dimensions (e.g., gauge) of these vertically-oriented structural members can be altered (e.g., tapered from a centerline to a leading edge of the system) as well (e.g., to eliminate additional weight or to optimize structural or cost performance of the total assembly).

Additionally, in some examples, the void inside the composite structural shape created inside the two parts (e.g., inside the U-shaped support beam 2105 and the roof panel portion 2110) may incorporate stiffening members (e.g., as needed based on weight of the system, safety thresholds, etc.). This void enables the composite structural shape to be supplemented with a wide variety of internal stiffening members thereby providing a wide range of options to adapt to site specific design requirements such as enhanced spans, elevated seismic, wind or snow load requirements, etc. In some examples, stiffening members that may be integrated include, but are not limited to, a square tube steel, a metal truss, a channel, an I beam, a solid metal bar, a fiberglass reinforced structural foam, a braced metal strut, etc. In some cases (e.g., in cases demanding enhanced fire-resistance), stiffening members that may be integrated include composite wooden beams which resist deformation in high heat better than a metal equivalent could be specified.

Generally, the solar panel support system shown in FIGS. 20 and 21 may be implemented with a wide range of potential structural adaptations, which can be optimized across a wide range of scenarios and site requirements to maximize efficiency and minimize cost in a wide variety of applications (e.g., by optimizing overall steel tonnage, on site labor, overall installation costs, etc.). Further, any suitable material with sufficient structural material properties may be used for the various elements described herein. For instance, to further save weight, the flashing panel 2130 that spans between sections may be made out of plastic, metal or fiberglass or any other material with suitable properties. As an example, one or more aspects of structural beam 2105 systems described herein may be utilized in solar carport systems (e.g., solar carport systems installed at office parks, supermarkets, airports, etc.).

The configuration of support systems disclosed herein (e.g., structural beam 2105 based support systems) may further enable and introduce new design possibilities such as radiused, tapered, curved and even complex variably recurved shapes. Furthermore, the flashing panel 2130 used on the underside of the system may be finished in a variety of textures, materials and patterns to achieve aesthetic effects that are not presently feasible.

Figure 22:
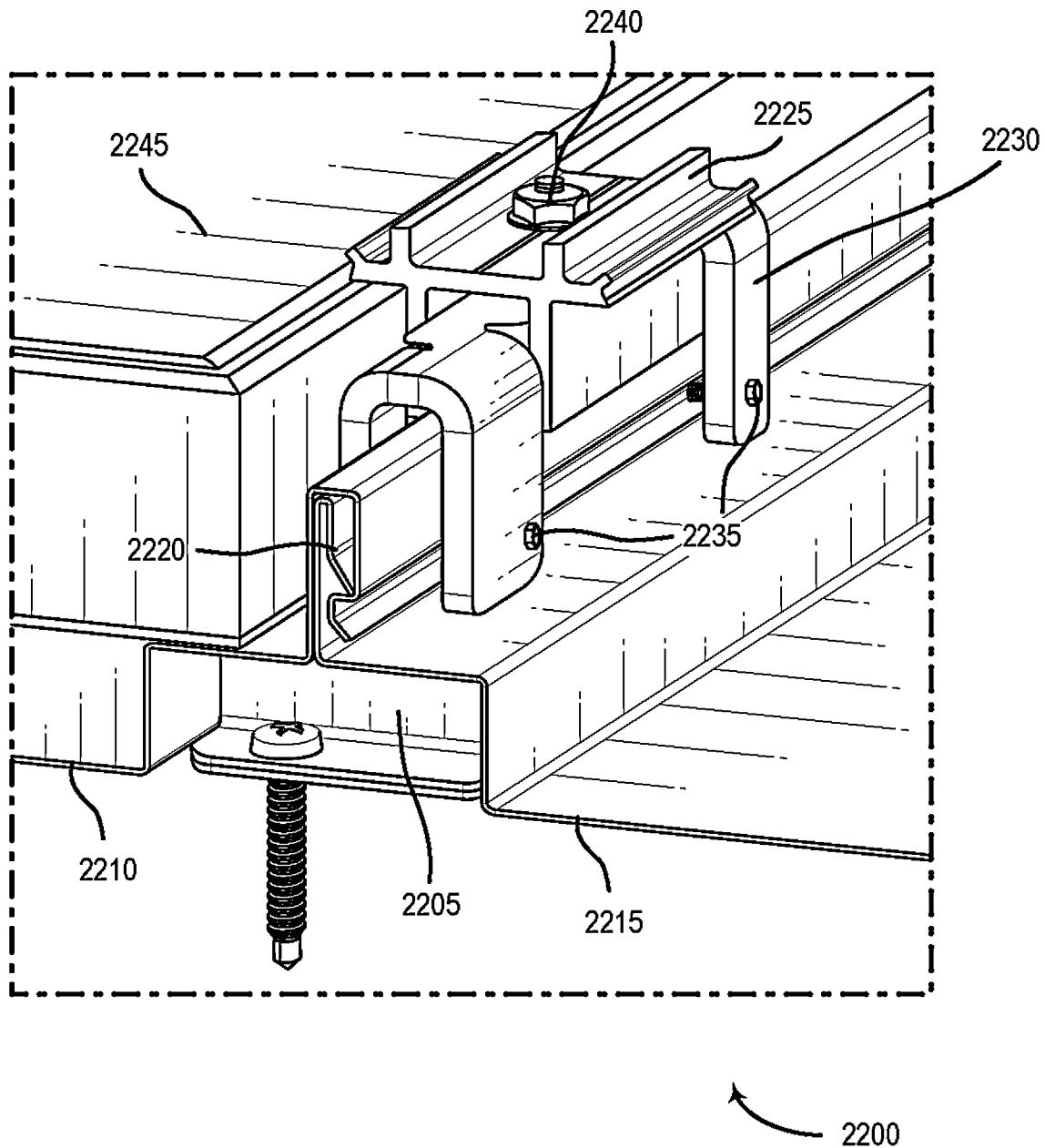
FIG. 22 shows an example of a perspective view of a solar panel installation system according to aspects of the present disclosure.

FIG. 22 shows an example of a perspective view of a solar panel installation system 2200 according to aspects of the present disclosure, wherein adjacent panels snap together. Solar panel installation system 2200 is an example of, or includes aspects of, the corresponding element described with reference to FIGS. 20, 21, 23, 24, 27-38, 40, and 41. In one aspect, solar panel installation system 2200 includes spacer block 2205, left roof panel 2210, right roof panel 2215, continuous panel joint 2220, astragal clip 2225, standing seam clip 2230, set screws 2235, fastener 2240, and solar panel module 2245.

Spacer block 2205 is an example of, or includes aspects of, the corresponding element described with reference to FIGS. 25, 27, 28, and 35. Left roof panel 2210 is an example of, or includes aspects of, the corresponding element described with reference to FIGS. 23, 27, 28, 31-34, 38, and 40-42. Right roof panel 2215 is an example of, or includes aspects of, the corresponding element described with reference to FIGS. 23, 27, 28, 31-34, 38, 40, and 41. Continuous panel joint 2220 is an example of, or includes aspects of, the corresponding element described with reference to FIGS. 23, 24, 26-28, 31-33, 35, 36, 38, and 41. Astragal clip 2225 is an example of, or includes aspects of, the corresponding element described with reference to FIGS. 20, 21, 23, 27, 28, 30, and 34-36. Standing seam clip 2230 is an example of, or includes aspects of, the corresponding element described with reference to FIGS. 23, 26-28, and 34-36. Set screws 2235 is an example of, or includes aspects of, the corresponding element described with reference to FIGS. 24, and 26-28. Fastener 2240 is an example of, or includes aspects of, the corresponding element described with reference to FIGS. 23, 25, 27, 28, and 30. Solar panel module 2245 is an example of, or includes aspects of, the corresponding element described with reference to FIGS. 20, 21, 23, 27, 28, 30, 31, 34, 37, 38, 40, 41, and 43.

Figure 23:
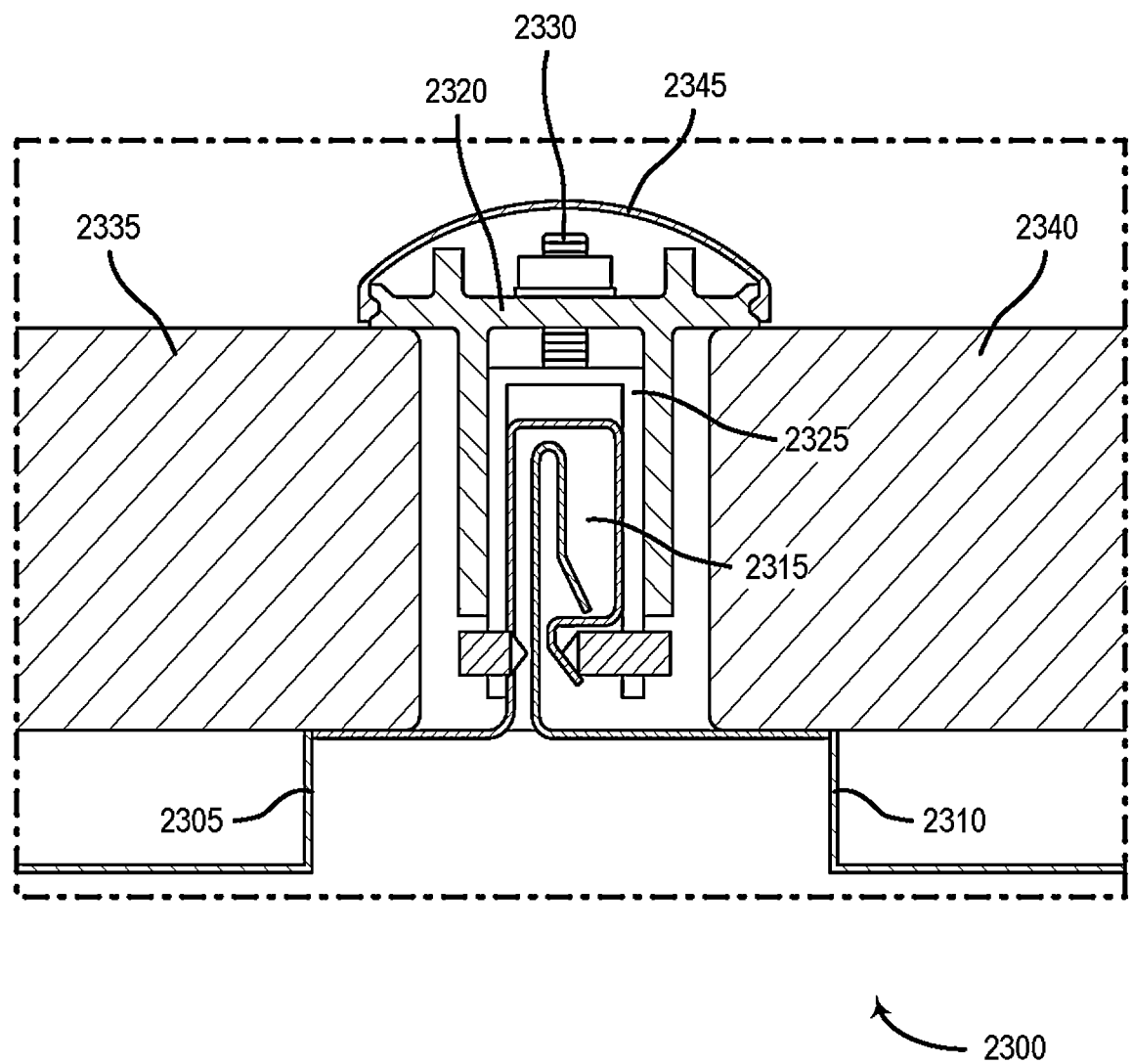
FIG. 23 shows an example of a sectional view of a solar panel installation system according to aspects of the present disclosure.

FIG. 23 shows an example of a sectional view of a solar panel installation system 2300 according to aspects of the present disclosure. Solar panel installation system 2300 is an example of, or includes aspects of, the corresponding element described with reference to FIGS. 20-22, 24, 27-38, 40, and 41. In one aspect, solar panel installation system 2300 includes left roof panel 2305, right roof panel 2310, continuous panel joint 2315, astragal clip 2320, standing seam clip 2325, fastener 2330, left solar panel module 2335, right solar panel module 2340, and weathercap 2345.

Left roof panel 2305 is an example of, or includes aspects of, the corresponding element described with reference to FIGS. 22, 27, 28, 31-34, 38, and 40-42. Right roof panel 2310 is an example of, or includes aspects of, the corresponding element described with reference to FIGS. 22, 27, 28, 31-34, 38, 40, and 41. Continuous panel joint 2315 is an example of, or includes aspects of, the corresponding element described with reference to FIGS. 22, 24, 26-28, 31-33, 35, 36, 38, and 41. Astragal clip 2320 is an example of, or includes aspects of, the corresponding element described with reference to FIGS. 20-22, 27, 28, 30, and 34-36. Standing seam clip 2325 is an example of, or includes aspects of, the corresponding element described with reference to FIGS. 22, 26-28, and 34-36. Fastener 2330 is an example of, or includes aspects of, the corresponding element described with reference to FIGS. 22, 25, 27, 28, and 30. Left solar panel module 2335 is an example of, or includes aspects of, the corresponding element described with reference to FIGS. 20-22, 27, 28, 30, 31, 34, 37, 38, 40, 41, and 43. Right solar panel module 2340 is an example of, or includes aspects of, the corresponding element described with reference to FIGS. 20, 27, 28, 30, 34, 37, 38, 40, and 41. Weathercap 2345 is an example of, or includes aspects of, the corresponding element described with reference to FIGS. 27, 28, 30, 34, and 37.

Figure 24:
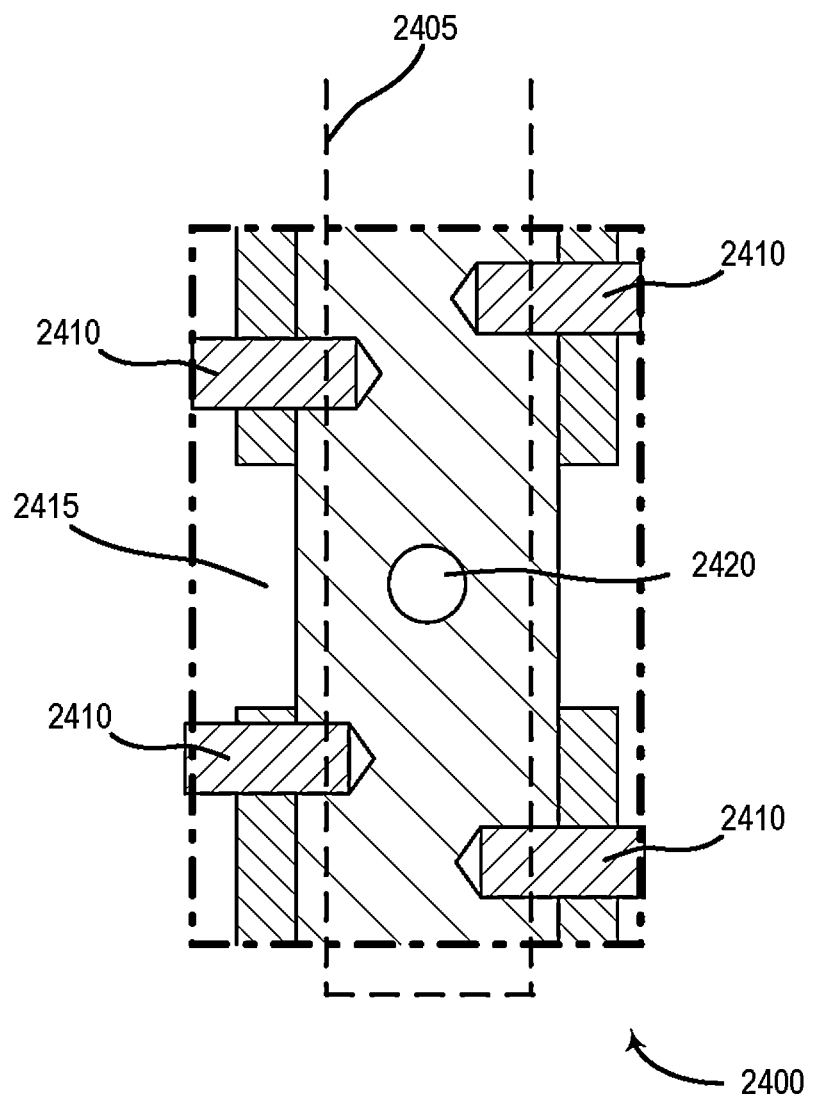
FIG. 24 shows an example of a plan view of a solar panel installation system according to aspects of the present disclosure.

In FIGS. 22-24, a perspective view, a sectional view, and a plan view of a system for attaching a solar panel module to a snap-lock standing seam roof are shown, respectively.

A snap-lock standing seam metal roofing (or cladding) may utilize a folded seam between adjacent panels to provide a raintight attachment between panels (e.g., between left roof panel 2305 and right roof panel 2310). The standing seam embodiment shown is an example of a snap-lock standing seam joint (e.g., a snap-lock continuous panel join), where the seam is formed by pre-formed edge geometries being snap-locked together to form the seam joint.

In an example, the roof panels may also include the solar panel module support shelf formed in the panel such that the seam is formed at the shelf elevation. A spacer block may be fastened to the roof below (e.g., below the standing seam). Further, the spacer block may provide the support and attachment for the panels (the left roof panel 2305 and the right roof panel 2310) and the solar panel modules to the roof below. The spacer block is described in more detail herein, for example, with reference to FIG. 25.

As the two roof panels (the left roof panel 2305 and the right roof panel 2310) form the standing seam near the center of the support shelf, an additional element (e.g., a standing seam clip 2325) may be integrated. In some aspects, the standing seam clip 2325 may pass the loading from the astragal clip 2320 to the spacer block, and ultimately pass the load to the roof structure. The geometry of the standing seam clip 2325 can be described as, for example, two inverted U-shapes connected by a center strip joining the bases of the U-shape. When installed, such may result in four downward facing "legs" joined by the center strip at the top (e.g., as shown in FIGS. 22 and 23).

When installed, the astragal clip 2320 is seated with the center portion of the astragal clip 2320 located above the center strip and a press-in stud may be coupled to the center strip such that a threaded shaft of the stud extends upwards and through the corresponding hole in the astragal clip 2320. In some examples, a washer and nut may be installed to the stud above the astragal clip 2320 to fasten the astragal clip 2320 to the standing seam clip 2325. In some cases, other suitable types of connection between the astragal clip 2320 and the standing seam clip 2325 may be used by analogy, without departing from the scope of the present disclosure.

Each vertical leg of the astragal clip 2320 may fit between the corresponding standing seam clip 2325 legs on that side of the standing seam clip 2325. In the example of FIGS. 22-24, there is an opening between the standing seam clip 2325 legs that receives the astragal clip 2320 leg. In other examples, the standing seam clip 2325 legs may be connected to form a continuous side to the seam clip, and the side of the seam clip may have a recess to receive the astragal clip 2320 (e.g., as shown, for example, in FIG. 26).

In some examples, set screws (e.g., set screws 2235) may be used to couple the standing seam clip 2325 to the standing seam. For instance, in the example of FIG. 22, one set screw 2235 is threaded through a hole in each standing seam clip 2230 leg proximate to the end of each seam clip leg. Where the snap-lock standing seam has an indentation (e.g., on the right side of the standing seam in FIG. 23), the hole and set screw may be located such that the set screw extends into the indentation. In some examples, the set screws may be threaded through holes that are offset from each other on opposite sides of the continuous panel join (e.g., so that when the screws are tightened, the screws mutually deform the comparatively light-gauge metal of the continuous panel join, which may add a zigzag crimp shape in the continuous panel joint 2315 at the point of attachment). Such deformation or crimp may bind the continuous panel joint 2315 together with the clip (e.g., the standing seam clip 2325) and the mount to increase the reliability, structural value, and efficiency of installation labor associated with the connection by electrically and structurally bonding all of the adjacent components together. Further, the set screws (e.g., and the resulting deformation or crimp) may securely attach the roofing material to a structure while passing the compressive load imposed by the module mount directly to the seam clip, preventing the slippage of the solar panel module mount (and thus the solar panel module which it secures) down the slope of the roof. This advantageous offset deformation of the roofing material may be utilized in wall mount systems as well.

In the examples of FIGS. 22-24, the standing seam clip 2325 may be stamped from a sheet of metal and then formed. In general, a variety of manufacturing methods may be used to manufacture the astragals/astragal clips 2320, roof/wall panels, accessories, clips and clamps disclosed herein to accomplish the same purpose by analogy, without departing from the scope of the present disclosure. Although some elements are shown as being formed as an extruded metal (e.g. aluminum) part, in some instances the same function for the part could be achieved at lower cost or of other material (e.g., by using a stamped embodiment).

FIG. 24 shows an example of a plan view of a solar panel installation system 2400 according to aspects of the present disclosure. Solar panel installation system 2400 is an example of, or includes aspects of, the corresponding element described with reference to FIGS. 20-23, 27-38, 40, and 41. In one aspect, solar panel installation system 2400 includes continuous panel joint 2405, set screws 2410, slot for module clip 2415, and stud 2420.

Continuous panel joint 2405 is an example of, or includes aspects of, the corresponding element described with reference to FIGS. 22, 23, 26-28, 31-33, 35, 36, 38, and 41. Set screws 2410 is an example of, or includes aspects of, the corresponding element described with reference to FIGS. 22, and 26-28. Stud 2420 is an example of, or includes aspects of, the corresponding element described with reference to FIG. 26.

Figure 25:
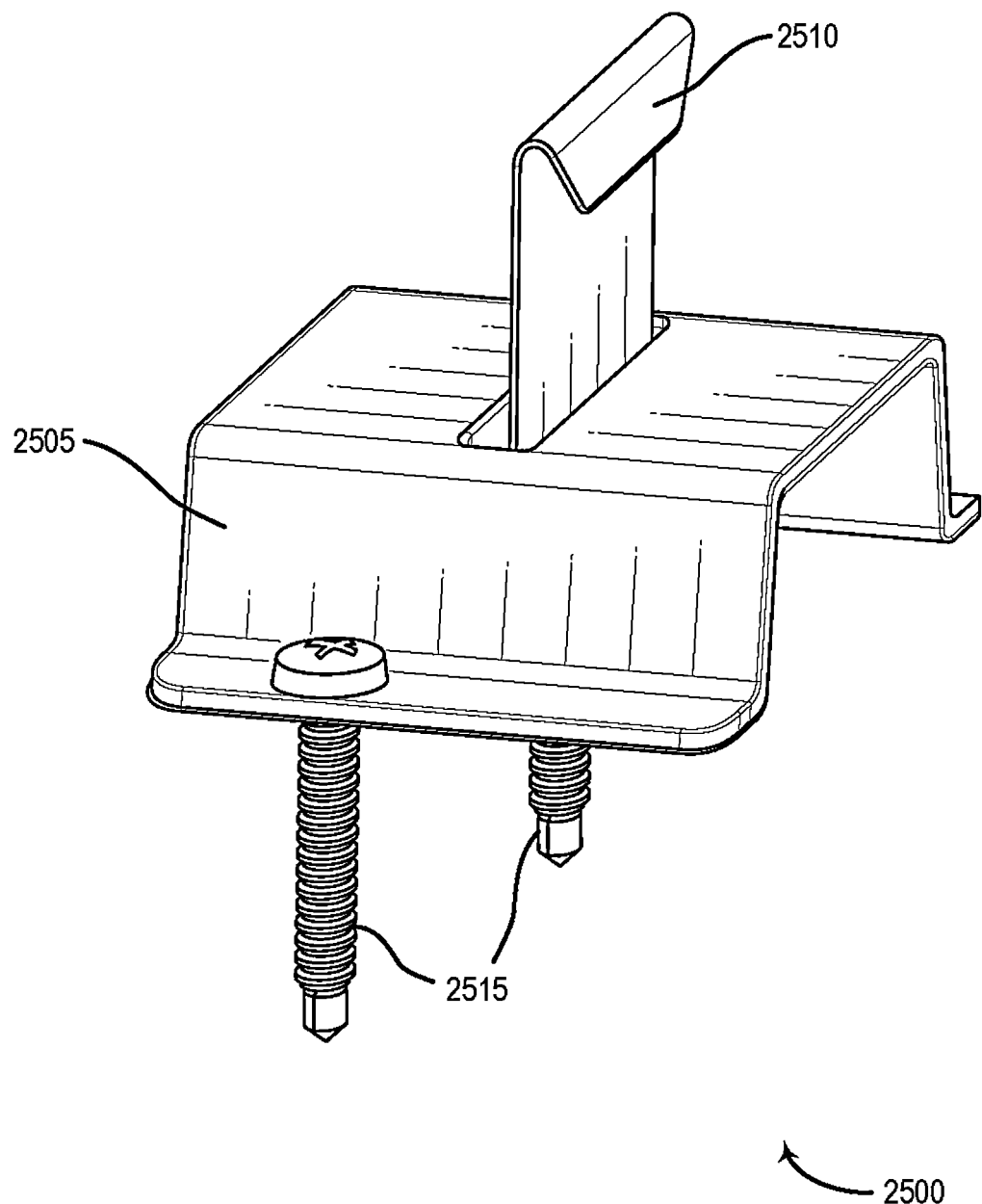
FIG. 25 shows an example of a spacer block assembly according to aspects of the present disclosure.

FIG. 25 shows an example of a spacer block assembly 2500 according to aspects of the present disclosure. In FIG. 25, an example of a spacer block assembly 2500 is shown. A spacer block assembly 2500 may include spacer block 2505, spacer block clip 2510, and a plurality of fasteners 2515. In one aspect, spacer block assembly 2500 includes spacer block 2505, spacer block clip 2510, and fastener 2515.

Spacer block 2505 is an example of, or includes aspects of, the corresponding element described with reference to FIGS. 22, 27, 28, and 35. Fastener 2515 is an example of, or includes aspects of, the corresponding element described with reference to FIGS. 22, 23, 27, 28, and 30.

The spacer block 2505 may provide a support structure for the raised shelf that supports the solar panel modules (e.g., above roof elevations). Additionally, the spacer block 2505 may provide an additional attachment point to the roofing panels. In some examples, the spacer block 2505 may be implemented without the spacer block clip 2510.

In some examples, the spacer block 2505 has two generally vertical leg portions and a generally horizontal center portion (e.g., forming a general U-shape, for example, as shown in FIG. 25). In some aspects, a flange may extend outward from the end (e.g., bottom) of each leg. The spacer block clip 2510 has a lower horizontal flange and a generally vertical portion which terminates in a clip-shape configured to interlock with a snap-lock standing seam. Generally, the snap-lock/spacer block clip 2510 locking geometry may be of any suitable shape and the flange of the spacer block clip 2510 may be securely fastened to the horizontal portion of the spacer block 2505 by any fastening method adequate for the anticipated service and loading requirements (e.g., such as any welding, adhesive, or mechanical fastening). In the example of FIG. 25, for instance, the spacer block clip 2510 may be attached to the spacer block 2505 by spot welding. In some cases, the vertical clip may be a lighter gauge designed to resist a tensile load and to be thin enough to fit within a shape of the nesting roof panel seam clip profile. The spacer block 2505 may be designed to resist a compressive load imposed by the module clamp to the module frame which is communicated through the roofing panel to the clip. In some cases, roof clips for metal roofs may be used in tension to secure the roof to an underlying roof structure (e.g., such as plywood sheeting to keep the roof from blowing off, counteracting wind uplift and slippage, all without exposed fasteners 2515). According to the techniques and designs described herein, in addition to similarly concealing the fasteners 2515 and keeping the roof from blowing off, the spacer block clips 2510 also are designed to withstand the forces necessary to keep the solar panel modules secured to the roof.

In the example of FIGS. 23 and 25, a spacer block assembly 2500 may be fastened to a roof underlayment/structure below. The folded edge portion of the interior edge of the snap-lock standing seam first roof panel is fitted from below into the upper clip portion of the spacer block clip 2510. Then the space in the folded edge portion of the exterior edge of the snap-lock standing seam second roof panel may be snapped over the upper clip portion of the spacer block clip 2510 (e.g., resulting in the assembly of FIG. 23).

For example, lower flanges of a spacer block 2505 may be seated on underlying roofing, and the lower flanges may be attached by any fastening method (e.g., any fastening method suitable for anticipated service and loading requirements, such as by welding methods, adhesive methods, mechanical fastening methods, etc.). In the example of FIG. 25, a fastening method may include at least one threaded fastener 2515 screwed through the flange (e.g., and into an underlying roofing structure below).

Figure 26:
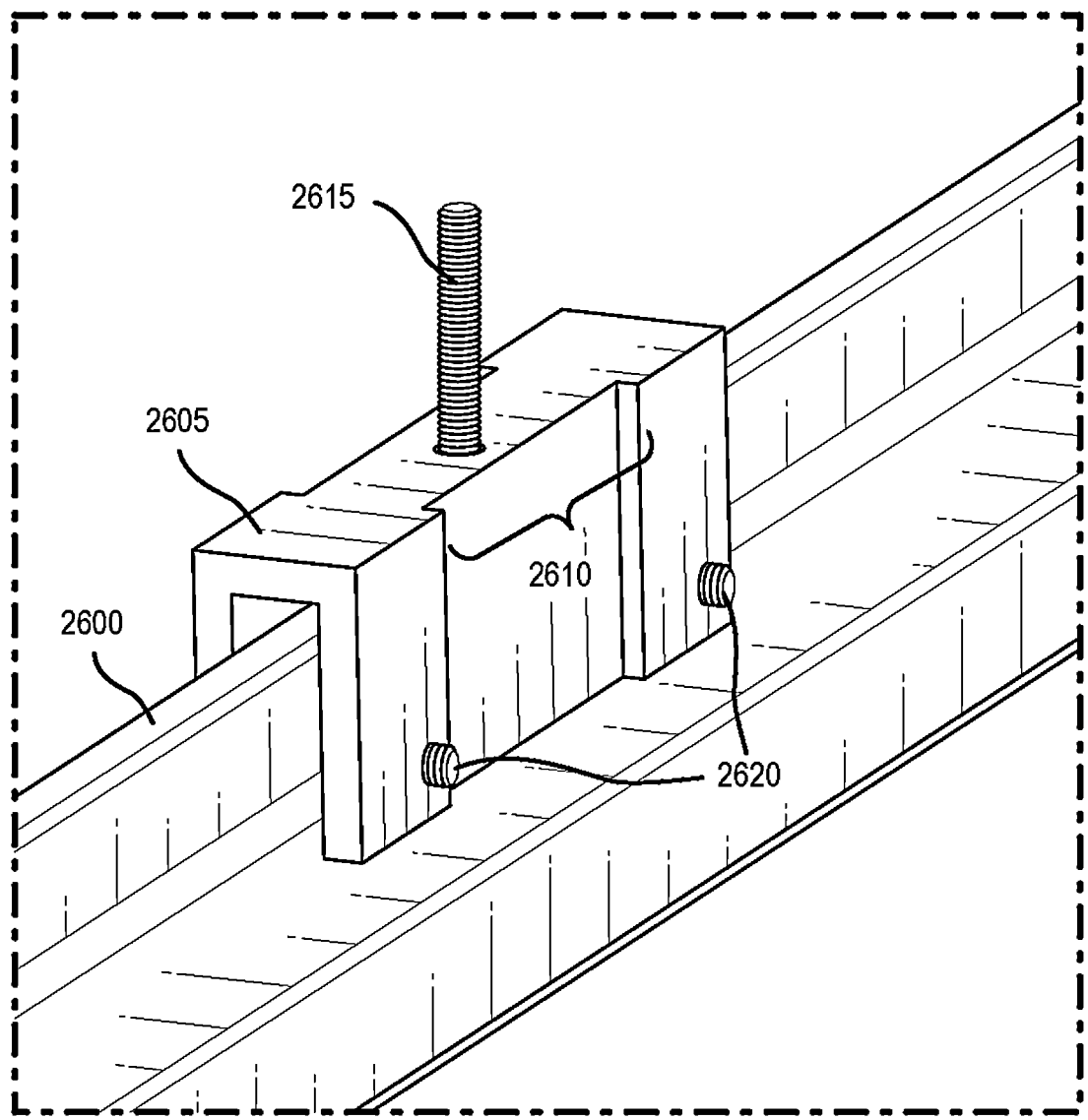
FIG. 26 shows an example of a standing seam clip according to aspects of the present disclosure.

FIG. 26 shows an example of a standing seam clip according to aspects of the present disclosure. The example shown includes continuous panel joint 2600, standing seam clip 2605, stud 2615, and set screws 2620.

Continuous panel joint 2600 is an example of, or includes aspects of, the corresponding element described with reference to FIGS. 22-24, 27, 28, 31-33, 35, 36, 38, and 41. Standing seam clip 2605 is an example of, or includes aspects of, the corresponding element described with reference to FIGS. 22, 23, 27, 28, and 34-36. In one aspect, standing seam clip 2605 includes recessed portion 2610. Stud 2615 is an example of, or includes aspects of, the corresponding element described with reference to FIG. 24. Set screws 2620 is an example of, or includes aspects of, the corresponding element described with reference to FIGS. 22, 24, 27, and 28.

In some examples, a seam clip may include continuous sides (e.g., as shown in FIG. 26). In the example of FIG. 26, the U-shape (e.g., the inverted U-shape) of the seam clip is continuous along the length of the standing seam clip 2605, with a middle recessed portion 2610 on each exterior side face. The recessed portion 2610 on each side of the seam clip may be configured to serve as a guide for, and to receive, a corresponding leg of an astragal clip. In some aspects, the example of FIG. 16 may result in the same functionality with an extruded and milled part (e.g., rather than a stamp formed metal part). Depending on the roofing material or performance requirements, different materials may be selected to perform the desired function by analogy, without departing from the scope of the present disclosure.

Figure 27:
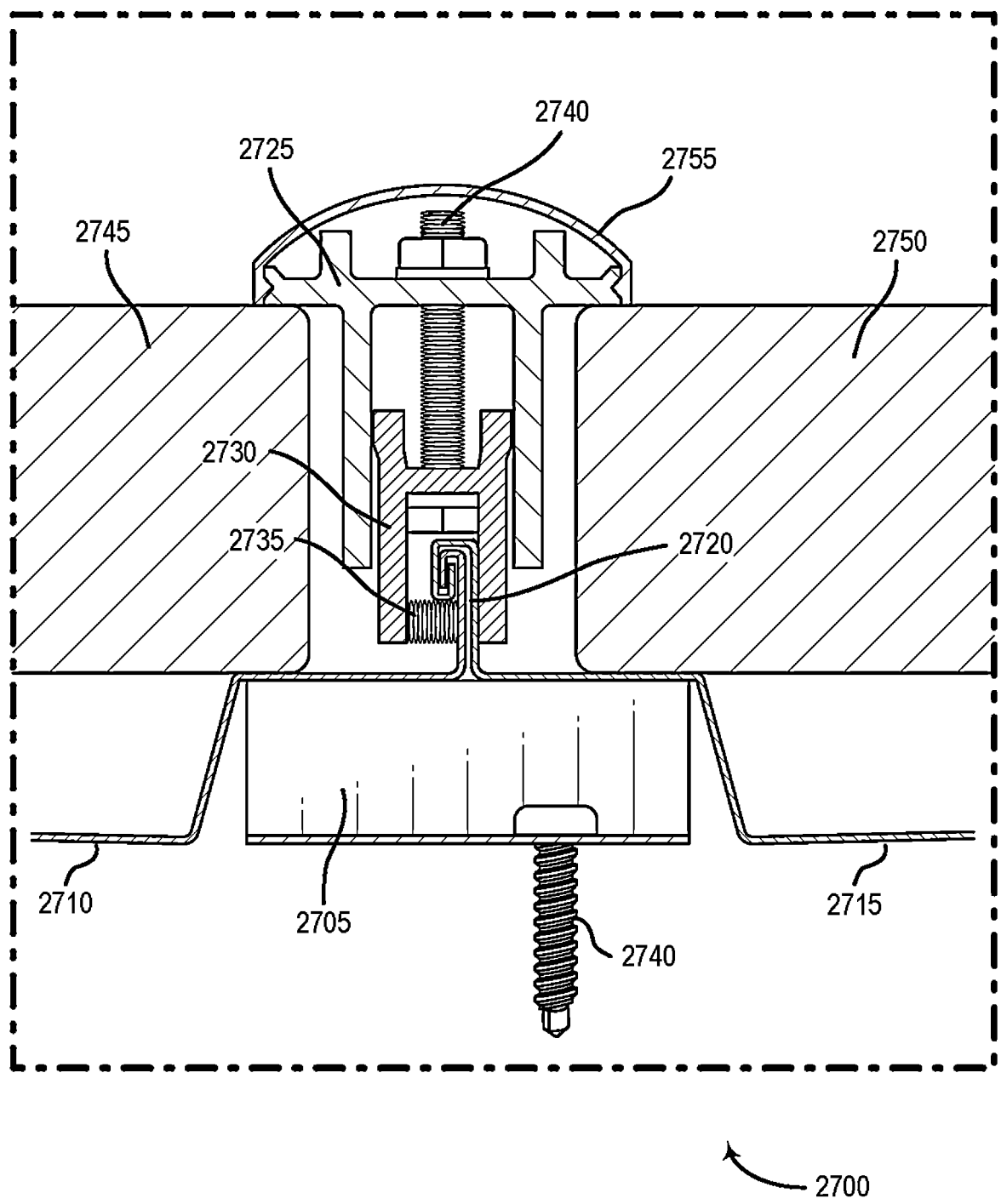
FIGS. 27 through 28 show examples of a solar panel installation system according to aspects of the present disclosure.

FIG. 27 shows an example of a solar panel installation system 2700 according to aspects of the present disclosure. Solar panel installation system 2700 is an example of, or includes aspects of, the corresponding element described with reference to FIGS. 20-24, 28-38, 40, and 41. In one aspect, solar panel installation system 2700 includes spacer block 2705, left roof panel 2710, right roof panel 2715, continuous panel joint 2720, astragal clip 2725, standing seam clip 2730, set screws 2735, fastener 2740, left solar panel module 2745, right solar panel module 2750, and weathercap 2755.

Spacer block 2705 is an example of, or includes aspects of, the corresponding element described with reference to FIGS. 22, 25, 28, and 35. Left roof panel 2710 is an example of, or includes aspects of, the corresponding element described with reference to FIGS. 22, 23, 28, 31-34, 38, and 40-42. Right roof panel 2715 is an example of, or includes aspects of, the corresponding element described with reference to FIGS. 22, 23, 28, 31-34, 38, 40, and 41. Continuous panel joint 2720 is an example of, or includes aspects of, the corresponding element described with reference to FIGS. 22-24, 26, 28, 31-33, 35, 36, 38, and 41. Astragal clip 2725 is an example of, or includes aspects of, the corresponding element described with reference to FIGS. 20-23, 28, 30, and 34-36. Standing seam clip 2730 is an example of, or includes aspects of, the corresponding element described with reference to FIGS. 22, 23, 26, 28, and 34-36. Set screws 2735 is an example of, or includes aspects of, the corresponding element described with reference to FIGS. 22, 24, 26, and 28. Fastener 2740 is an example of, or includes aspects of, the corresponding element described with reference to FIGS. 22, 23, 25, 28, and 30. Left solar panel module 2745 is an example of, or includes aspects of, the corresponding element described with reference to FIGS. 20-23, 28, 30, 31, 34, 37, 38, 40, 41, and 43. Right solar panel module 2750 is an example of, or includes aspects of, the corresponding element described with reference to FIGS. 20, 23, 28, 30, 34, 37, 38, 40, and 41. Weathercap 2755 is an example of, or includes aspects of, the corresponding element described with reference to FIGS. 23, 28, 30, 34, and 37.

FIG. 27 shows another example of a standing seam clip 2730 (e.g., where the standing seam clip 2730 may be used with a standing seam). In this example embodiment, a spacer block 2705 assembly may include only a spacer block 2705 and one or more fasteners 2740.

In some examples of a standing seam continuous panel joint 2720, joined edges of the roof panels are folded over to one side. For instance, in the example of FIG. 27, joined edges of the left roof panel 2710 and the right roof panel 2715 are folded over to the left side (e.g., joined edges are folded over towards the left roof panel 2710). As such, in some cases, the standing seam may be offset from the center of the spacer block 2705 in order to align the centerline of the astragal clip 2725 and the standing seam clip 2730 with the centerline of the spacer block 2705.

In some examples, a standing seam clip 2730 may have a H-shaped cross-section, with the cross-section consistent (e.g., continuous) throughout the length of the clip (e.g., although portions of the sides may be cut out and/or the standing seam clip 2730 may be in an inverted-U shape, such as in the example of FIG. 22).

The standing seam clip 2730 may include one or more holes in the left lower side of the H-shape, and each hole may be configured to receive a set screw. One or more set screws 2735 may be tightened to secure the standing seam between the set screw and the opposite H-leg of the standing seam clip 2730 (e.g., as shown in FIG. 27). The securing of the standing seam between the set screw and the H-leg may fasten the assembly of the astragal clip 2725/standing seam clip 2730 to the roof assembly, where the connection may restrain against both vertical and horizontal movement and forces.

In some examples, the astragal clip 2725 may be located (e.g., configured) above the standing seam clip 2730, with the standing seam clip 2730 located between the two astragal clip 2725 vertical ribs. A vertically-oriented threaded fastener 2740 may pass through a hole in the center portion of the astragal clip 2725 and the horizontal cross-portion of the standing seam clip 2730. A nut at the end of the threaded fastener 2740 may secure the astragal clip 2725 to the standing seam clip 2730.

By tightening the nut, the astragal clip 2725 may be placed in operative compressive engagement with the solar panel modules, as described in more detail herein.

Figure 28:
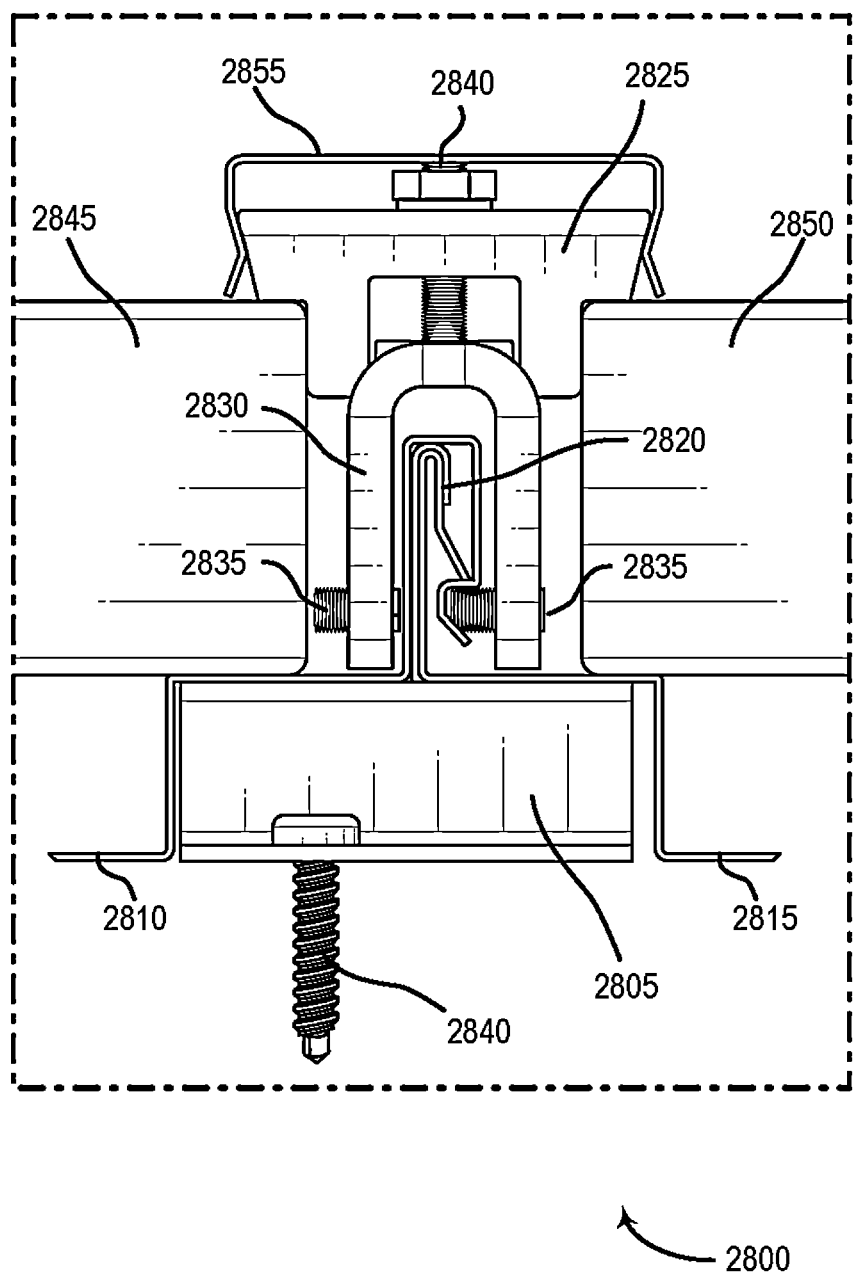

FIG. 28 shows an example of a solar panel installation system 2800 according to aspects of the present disclosure. Solar panel installation system 2800 is an example of, or includes aspects of, the corresponding element described with reference to FIGS. 20-24, 27, 29-38, 40, and 41. In one aspect, solar panel installation system 2800 includes spacer block 2805, left roof panel 2810, right roof panel 2815, continuous panel joint 2820, astragal clip 2825, standing seam clip 2830, set screws 2835, fastener 2840, left solar panel module 2845, right solar panel module 2850, and weathercap 2855.

Spacer block 2805 is an example of, or includes aspects of, the corresponding element described with reference to FIGS. 22, 25, 27, and 35. Left roof panel 2810 is an example of, or includes aspects of, the corresponding element described with reference to FIGS. 22, 23, 27, 31-34, 38, and 40-42. Right roof panel 2815 is an example of, or includes aspects of, the corresponding element described with reference to FIGS. 22, 23, 27, 31-34, 38, 40, and 41. Continuous panel joint 2820 is an example of, or includes aspects of, the corresponding element described with reference to FIGS. 22-24, 26, 27, 31-33, 35, 36, 38, and 41. Astragal clip 2825 is an example of, or includes aspects of, the corresponding element described with reference to FIGS. 20-23, 27, 30, and 34-36. Standing seam clip 2830 is an example of, or includes aspects of, the corresponding element described with reference to FIGS. 22, 23, 26, 27, and 34-36. Set screws 2835 is an example of, or includes aspects of, the corresponding element described with reference to FIGS. 22, 24, 26, and 27. Fastener 2840 is an example of, or includes aspects of, the corresponding element described with reference to FIGS. 22, 23, 25, 27, and 30. Left solar panel module 2845 is an example of, or includes aspects of, the corresponding element described with reference to FIGS. 20-23, 27, 30, 31, 34, 37, 38, 40, 41, and 43. Right solar panel module 2850 is an example of, or includes aspects of, the corresponding element described with reference to FIGS. 20, 23, 27, 30, 34, 37, 38, 40, and 41. Weathercap 2855 is an example of, or includes aspects of, the corresponding element described with reference to FIGS. 23, 27, 30, 34, and 37.

FIG. 28 shows one or more aspects of an example astragal clip 2825 that may be stamped from a sheet of material and formed into the astragal shape. For instance, a stamped portion may include a middle rectangular portion interposed between two lower legs and two upper legs. The lower legs and the upper legs may then be bent downward (e.g., to form an inverted-U shape). For instance, FIG. 28 may illustrate two lower legs extending downward from the horizontal middle portion of the astragal clip 2825, where each leg may include a notch forming the ledges of the astragal clip 2825.

In the example of FIG. 28, a weathercap 2855 may also be formed from a single stamped piece. For instance, a flat piece of weathercap 2855 may be bent on each side to form the side edges that engage with the recesses of the astragal clip 2825.

Figure 29:
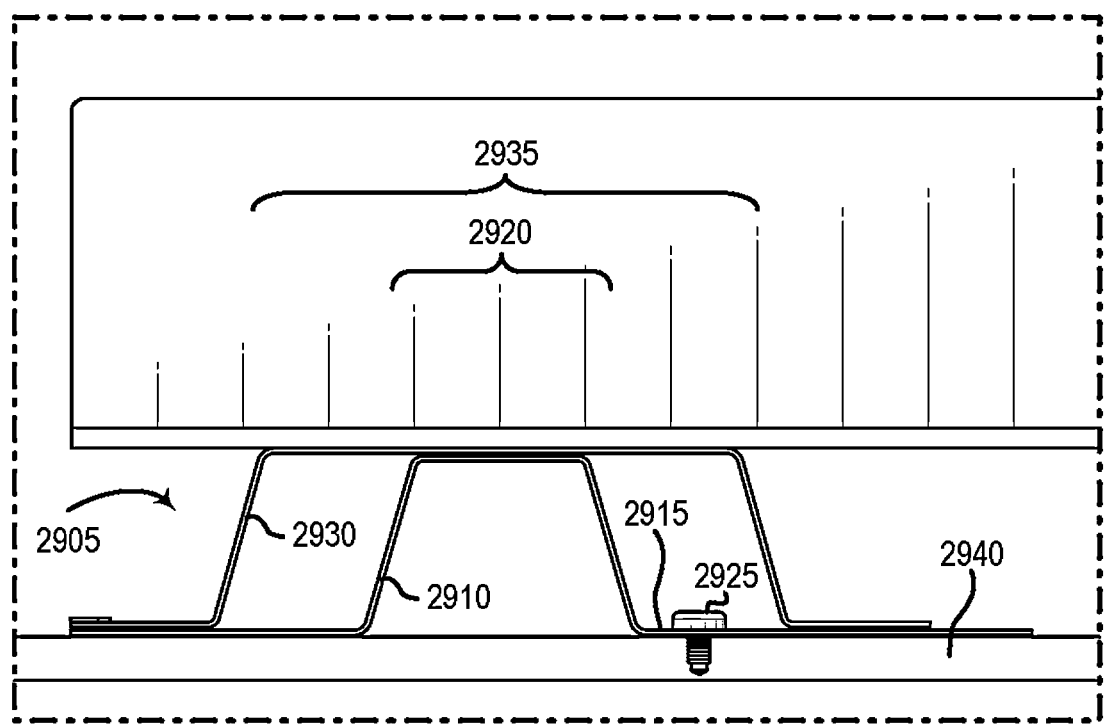
FIG. 29 shows an example of a sectional view of an example standing seam roof overlap according to aspects of the present disclosure.

FIG. 29 shows an example of a sectional view of an example standing seam roof overlap according to aspects of the present disclosure. Solar panel installation system 2900 is an example of, or includes aspects of, the corresponding element described with reference to FIGS. 20-24, 27, 28, 30-38, 40, and 41. In one aspect, solar panel installation system 2900 includes secondary support member 2905, lower roof panel 2910, screw 2925, upper roof panel 2930, and sheeting 2940.

In one aspect, lower roof panel 2910 includes lower flange 2915 and narrow folded portion 2920. In one aspect, upper roof panel 2930 includes wide folded portion 2935.

FIG. 29 illustrates a sectional view of an example standing seam roof overlap. The standing seam roof overlap illustrates one or more aspects of roof overlaps described herein (e.g., with reference to FIGS. 9, 11, and 18).

In some examples, a secondary support member 2905 may be formed by the overlap of the standing seam roof panels and the lower panel may have a narrow folded portion 2920 that is then enclosed by the wide folded portion 2935 of the upper panel. The wide folded portion 2935 of the upper panel is thereby supported by the narrow folded portion 2920 of the lower panel. In some cases, a lower flange 2915 extending horizontally from the end of the narrow folded portion 2920 may be coupled to the underlying sheeting 2940 by a screw 2925.

Figure 30:
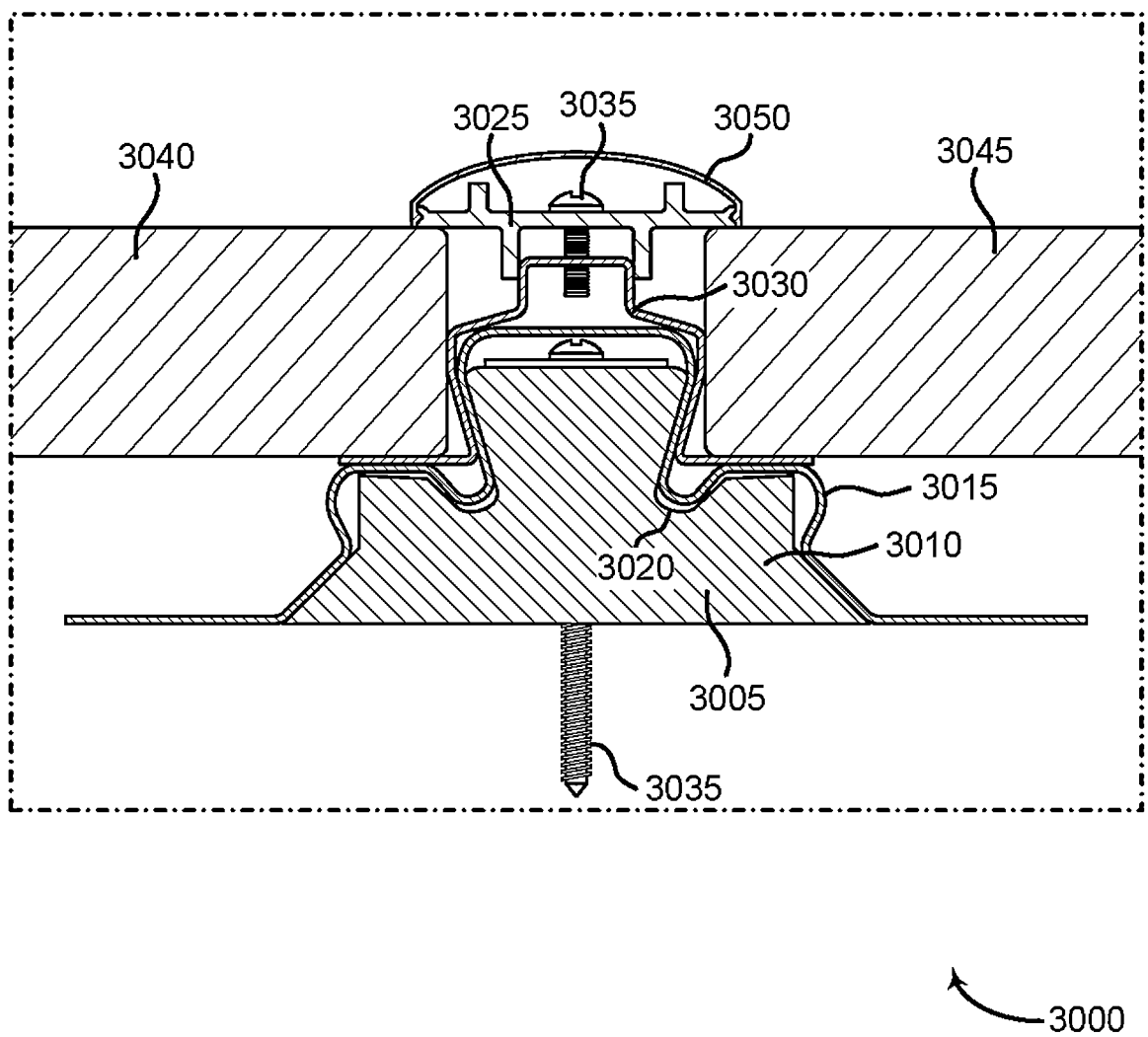
FIG. 30 shows an example of a solar panel installation system according to aspects of the present disclosure.

FIG. 30 shows an example of a solar panel installation system 3000 according to aspects of the present disclosure. Solar panel installation system 3000 is an example of, or includes aspects of, the corresponding element described with reference to FIGS. 20-24, 27-29, 31-38, 40, and 41. In one aspect, solar panel installation system 3000 includes mounting curb 3005, astragal clip 3025, curb clip 3030, fastener 3035, left solar panel module 3040, right solar panel module 3045, and weathercap 3050.

In one aspect, mounting curb 3005 includes shaped portion 3010, membrane cap 3015, and profile dip 3020. Astragal clip 3025 is an example of, or includes aspects of, the corresponding element described with reference to FIGS. 20-23, 27, 28, and 34-36. Fastener 3035 is an example of, or includes aspects of, the corresponding element described with reference to FIGS. 22, 23, 25, 27, and 28. Left solar panel module 3040 is an example of, or includes aspects of, the corresponding element described with reference to FIGS. 20-23, 27, 28, 31, 34, 37, 38, 40, 41, and 43. Right solar panel module 3045 is an example of, or includes aspects of, the corresponding element described with reference to FIGS. 20, 23, 27, 28, 34, 37, 38, 40, and 41. Weathercap 3050 is an example of, or includes aspects of, the corresponding element described with reference to FIGS. 23, 27, 28, 34, and 37.

Some roofing systems (e.g., such as some commercial roofs) may utilize a membrane of some type, for instance, to weatherize the roof. When a solar panel module is installed on such roofing systems, the solar panel module may be held in place (e.g., primarily by counterweight (ballast), which in some cases may exceed the bearing capacity of the structure). As such, some roofing systems (e.g., including some large commercial roofs) may not have sizable solar installations on them, as building structures may not have been designed to support additional loads that may be associated with such solar installations.

In some examples, to lessen the requirement for ballast, a solar installation may be secured with mounts (e.g., "hard mounts") including bolts and screws that may penetrate through the roof membrane to attach to structural members. However, such installations may significantly complicate and/or void the roof warranties (e.g., due to penetration of roof membranes that may compromise weather proofing). Further, roof leak risks may be undesirable due to large associated repair costs (e.g., and roofers may be demanded to keep leaks from occurring). As such, solar installations that pokes holes in a roofing system (e.g., in a membrane) or solar installations that significantly alter/impact a roofing system (e.g., for installing solar panel module/solar array support structures) may void roofing warranties. Therefore, such solar installations may be undesirable or inefficient for implementation on most roofing systems.

Alternatively, membrane designs described herein (e.g., such as the membrane design of FIG. 30) place the solid portion projection that is secured to the structure underneath the membrane instead of on top of it, thus facilitating secure and effective structural attachment without penetrations. Such allows for significant weight reduction in a roofing solar panel systems (e.g., from about 8 pounds per square foot down to less than 2.5 pounds per square foot), among other advantages. For instance, such techniques and designs may be applicable to larger roofing systems since no ballast is required. Further, such techniques and designs may provide significantly faster installation times for solar installers (e.g., as installation may be performed without identification and utilization of framing members, as such installations may be attached to sheeting only). Moreover, such techniques and designs may eliminate solar panel installation related warranty issues, since most manufacturers already have provisions for equipment mounting curbs 3005, and seams and metal cap flashing in their approved installation instructions.

In FIG. 30, a section of an example solar panel installation (e.g., using a curb assembly) is shown. The curb assembly comprises a shaped portion 3010 and a membrane cap 3015. In some embodiments the shaped portion 3010 comprises foam (e.g., such as expanded polystyrene or extruded polystyrene, as foam may be a cost-efficient material and applicable for roofing applications). Other suitable materials for the shaped portion 3010 that have the suitable properties may also be implemented by analogy, without departing from the scope of the present disclosure. While the example of FIG. 30 is illustrated as being solid, the shaped portion 3010 may also include one or more internal voids (e.g., in other examples).

The membrane cap 3015 in some embodiments comprises a detailing membrane (e.g., where the membrane caps 3015 may be between 30-60 mils). In some examples, the shape of the membrane cap 3015 may be pre-shaped (e.g., with heat) so that once the mounting curb 3005 is mechanically secured the membrane cap 3015 may be fitted precisely over the mounting curb 3005 (e.g., and then heat sealed to the primary roof membrane before the application of the curb clip 3030, module clamps, and weathercap 3050).

In some examples, the shape of a mounting curb 3005 may include a general inverted tee shape with a stem extending upwards and a lower shelf extending outwards on each side. The portion of the stem above the shelf level may include a wedge shape (e.g., wider at the top and tapering downward to the intersection with the shelfs). In some examples, the intersection between the base of the stem and the shelf may be rounded, the base of each shelf may taper outwards as it meets the roofing below, the outer surface of the mounting curb 3005 may form a first profile, etc. (e.g., aspects of which are shown in the example of FIG. 30).

The membrane cap 3015 may form a second profile that is similar to, but not exactly the same as, the first profile. For instance, the second profile may closely follow the first profile at the outward shelf tapers, the horizontal shelf surfaces, and the sides of the stem (e.g., but in other locations the profile may form a gap between the membrane cap 3015 and the mounting curb 3005, as shown in the example of FIG. 30). For instance, the gaps may be placed (e.g., designed) to allow the membrane room to conform to the shape of the mounting curb 3005 as the continuous curb clip 3030 is first placed over it, providing an initial squeeze to form it over the mounting curb 3005 (e.g., and then later, when the modules are secured, the membrane cap 3015 may be further compressed before the outer skirt portions are heat welded to the primary roof membrane).

During installation, the mounting curb 3005 may be fastened to the roofing/structure below using the vertical fastener 3035 screwed downwards through the mounting curb 3005 and into the roof sheeting below. Then the membrane cap 3015 may be installed over a solid portion of the mounting curb 3005. Prior to installation of the astragal clip 3025, the continuous curb clip 3030 may be snap-fit onto the mounting curb 3005 over the membrane cap 3015, thereby securing the curb clip 3030 and the membrane cap 3015 to the mounting curb 3005 attached to the membrane cap 3015 below. In some examples, the curb clip 3030 may extend the length of the mounting curb 3005 (e.g., or a substantial portion of the length of the mounting curb 3005) and may extend beyond the termination of the mounting curb 3005 below to the edge of the solar panel module which is attached to it above. As an example, the mounting curb 3005 may terminate by sloping at about a 45 degree angle (e.g., using standard means and methods to seal the membrane) inside a dripline of the solar panel module above where the detailing membrane is split, folded and heat welded. Underneath the solar array, provisions for conduit runs and water flows running against the direction of the mounting curbs 3005 may be created similarly by creating breaks in the mounting curb 3005 underneath the curb clip 3030 (e.g., using the same method used at the perimeter terminations). In some examples, such gaps underneath the solar panel module/solar array may be as wide as 6 feet (e.g., given the dimensions and spanning/mounting demands of standard aluminum framed solar panel modules).

The curb clip 3030 may include the lower legs in the wedge-shape configured to snap-lock to the similarly-shaped stem. The upper portion of the curb clip 3030 may have a raised center portion configured to provide a space to receive the lower portion of the astragal fastener 3035 without contacting the sheet metal outer covering below.

The astragal clip 3025 (e.g., which, in the example of FIG. 30 may be of a short length and may be spaced along the curb clip 3030) may be coupled to the curb clip 3030 by the astragal fastener 3035 which is screwed into the curb clip 3030 below, as shown in the example of FIG. 30. Thus, the astragal clip 3025 may be placed (e.g., configured) in operative compressive engagement with the solar panel modules, as described in more detail herein (e.g., with reference to FIGS. 1-20). The astragal clip 3025 in the example of FIG. 30 may have shorter ribs extending downwards (e.g., in order to not interfere with the curb clip 3030 below). The astragal ribs (e.g., the ribs of the astragal clip 3025) may be spaced apart to allow the center portion of the curb clip 3030 to fit between the astragal ribs and to provide positive alignment to orient the astragal clips 3025 to facilitate installation of the weathercap 3050.

Figure 31:
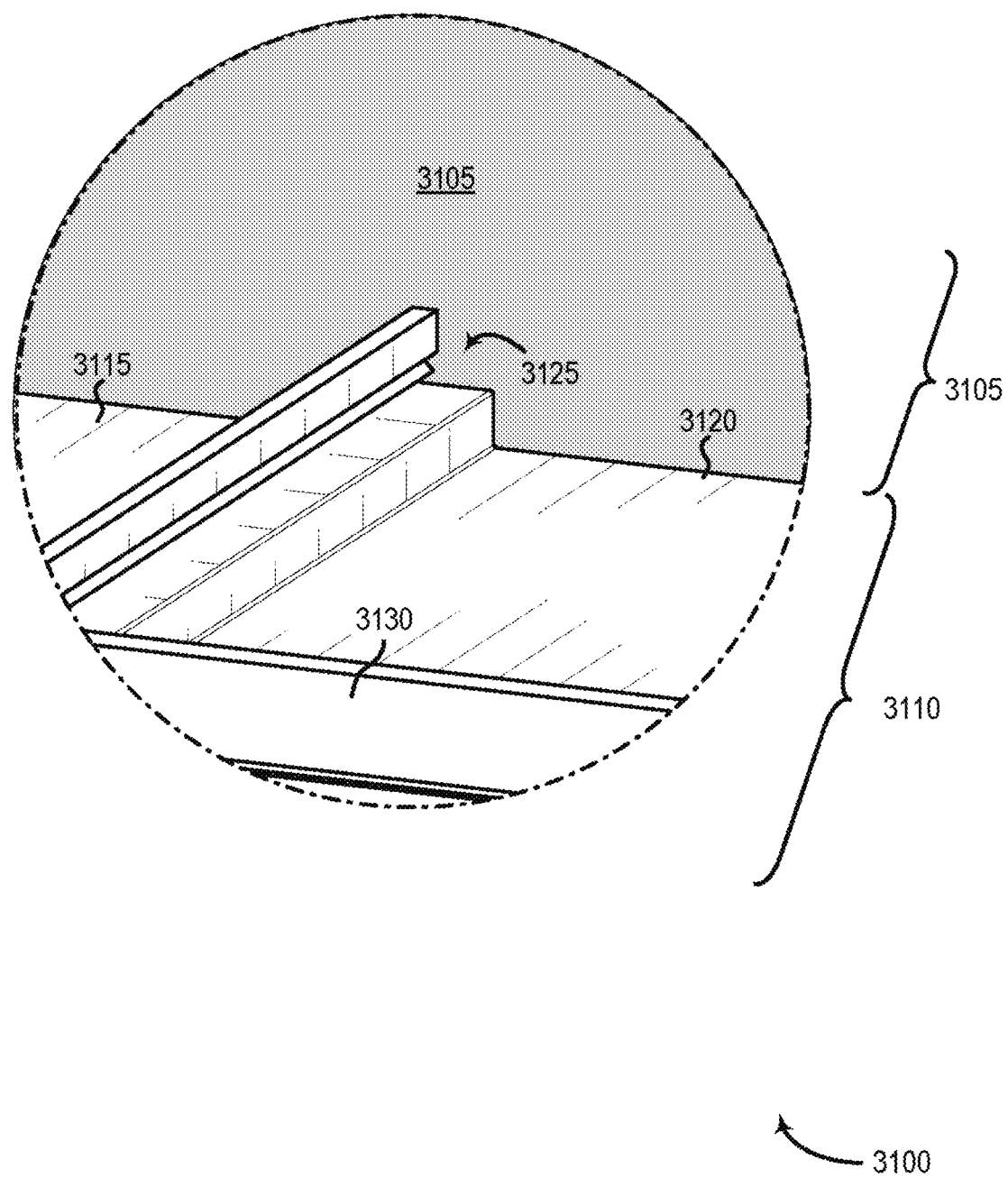
FIG. 31 shows an example of an intersection between a roof panel of existing roofing and a standing seam solar roof according to aspects of the present disclosure.

FIG. 31 shows an example of an intersection between a roof panel of existing roofing and a standing seam solar roof 3110 according to aspects of the present disclosure. Solar panel installation system 3100 is an example of, or includes aspects of, the corresponding element described with reference to FIGS. 20-24, 27-30, 32-38, 40, and 41. In one aspect, solar panel installation system 3100 includes existing roof 3105, standing seam solar roof 3110, and solar panel module 3130.

In one aspect, standing seam solar roof 3110 includes left roof panel 3115, right roof panel 3120, and continuous panel joint 3125. Left roof panel 3115 is an example of, or includes aspects of, the corresponding element described with reference to FIGS. 22, 23, 27, 28, 32-34, 38, and 40-42. Right roof panel 3120 is an example of, or includes aspects of, the corresponding element described with reference to FIGS. 22, 23, 27, 28, 32-34, 38, 40, and 41. Continuous panel joint 3125 is an example of, or includes aspects of, the corresponding element described with reference to FIGS. 22-24, 26-28, 32, 33, 35, 36, 38, and 41. Solar panel module 3130 is an example of, or includes aspects of, the corresponding element described with reference to FIGS. 20-23, 27, 28, 30, 34, 37, 38, 40, 41, and 43.

FIG. 31 illustrates an intersection between a roof panel of existing roofing and a standing seam solar roof 3110 (e.g., before an inventive transition flashing is installed). In the example of FIG. 31, at the edge of the solar panel roof assembly comprising the right roof panel 3120 and the left roof panel 3115 joined together with the standing seam, the raised portions of the roof panels that form the support shelves and the standing seam terminate above the existing roofing surface (e.g., such that a transition may be implemented that provides a waterproof seal to roof panel portions that are located above the existing roofing).

Figure 32:
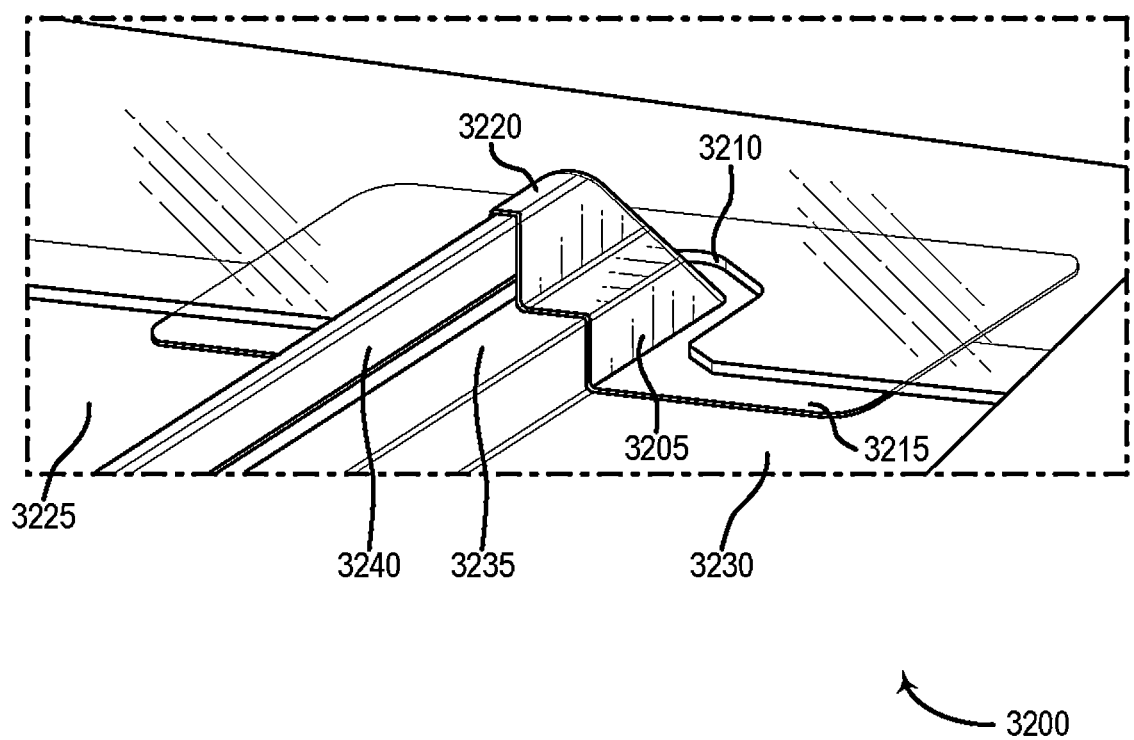
FIGS. 32 through 33 show examples of a roof transition with transition flashing installed according to aspects of the present disclosure.

FIG. 32 shows an example of a roof transition with transition flashing 3205 installed according to aspects of the present disclosure. Solar panel installation system 3200 is an example of, or includes aspects of, the corresponding element described with reference to FIGS. 20-24, 27-31, 33-38, 40, and 41. In one aspect, solar panel installation system 3200 includes transition flashing 3205, left roof panel 3225, right roof panel 3230, support shelf 3235, and continuous panel joint 3240.

Transition flashing 3205 is an example of, or includes aspects of, the corresponding element described with reference to FIG. 33. In one aspect, transition flashing 3205 includes notch 3210, flat portion 3215, and contoured portion 3220. Notch 3210 is an example of, or includes aspects of, the corresponding element described with reference to FIG. 33. Flat portion 3215 is an example of, or includes aspects of, the corresponding element described with reference to FIG. 33. Contoured portion 3220 is an example of, or includes aspects of, the corresponding element described with reference to FIG. 33. eft roof panel 3225 is an example of, or includes aspects of, the corresponding element described with reference to FIGS. 22, 23, 27, 28, 31, 33, 34, 38, and 40-42. Right roof panel 3230 is an example of, or includes aspects of, the corresponding element described with reference to FIGS. 22, 23, 27, 28, 31, 33, 34, 38, 40, and 41. Support shelf 3235 is an example of, or includes aspects of, the corresponding element described with reference to FIGS. 34, 40, and 41. Continuous panel joint 3240 is an example of, or includes aspects of, the corresponding element described with reference to FIGS. 22-24, 26-28, 31, 33, 35, 36, 38, and 41.

Figure 33:
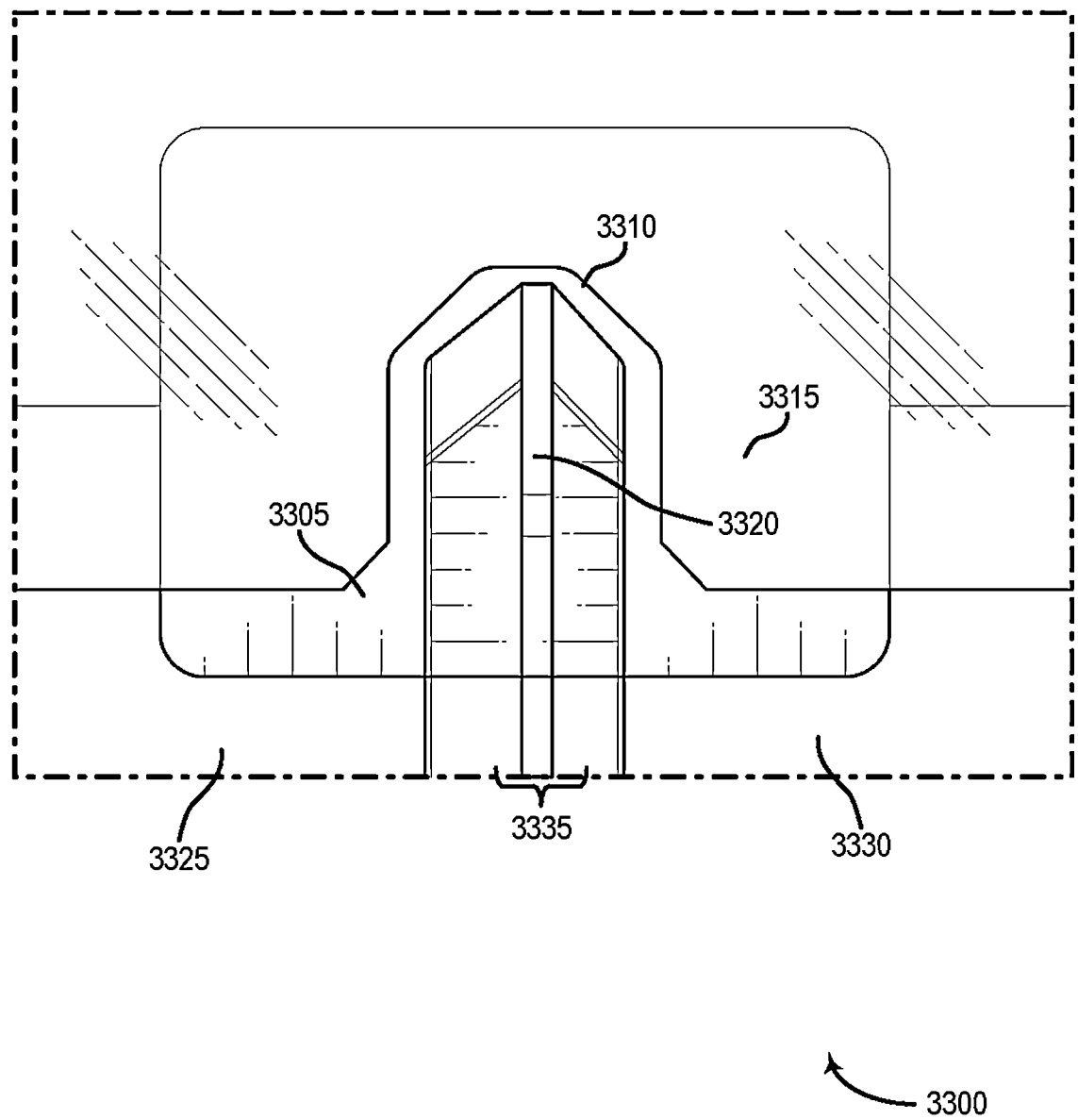

FIG. 33 shows an example of a roof transition with transition flashing 3305 installed according to aspects of the present disclosure. Solar panel installation system 3300 is an example of, or includes aspects of, the corresponding element described with reference to FIGS. 20-24, 27-32, 34-38, 40, and 41. In one aspect, solar panel installation system 3300 includes transition flashing 3305, left roof panel 3325, right roof panel 3330, and continuous panel joint 3335.

Transition flashing 3305 is an example of, or includes aspects of, the corresponding element described with reference to FIG. 32. In one aspect, transition flashing 3305 includes notch 3310, flat portion 3315, and contoured portion 3320. Notch 3310 is an example of, or includes aspects of, the corresponding element described with reference to FIG. 32. Flat portion 3315 is an example of, or includes aspects of, the corresponding element described with reference to FIG. 32. Contoured portion 3320 is an example of, or includes aspects of, the corresponding element described with reference to FIG. 32. Left roof panel 3325 is an example of, or includes aspects of, the corresponding element described with reference to FIGS. 22, 23, 27, 28, 31, 32, 34, 38, and 40-42. Right roof panel 3330 is an example of, or includes aspects of, the corresponding element described with reference to FIGS. 22, 23, 27, 28, 31, 32, 34, 38, 40, and 41. Continuous panel joint 3335 is an example of, or includes aspects of, the corresponding element described with reference to FIGS. 22-24, 26-28, 31, 32, 35, 36, 38, and 41.

FIGS. 32 and 33 show an example roof transition with transition flashing 3305 installed. The transition flashing 3305 has a flat portion 3315 configured to align with the roof surface, and a contoured portion 3320 that matches the contour of the standing seam and the support shelf below. Beyond the end of the standing seam and the support shelf, the contoured portion 3320 may taper down to the flat portion 3315 (e.g., as shown in the example of FIG. 32). In order to accommodate the contoured portion 3320, a notch 3310 may be cut in the existing roofing material as shown. To install the transition flashing 3305, the notch 3310 may be cut in the existing roofing. The forward edge of the transition flashing 3305 may be slid under the roofing edge, with the rear end of the transition flashing 3305 angled upwards. The rear end may then be lowered and the contoured portion 3320 may be snap-locked onto the seam/support shelf. Additionally (or alternatively), the transition may be screwed to the roofing/structure below.

Such roof transition flashing 3305 may be formed specifically to accommodate roof type transition applications where solar panel systems described herein may be implemented with (e.g., tied into) existing roofing systems (e.g., such that one or more aspects of the improved solar panel systems described herein may be implemented alongside existing roofing). This enables solar installers to use the solar panel systems quickly and effectively as a substitute for industry standard dedicated solar-only racking. In circumstances where the solar panel support system is installed as solar racking (e.g., only under the extent of the solar array), the transition between the existing roofing and the new solar panel roof system may be constructed in a manner consistent with industry accepted means and methods which demand flashing in order comply with code. Although some racking systems offer flashings for use at points of attachment for racking systems where lag bolts are driven through the roof into structural members below, in practice such flashings may not be desirable due to installation difficulties, and penetrations are instead weatherized only with sealant (e.g., which may not be an accepted means of weatherizing a penetration, may void warranties and/or insurance, etc.). The transition flashing 3305 techniques and designs described herein may provide an easily installed flashing in accordance with industry-standard flashing requirements.

FIG. 34 shows an example of a solar panel support system using standing seam structural insulated panels according to aspects of the present disclosure. Solar panel installation system 3400 is an example of, or includes aspects of, the corresponding element described with reference to FIGS. 20-24, 27-33, 35-38, 40, and 41. In one aspect, solar panel installation system 3400 includes left solar panel module 3405, right solar panel module 3410, left roof panel 3415, right roof panel 3420, weathercap 3425, astragal clip 3430, standing seam clip 3435, support shelf 3440, sheet metal extension 3445, male profile 3450, female profile 3455, and sealant gap 3460.

Left solar panel module 3405 is an example of, or includes aspects of, the corresponding element described with reference to FIGS. 20-23, 27, 28, 30, 31, 37, 38, 40, 41, and 43. Right solar panel module 3410 is an example of, or includes aspects of, the corresponding element described with reference to FIGS. 20, 23, 27, 28, 30, 37, 38, 40, and 41. Left roof panel 3415 is an example of, or includes aspects of, the corresponding element described with reference to FIGS. 22, 23, 27, 28, 31-33, 38, and 40-42. Right roof panel 3420 is an example of, or includes aspects of, the corresponding element described with reference to FIGS. 22, 23, 27, 28, 31-33, 38, 40, and 41. Weathercap 3425 is an example of, or includes aspects of, the corresponding element described with reference to FIGS. 23, 27, 28, 30, and 37. Astragal clip 3430 is an example of, or includes aspects of, the corresponding element described with reference to FIGS. 20-23, 27, 28, 30, 35, and 36. Standing seam clip 3435 is an example of, or includes aspects of, the corresponding element described with reference to FIGS. 22, 23, 26-28, 35, and 36. Support shelf 3440 is an example of, or includes aspects of, the corresponding element described with reference to FIGS. 32, 40, and 41.

Referring next to FIGS. 34A, 34B and 34C, a solar panel support system using standing seam structural insulated panels (SIP) is shown (e.g., in three sectional views).

In some examples, insulated panels may have a male profile 3450 at one end and a female profile 3455 at the other end (e.g., where the male profile 3450 and female profile 3455 are configured to interlock, with the standing seam version also including a sheet metal extension 3445 at each end). The sheet metal extensions 3445 may be seamed in the field or snap locked, for instance, depending on a manufacturer's configuration of the lap to form a standing seam.

In the example shown in FIGS. 34A, 34B and 34C, the top profile of the insulated panel at the standing seam interlock may be adapted to serve as a support shelf 3440 for solar panel modules. An astragal clip 3430, standing seam clip 3435, and weathercap 3425 may be installed to attach the solar panel modules to the insulated panels (e.g., as described in more detail elsewhere herein).

As shown in FIGS. 34A and 34C, the end of each insulated panel distal to the solar panel support location may have a profile that allows for lateral adjustment with the abutting panel. The example profiles shown in FIGS. 34A and 34C are interlocking toothed profiles, however other types of connections that allow for variation in solar panel widths may be implemented by analogy, without departing from the scope of the present disclosure. In some examples, a sealant gap 3460 may be formed at an underside of the abutting panels.

Figure 35:
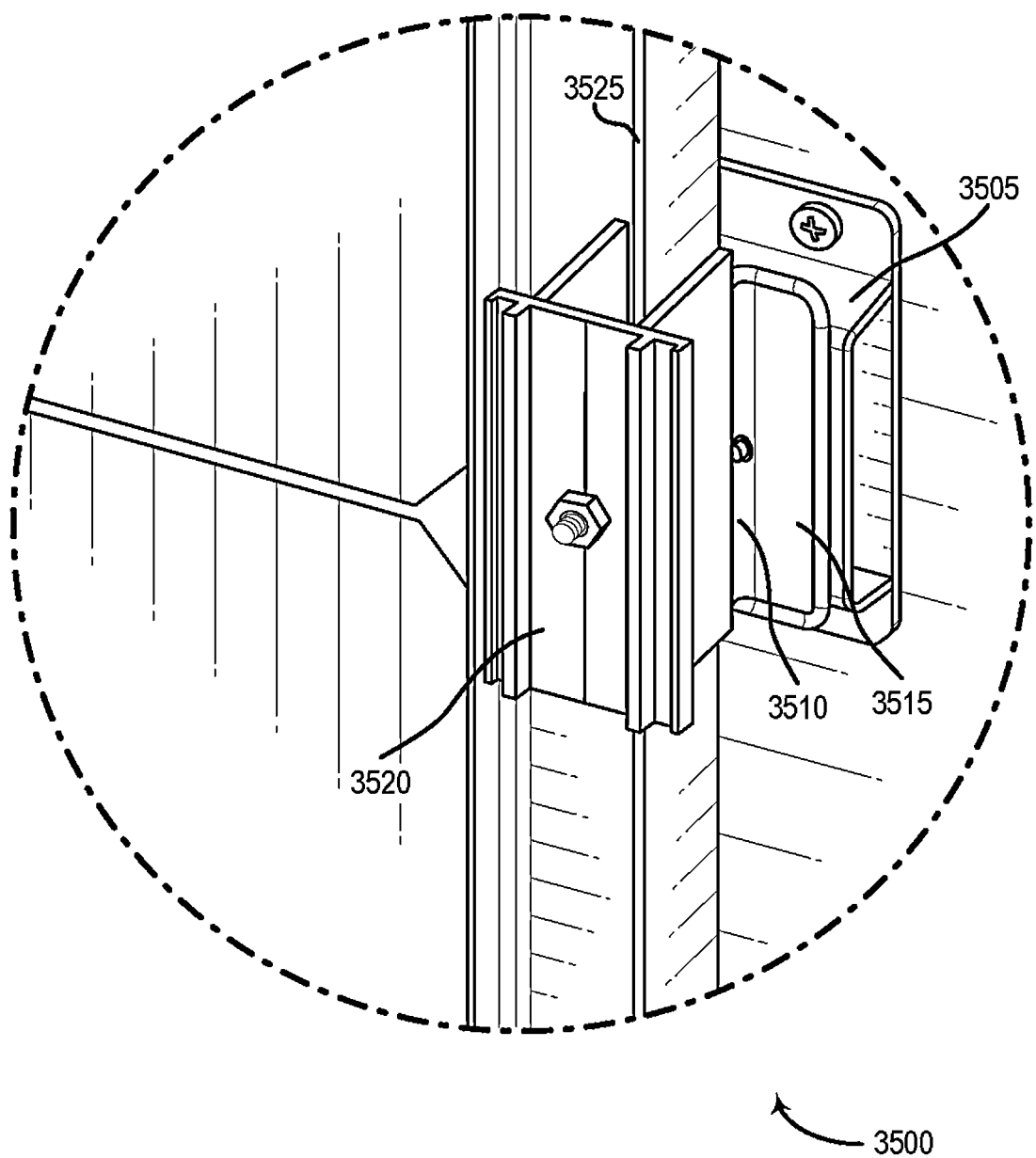
FIGS. 35 through 36 show examples of a perspective view of a solar panel system installed in a one example of a non-roof application according to aspects of the present disclosure.

FIG. 35 shows an example of a perspective view of a solar panel system installed in a one example of a non-roof application according to aspects of the present disclosure. Solar panel installation system 3500 is an example of, or includes aspects of, the corresponding element described with reference to FIGS. 20-24, 27-34, 36-38, 40, and 41. In one aspect, solar panel installation system 3500 includes spacer block 3505, standing seam clip 3510, flange 3515, astragal clip 3520, and continuous panel joint 3525.

Spacer block 3505 is an example of, or includes aspects of, the corresponding element described with reference to FIGS. 22, 25, 27, and 28. Standing seam clip 3510 is an example of, or includes aspects of, the corresponding element described with reference to FIGS. 22, 23, 26-28, 34, and 36. Flange 3515 is an example of, or includes aspects of, the corresponding element described with reference to FIG. 36. Astragal clip 3520 is an example of, or includes aspects of, the corresponding element described with reference to FIGS. 20-23, 27, 28, 30, 34, and 36. Continuous panel joint 3525 is an example of, or includes aspects of, the corresponding element described with reference to FIGS. 22-24, 26-28, 31-33, 36, 38, and 41.

FIG. 35 shows a perspective view of a solar panel system installed in a one example of a non-roof application. That is, one or more aspects of solar support systems described herein may also be implemented in various non-roof applications. One or more aspects of inventive elements and systems described herein with regard to roofing systems are also applicable to non-roof exterior building elements, examples of which are described in more detail herein. For instance, solar panel systems may be installed as a wall cladding system, over existing exterior wall systems, etc.

An example solar panel support system supporting a solar panel module over a vertical standing seam metal wall panel system is shown in FIG. 35. As shown, the astragal clip 3520, standing seam clip 3510, and spacer block 3505 may be installed according to techniques described herein (e.g., as previously described with respect to standing seam roof embodiments, with the solar panel module edge compressively attached between the astragal clip 3520 and the spacer block 3505).

In the example of FIG. 35, the standing seam clip 3510 includes additional edge flanges 3515 extending outwards from the U-shaped portion of the standing seam clip 3510. The flanges 3515 serve to separate the compressive force securing the module to the clip from the forces resulting from securing the clip to the cladding. These flanges 3515 and the perpendicular tabs (e.g., shown in FIG. 36) may provide positive placement and additional compressive engagement capacity to secure the module to the clip.

Figure 36:
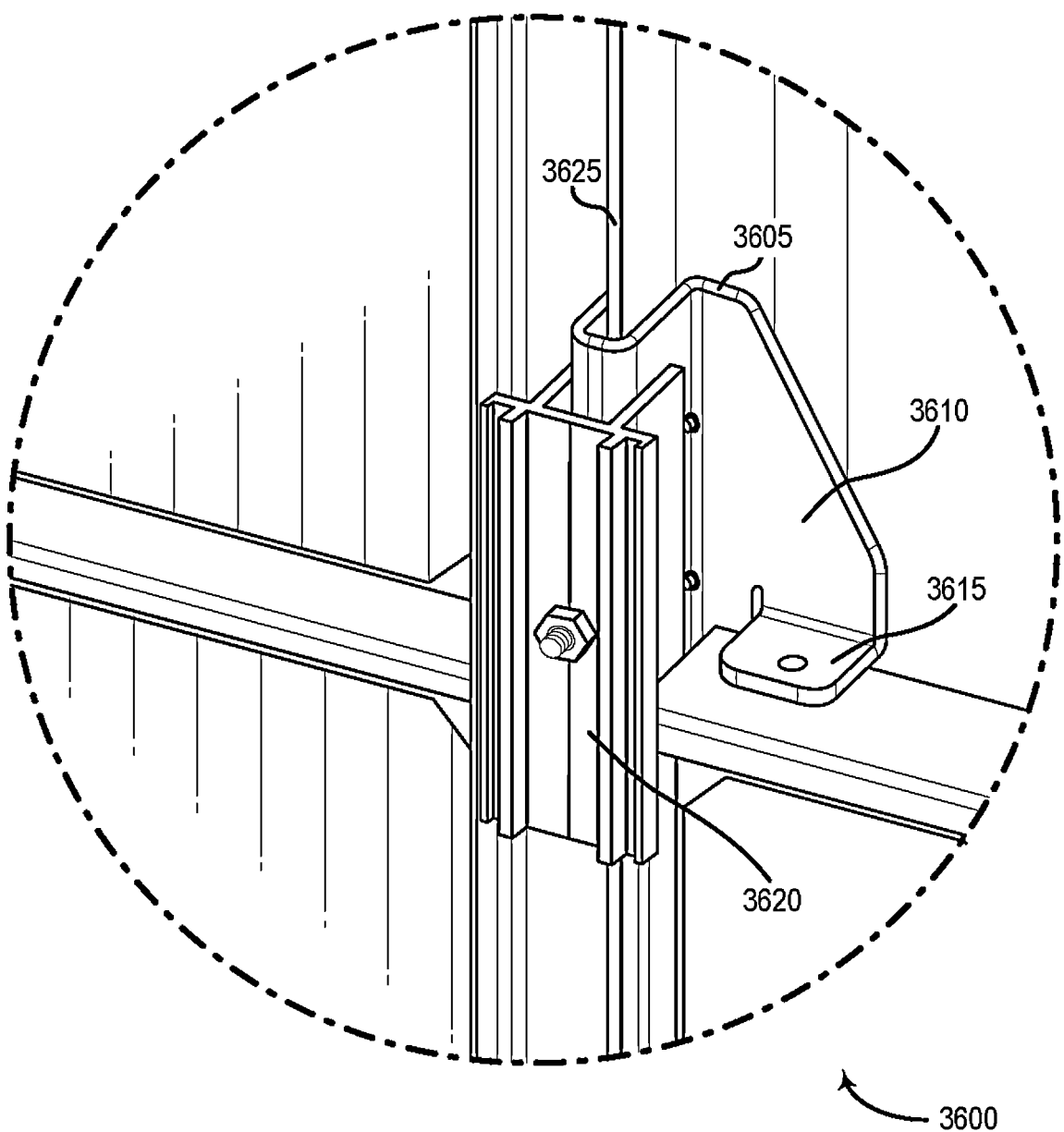

In some aspects, the clip design may provide the modules to be securely fastened to the vertical surface, such that the modules are held not only by the compressive force of the astragal clip 3520/standing seam clip 3510 connection, but also by the shelf support provided by the flange 3515 (e.g., as shown in FIG. 36). Firstly, the opposing offset set screw pattern (e.g., the offset set screw pattern described in more detail herein, for example, with reference to FIGS. 22-24) may crimp all the components together securely in the vertical dimension without puncturing the structure's weatherizing envelope system. Secondly, the astragal clip 3520/standing seam clip 3510 assembly compressively engages the module to itself. Thirdly, the flange 3515 provides a point of mechanical attachment (e.g., such as a screw to the module through a hole provided in the flange 3515) as well as additional security against slippage provided by setting the module on a shelf/ledge/flange 3515 (e.g., as shown in FIG. 36).

While a vertical wall system is shown in the example of FIGS. 35 and 36, it will be understood that the system may also be used for over or under vertical/curved/radiused walls, steeply sloped roofs, etc.

FIG. 36 shows an example of a perspective view of a solar panel system installed in a one example of a non-roof application according to aspects of the present disclosure. Solar panel installation system 3600 is an example of, or includes aspects of, the corresponding element described with reference to FIGS. 20-24, 27-35, 37, 38, 40, and 41. In one aspect, solar panel installation system 3600 includes standing seam clip 3605, flange 3610, perpendicular tab 3615, astragal clip 3620, and continuous panel joint 3625.

Standing seam clip 3605 is an example of, or includes aspects of, the corresponding element described with reference to FIGS. 22, 23, 26-28, 34, and 35. Flange 3610 is an example of, or includes aspects of, the corresponding element described with reference to FIG. 35. Astragal clip 3620 is an example of, or includes aspects of, the corresponding element described with reference to FIGS. 20-23, 27, 28, 30, 34, and 35. Continuous panel joint 3625 is an example of, or includes aspects of, the corresponding element described with reference to FIGS. 22-24, 26-28, 31-33, 35, 38, and 41.

In FIG. 36, a perspective view of a solar panel system installed in a second example of a non-roof application is shown.

In some aspects, the example shown in FIG. 36 is similar to (or analogous to) the example shown in FIG. 35 (e.g., with the exception of the standing seam clip 3605). In FIG. 36, the flanges 3610 of the standing seam clip 3605 are extended and each flange 3610 includes a perpendicular tab 3615 with a hole. In addition to the advantages described with respect to FIG. 35, the perpendicular tab 3615 of FIG. 36 may facilitate (e.g., speed up) installation. Further, the perpendicular tab 3615 of FIG. 36 may simplify the layout (e.g., by making it easy to see where modules will rest when the mounts are positioned and secured), may facilitate installation (e.g., by providing a place to rest the modules as they are installed), may assure positive permanent positioning with a provision for mechanical attachment of the module to the clip (e.g., screw hole), etc.

Figure 37:
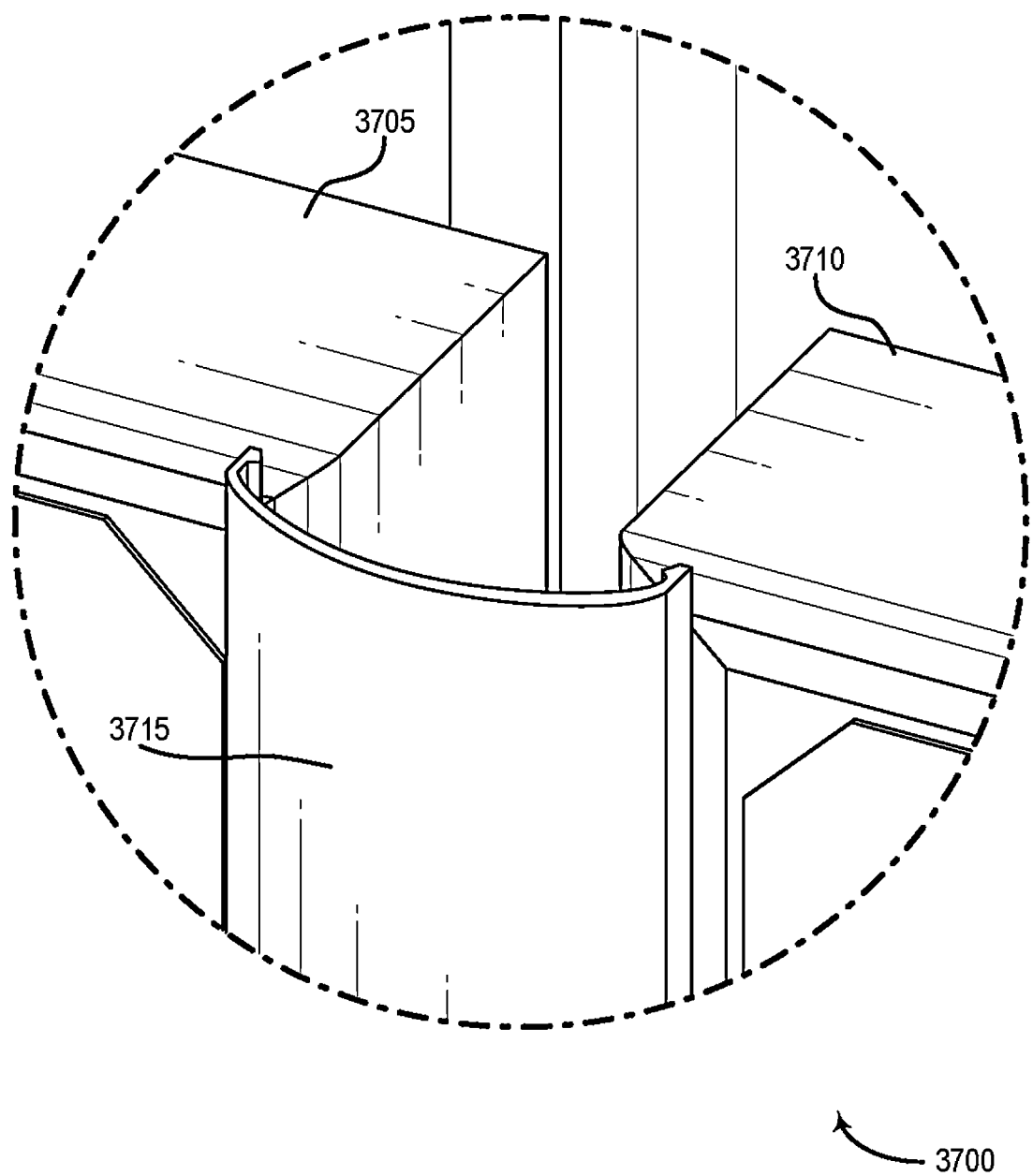
FIG. 37 shows an example of a perspective of a weathercap installed on a solar panel support system according to aspects of the present disclosure.

FIG. 37 shows an example of a perspective of a weathercap 3715 installed on a solar panel support system according to aspects of the present disclosure. Solar panel installation system 3700 is an example of, or includes aspects of, the corresponding element described with reference to FIGS. 20-24, 27-36, 38, 40, and 41. In one aspect, solar panel installation system 3700 includes left solar panel module 3705, right solar panel module 3710, and weathercap 3715.

Left solar panel module 3705 is an example of, or includes aspects of, the corresponding element described with reference to FIGS. 20-23, 27, 28, 30, 31, 34, 38, 40, 41, and 43. Right solar panel module 3710 is an example of, or includes aspects of, the corresponding element described with reference to FIGS. 20, 23, 27, 28, 30, 34, 38, 40, and 41. Weathercap 3715 is an example of, or includes aspects of, the corresponding element described with reference to FIGS. 23, 27, 28, 30, and 34.

FIG. 37 illustrates a perspective of a weathercap 3715 installed on a solar panel support system (e.g., a weathercap 3715 installed on a solar panel support system of the examples of FIGS. 35 and 36). As shown in FIG. 37, a weathercap 3715 (e.g., as described in more detail herein) may also be installed in non-roofing applications. Generally, the weathercap 3715—astragal/astragal clip assembly may be any suitable combination of weathercap 3715 and astragal/astragal clip described herein.

Figure 38:
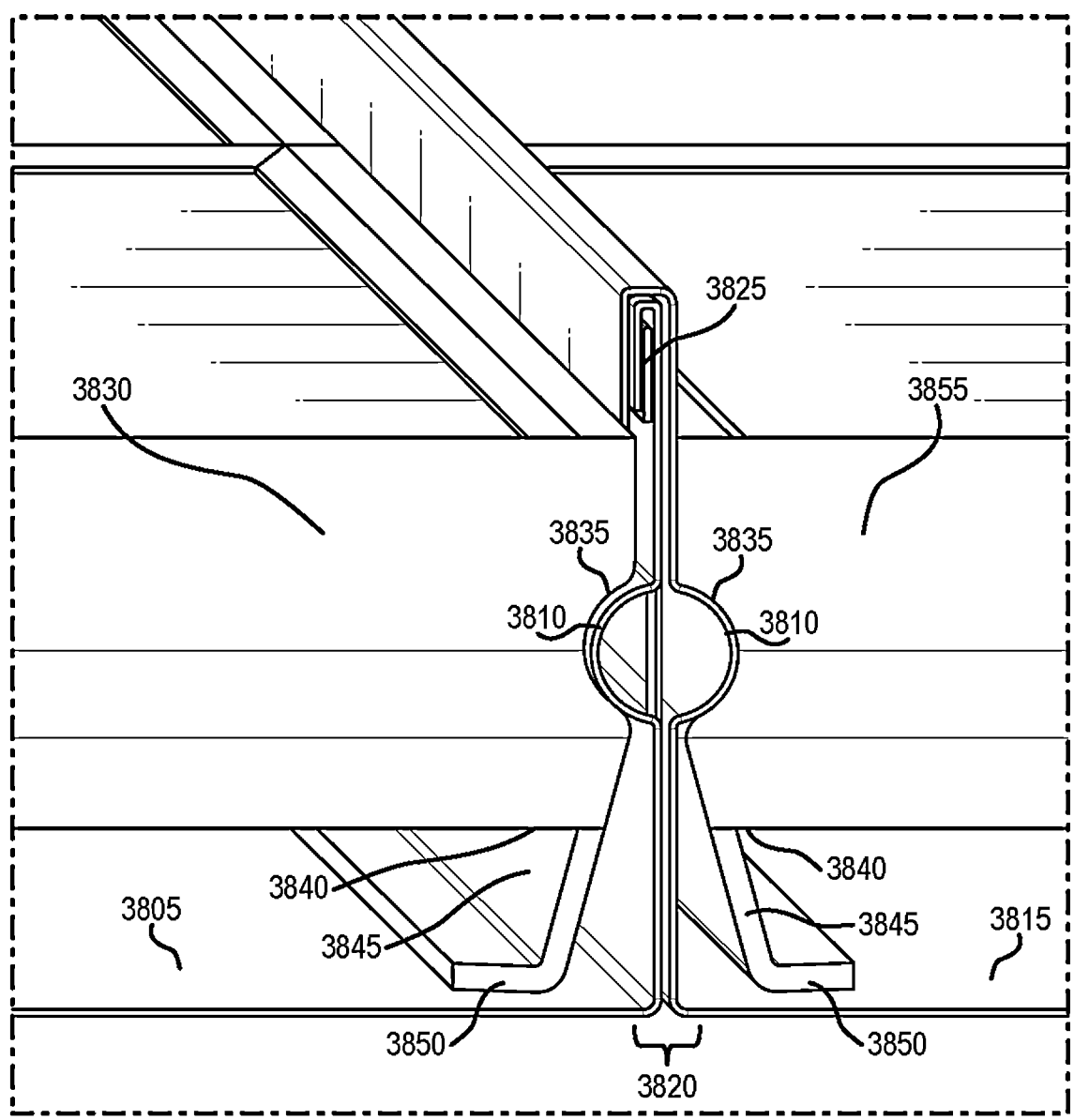
FIG. 38 shows an example of a solar panel attachment system according to aspects of the present disclosure.

FIG. 38 shows an example of a solar panel attachment system according to aspects of the present disclosure. Solar panel installation system 3800 is an example of, or includes aspects of, the corresponding element described with reference to FIGS. 20-24, 27-37, 40, and 41. In one aspect, solar panel installation system 3800 includes left roof panel 3805, right roof panel 3815, continuous panel joint 3820, left solar panel module 3830, and right solar panel module 3855.

Left roof panel 3805 is an example of, or includes aspects of, the corresponding element described with reference to FIGS. 22, 23, 27, 28, 31-34, and 40-42. Right roof panel 3815 is an example of, or includes aspects of, the corresponding element described with reference to FIGS. 22, 23, 27, 28, 31-34, 40, and 41. In one aspect, left roof panel 3805 and right roof panel 3815 each include a bulb 3810. Continuous panel joint 3820 is an example of, or includes aspects of, the corresponding element described with reference to FIGS. 22-24, 26-28, 31-33, 35, 36, and 41. In one aspect, continuous panel joint 3820 includes fold 3825. Fold 3825 is an example of, or includes aspects of, the corresponding element described with reference to FIGS. 20 and 21. Left solar panel module 3830 is an example of, or includes aspects of, the corresponding element described with reference to FIGS. 20-23, 27, 28, 30, 31, 34, 37, 40, 41, and 43. Right solar panel module 3855 is an example of, or includes aspects of, the corresponding element described with reference to FIGS. 20, 23, 27, 28, 30, 34, 37, 40, and 41. In one aspect, left solar panel module 3830 and right solar panel module 3855 each include a groove 3835, a bottom edge 3840, and a support structure 3845. In one aspect, support structures 3845 include a foot 3850.

In some examples, a solar panel module (e.g., left solar panel module 3830, right solar panel module 3855, etc.) may have a unique attachment edge including a groove 3835 configured to receive a roofing panel bulb 3810 (e.g., a bulb 3810 formed by a left roof panel 3805 and a right roof panel 3815 at fold 3825). In some examples a solar panel of this type may be manufactured with a frame specifically adapted for a particular roof profile. The groove 3835 may be continuous along the edge of the solar panel module, and the solar panel module may also include a continuous support structure 3845 extending downwards from a bottom edge 3840 of the solar panel module. In some cases, the support structure 3845 may include a "foot" 3850 element configured to sit on a roof panel below and to provide support for the solar panel module. In some cases, the solar panel module may be fastened to the roof bulb 3810 by a snap-lock connection where the support structure 3845 and lower portion of the solar panel end slides past the bulb 3810 until the bulb 3810 is received by the groove 3835, locking that edge of the solar panel module in place. The bulb 3810 and groove 3835 may be located above the roof and relative to each other such that the foot 3850 rests on and is supported by the roof panel while the solar panel module is locked to the bulb 3810. In some aspects, a solar panel module may be removed by completing the opposite action (e.g., pushing the lower portion of the solar panel module end up past the bulb 3810 so that the solar panel module edge moves upward past the bulb 3810 and the groove 3835 is uncoupled from the bulb 3810).

The bulb 3810 for coupling the solar panel modules to the roof may be formed by the intersection of the two standing seam roofing panels (e.g., the left roof panel 3805 and the right roof panel 3815). In some cases, each roofing panel ends with a vertical portion, and the ends of the two vertical portions may be folded over each other to form the standing seam (e.g., the fold 3825). In the example of FIG. 38, the vertical portions of the standing seam are long enough such that the fold 3825 is located high enough above the installed solar panel modules to allow installation of the solar panel modules (e.g., such that the top edge of the solar panel modules clear the fold 3825 during installation). The vertical portion of the standing seam also includes a semi-circular bulb 3810 formed by curving the vertical portion. Two semicircles (e.g., of the bulbs 3810) may be located next to each other so that they form, or nearly form, a circle (e.g., as shown in the example of FIG. 38), which may help the strength of the connection. Each bulb 3810 is then received by the corresponding groove 3835 of the solar panel module for a tool-less connection of a solar panel module to a roofing system. As shown in FIG. 38, the lower portion and the support structure 3845 may be sloped downward away from the seam to allow for the lower portion of the solar panel end to clear the bulb 3810 as the solar panel end is lowered into place.

In the example of FIG. 38, the bulb 3810 and corresponding groove 3835 are shown to be circular.

However, generally the bulb 3810 and corresponding groove 3835 may be elliptical, triangular, diamond-shaped, or any other shape suitable for the connection by analogy, without departing from the scope of the present disclosure.

In some aspects, the width of the solar panel module may be dependent on the width of the standing seam profile (e.g., the spacing between adjacent roof panel folds 3825). In one example implementation, the spacing of the roof panel folds 3825 may be approximately 4 feet and the width of the solar panel modules may be approximately 20 inches. In some example implementations, the spacing of the roof panel folds 3825 may match, or closely match, a width of a number of side-by-side standard solar panel modules (e.g., 1, 2, 3, 4, etc.). The solar panel module frames have end portions that may be shorter than the other portions of the frame, which may allow for water and wiring to transition underneath the solar panel modules at the shorter end portions.

In some aspects, the example of FIG. 38 may simplify the roofing profile (e.g., by eliminating the ledge in the metal roofing panel that is used in conventional solar panel designs). As described, the solar panel modules may simply snap into a metal roof profile (e.g., after a roofing system is installed). This may effectively and advantageously separate the two scopes of installation/maintenance work, roofing system installation/maintenance and solar panel system installation/maintenance. Additionally, no special tools are required for the solar panel installation aspects described. Although in some embodiments, adhesive may be applied between the groove 3835 and the bulb 3810. Further, in some cases, the area underneath the panel may be used as a chase for running wires.

In some aspects, the configuration of the left roof panel 3805 end and the right roof panel 3815 end to couple together to form a continuous panel joint 3820 projecting outward from the substantially planar surface further comprises folding of an edge of the left roof panel 3805 end with and edge of the right roof panel 3815 end to form a continuous seam (e.g., as described in more detail herein, for example, with reference to FIG. 38).

Figure 39:
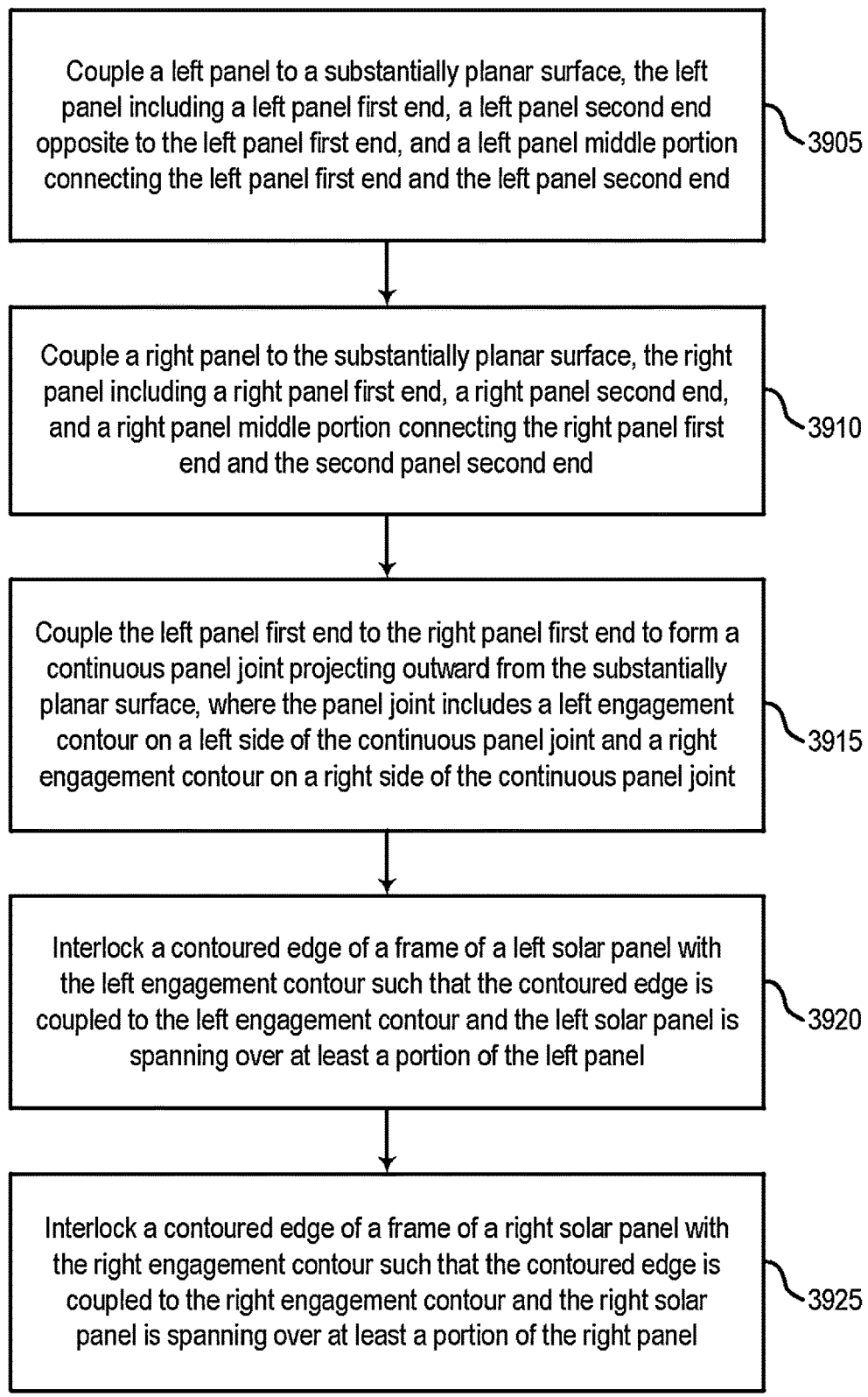
FIG. 39 shows an example of a method for solar panel installation according to aspects of the present disclosure.

FIG. 39 shows an example of a method 3900 for solar energy systems according to aspects of the present disclosure. In some examples, these operations are performed by a system including a processor executing a set of codes to control functional elements of an apparatus.

Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 3905, the system couples a left panel to a substantially planar surface, the left panel including a left panel first end, a left panel second end opposite to the left panel first end, and a left panel middle portion connecting the left panel first end and the left panel second end. In some cases, the operations of this step refer to, or may be performed by, a left roof panel as described with reference to FIGS. 22, 23, 27, 28, 31-34, 38, and 40-42.

At operation 3910, the system couples a right panel to the substantially planar surface, the right panel including a right panel first end, a right panel second end, and a right panel middle portion connecting the right panel first end and the second panel second end. In some cases, the operations of this step refer to, or may be performed by, a right roof panel as described with reference to FIGS. 22, 23, 27, 28, 31-34, 38, 40, and 41.

At operation 3915, the system couples the left panel first end to the right panel first end to form a continuous panel joint projecting outward from the substantially planar surface, where the panel joint includes a left engagement contour on a left side of the continuous panel joint and a right engagement contour on a right side of the continuous panel joint. In some cases, the operations of this step refer to, or may be performed by, an engagement contour as described with reference to FIGS. 40, 41, and 44. In some cases, the operations of this step refer to, or may be performed by, a continuous panel joint as described with reference to FIGS. 22-24, 26-28, 31-33, 35, 36, 38, and 41.

At operation 3920, the system interlocks a contoured edge of a frame of a left solar panel with the left engagement contour such that the contoured edge is coupled to the left engagement contour and the left solar panel is spanning over at least a portion of the left panel. In some cases, the operations of this step refer to, or may be performed by, a contoured edge as described with reference to FIGS. 40, 41, and 43. In some cases, the operations of this step refer to, or may be performed by, a left solar panel module as described with reference to FIGS. 20-23, 27, 28, 30, 31, 34, 37, 38, 40, 41, and 43.

At operation 3925, the system interlocks a contoured edge of a frame of a right solar panel with the right engagement contour such that the contoured edge is coupled to the right engagement contour and the right solar panel is spanning over at least a portion of the right panel. In some cases, the operations of this step refer to, or may be performed by, a contoured edge as described with reference to FIGS. 40, 41, and 43. In some cases, the operations of this step refer to, or may be performed by, a right solar panel module as described with reference to FIGS. 20, 23, 27, 28, 30, 34, 37, 38, 40, and 41.

Figure 40:
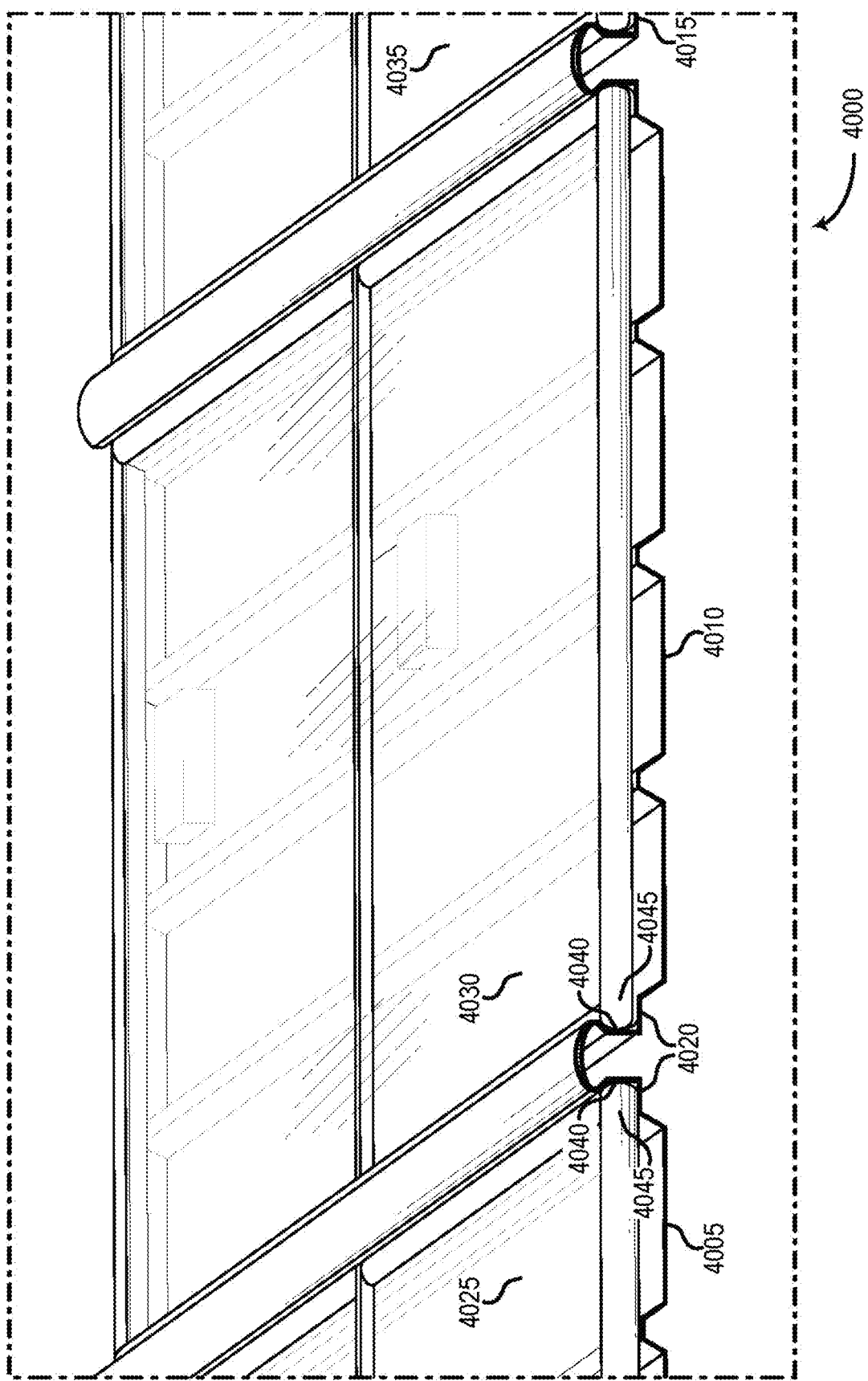
FIG. 40 shows an example of a perspective view of a solar support system according to aspects of the present disclosure.

FIG. 40 shows an example of a perspective view of a solar support system according to aspects of the present disclosure. Solar panel installation system 4000 is an example of, or includes aspects of, the corresponding element described with reference to FIGS. 20-24, 27-38, and 41. In one aspect, solar panel installation system 4000 includes left roof panel 4005, right roof panel 4010, third roof panel 4015, support shelf 4020, left solar panel module 4025, right solar panel module 4030, third solar panel module 4035, engagement contour 4040, and contoured edge 4045.

Left roof panel 4005 is an example of, or includes aspects of, the corresponding element described with reference to FIGS. 22, 23, 27, 28, 31-34, 38, 41, and 42. Right roof panel 4010 is an example of, or includes aspects of, the corresponding element described with reference to FIGS. 22, 23, 27, 28, 31-34, 38, and 41. Support shelf 4020 is an example of, or includes aspects of, the corresponding element described with reference to FIGS. 32, 34, and 41. Left solar panel module 4025 is an example of, or includes aspects of, the corresponding element described with reference to FIGS. 20-23, 27, 28, 30, 31, 34, 37, 38, 41, and 43. Right solar panel module 4030 is an example of, or includes aspects of, the corresponding element described with reference to FIGS. 20, 23, 27, 28, 30, 34, 37, 38, and 41. Engagement contour 4040 is an example of, or includes aspects of, the corresponding element described with reference to FIGS. 41 and 44. Contoured edge 4045 is an example of, or includes aspects of, the corresponding element described with reference to FIGS. 41 and 43.

A perspective view of a toolless solar support system is shown in the example of FIG. 40. Shown are a first roof panel (e.g., left roof panel 4005), a second roof panel (e.g., right roof panel 4010), a third roof panel 4015, a first solar panel (e.g., left solar panel module 4025), a second solar panel (e.g., right solar panel module 4030), a third solar panel, a plurality of support shelves, and a plurality of panel-receiving engagement contours 4040.

Shown in FIG. 40 are aspects of a corrugated roof panel system, wherein each roof panel end may be configured to overlap and snap-lock to the adjacent roof panel. The roof panel ends may be formed such that when they are snap-locked (e.g., such that the panel ends overlap), a support shelf 4020 and a panel-receiving concave engagement contour 4040 may be located on each side of the overlapped portion, as described in more detail herein (e.g., with respect to FIG. 41).

Figure 41:
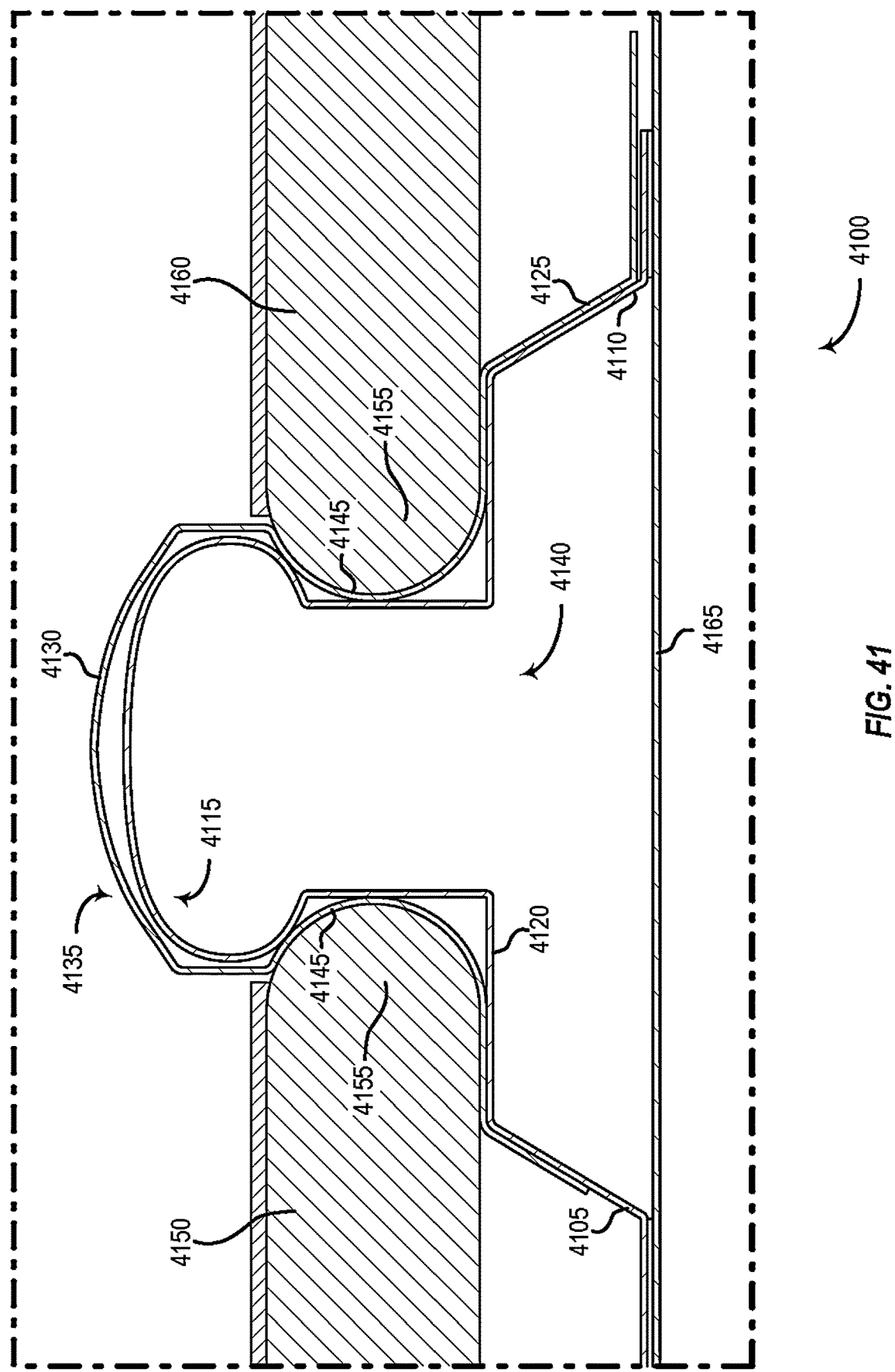
FIG. 41 shows an example of a detailed view of a panel support location according to aspects of the present disclosure.

FIG. 41 shows an example of a detailed view of a panel support location according to aspects of the present disclosure. Solar panel installation system 4100 is an example of, or includes aspects of, the corresponding element described with reference to FIGS. 20-24, 27-38, and 40. In one aspect, solar panel installation system 4100 includes left roof panel 4105, right roof panel 4125, continuous panel joint 4140, left solar panel module 4150, right solar panel module 4160, and planar surface 4165.

Left roof panel 4105 is an example of, or includes aspects of, the corresponding element described with reference to FIGS. 22, 23, 27, 28, 31-34, 38, 40, and 42. In one aspect, left roof panel 4105 includes left roof panel end 4110. Left roof panel end 4110 is an example of, or includes aspects of, the corresponding element described with reference to FIG. 44. In one aspect, left roof panel end 4110 includes first bulb shape 4115 and support shelf 4120. Support shelf 4120 is an example of, or includes aspects of, the corresponding element described with reference to FIGS. 32, 34, and 40.

Right roof panel 4125 is an example of, or includes aspects of, the corresponding element described with reference to FIGS. 22, 23, 27, 28, 31-34, 38, and 40. In one aspect, right roof panel 4125 includes right roof panel end 4130. In one aspect, right roof panel end 4130 includes second bulb shape 4135. Continuous panel joint 4140 is an example of, or includes aspects of, the corresponding element described with reference to FIGS. 22-24, 26-28, 31-33, 35, 36, and 38. In one aspect, continuous panel joint 4140 includes engagement contour 4145. Engagement contour 4145 is an example of, or includes aspects of, the corresponding element described with reference to FIGS. 40 and 44. Left solar panel module 4150 is an example of, or includes aspects of, the corresponding element described with reference to FIGS. 20-23, 27, 28, 30, 31, 34, 37, 38, 40, and 43. Right solar panel module 4160 is an example of, or includes aspects of, the corresponding element described with reference to FIGS. 20, 23, 27, 28, 30, 34, 37, 38, and 40. In one aspect, left solar panel module 4150 and right solar panel module 4160 each include contoured edges 4155. A contoured edge 4155 is an example of, or includes aspects of, the corresponding element described with reference to FIGS. 40 and 43.

In FIG. 41, a detailed view of a panel support location is shown. The solar panel modules may cover a planar surface 4165, which in the example shown is a roof surface with corresponding roof panels, but the planar surface 4165 may be a vertical exterior wall surface or other suitable exterior surface for mounting solar panel modules thereto, and the roof panels may be other panels suitable for covering the specific exterior surface. The right roof panel end 4130 and the left roof panel end 4110 may overlap, with the right roof panel end 4130 snap-locking over the left roof panel end 4110. Each panel end may include a central bulb-shape transitioning to a substantially horizontal support shelf 4120 on either side. As shown in FIGS. 40-42 and 44, each panel end 4130 4110 may have a vertically symmetric shape, with the vertically symmetric shape of right roof panel end 4130 being different from the vertically symmetric shape of the left roof panel end 4110. The panel ends may be shaped such that when coupled together each shelf of the second panel (e.g., of the right roof panel 4125) lies on top of and is supported by the corresponding shelf of the first panel (e.g., of the left roof panel 4105) underneath, forming the support shelf 4120. In some examples, the sides of the bulb portion of the right roof panel end 4130 may include the concave engagement contour 4145 to receive the corresponding solar panel frame end. The bulb portions of the left and right panel ends may be configured such that the right roof panel end 4130 can be snap-locked over and retained by the left roof panel end 4110. In the configuration shown, this results in the bulb portion of the left roof panel end 4110 having a smooth arc-shape transitioning into vertical sides whereas the top of the bulb portion of the right roof panel end 4130 has a smaller top arc shape with additional straight vertical sides, and the lower sides of the bulb portion are concave. Generally, any other complementary panel end profiles may be implemented by analogy, provided that the two profiles can be snap-locked as described and also provide the required support shelves and engagement contours 4145 for retaining the solar panel end therein.

The perimeter frame of the solar panel module (i.e. the portion of a solar panel module that forms the shape of the panel ends) may be, for example, a UV stabilized plastic resistant to, rot, mildew, abrasion, chemicals and weather damage (e.g., such as polycarbonate, PVC, HDPE, UHMW Polyethylene, etc.). In some implementations, for example, the solar panel frame may have a height of approximately ⅝" to ¾". In some examples, electronics for the solar panel modules may be pre-installed on the panel. As a result, for the perimeter frame without metallic parts to conduct electricity, an equipment ground (EGC) may not be required and, with modern electronics, a grounding equipment conductor (GEC) may also not be required (e.g., since the devices test for insulation resistance before exporting power).

Accordingly, a system for solar panel installation is described. One or more aspects of the system include a left roof panel 4105 configured for coupling onto a substantially planar surface 4165 and including a left roof panel end 4110, a left roof panel 4105 second end opposite to the left roof panel end 4110, and a left roof panel 4105 middle portion connecting the left roof panel end 4110 and the left roof panel 4105 second end and a right roof panel 4125 configured for coupling onto the substantially planar surface 4165 and including a right roof panel end 4130, a right roof panel 4125 second end, and a right roof panel 4125 middle portion connecting the right roof panel end 4130 and the second panel second end, wherein the left roof panel end 4110 and the right roof panel end 4130 are configured to couple together to form a continuous panel joint 4140 projecting outward from the substantially planar surface 4165, wherein the panel joint includes a left engagement contour 4145 on a left side of the continuous panel joint 4140 and a right engagement contour 4145 on a right side of the continuous panel joint 4140, wherein the left engagement contour 4145 is configured to interlock with a contoured edge 4155 of a frame of a left solar panel module 4150 spanning over at least a portion of the left roof panel 4105 and the right engagement contour 4145 is configured to interlock with a contoured edge 4155 of a frame of a right solar panel module 4160 spanning over at least a portion of the right roof panel 4125.

In some aspects, the left roof panel end 4110 and the right roof panel end 4130 each include a support shelf 4120 located below the engagement contour 4145 and configured to support a lower edge of the corresponding solar module frame when that solar module is spanning over the panel.

In some aspects, the left roof panel end 4110 includes a first bulb shape 4115 and the right roof panel end 4130 includes a second bulb shape 4135, wherein the coupling together to form a continuous panel joint 4140 further comprises the second bulb shape 4135 snap-locked over the first bulb shape 4115.

In some aspects, each contoured edge 4155 of the frame comprises a convex surface, and wherein each engagement contour 4145 comprises a concave surface.

In some aspects, each contoured edge 4155 of the frame comprises a concave surface, and wherein each engagement contour 4145 comprises a convex surface.

In some aspects, each solar module frame further comprises a foot extending downwards from the contoured edge 4155 of the solar panel frame.

In some aspects, each engagement contour 4145 includes a plurality of notches in a surface of the contour, and each contoured edge 4155 of the solar panel frame includes a plurality of bumps in a surface of the contoured edge 4155, wherein the bumps and notches are configured such that at least one bump is received by at least one notch when the engagement contour 4145 is interlocked with the corresponding contoured edge 4155 of the solar panel frame and forms an engagement separate from the interlock of the engagement contour 4145 with the contoured edge 4155 of the solar module frame.

In some aspects, the substantially planar surface 4165 is an exterior surface of a structure. In some examples, the left roof panel 4105 and the right roof panel 4125 are roofing panels. In some examples, the left roof panel 4105 and the right roof panel 4125 are cladding panels.

A method for solar panel installation is also described. One or more aspects of the method include coupling a left roof panel 4105 to a substantially planar surface 4165, the left roof panel 4105 including a left roof panel end 4110, a left roof panel 4105 second end opposite to the left roof panel end 4110, and a left roof panel 4105 middle portion connecting the left roof panel end 4110 and the left roof panel 4105 second end; coupling a right roof panel 4125 to the substantially planar surface 4165, the right roof panel 4125 including a right roof panel end 4130, a right roof panel 4125 second end, and a right roof panel 4125 middle portion connecting the right roof panel 4125 first end and the second panel second end; coupling the left roof panel end 4110 to the right roof panel end 4130 to form a continuous panel joint 4140 projecting outward from the substantially planar surface 4165, wherein the panel joint includes a left engagement contour 4145 on a left side of the continuous panel joint 4140 and a right engagement contour 4145 on a right side of the continuous panel joint 4140; interlocking a contoured edge 4155 of a frame of a left solar panel module 4150 with the left engagement contour 4145 such that the contoured edge 4155 is coupled to the left engagement contour 4145 and the left solar panel module 4150 is spanning over at least a portion of the left roof panel 4105; and interlocking a contoured edge 4155 of a frame of a right solar panel module 4160 with the right engagement contour 4145 such that the contoured edge 4155 is coupled to the right engagement contour 4145 and the right solar panel module 4160 is spanning over at least a portion of the right roof panel 4125.

In some aspects, the left roof panel end 4110 and the right roof panel end 4130 each include a support shelf 4120 located below the engagement contour 4145 and configured to support a lower edge of the corresponding solar module frame.

Some examples of the methods and systems described herein further include supporting the lower edge of the corresponding solar module frame on the support shelf 4120 in response to interlocking the corresponding contoured edge 4155 of the frame.

In some aspects, the left roof panel end 4110 includes a first bulb shape 4115 and the right roof panel end 4130 includes a second bulb shape 4135, wherein the coupling of the left roof panel end 4110 to the right roof panel end 4130 to form a continuous panel joint 4140 further comprises the second bulb shape 4135 snap-locked over the first bulb shape 4115.

In some aspects, each contoured edge 4155 of the frame comprises a convex surface, and wherein each engagement contour 4145 comprises a concave surface.

In some aspects, each contoured edge 4155 of the frame comprises a concave surface, and wherein each engagement contour 4145 comprises a convex surface.

In some aspects, each solar module frame further comprises a foot extending downwards from the contoured edge 4155 of the solar panel frame.

In some aspects, the coupling of the left roof panel end 4110 to the right roof panel end 4130 to form a continuous panel joint 4140 projecting outward from the substantially planar surface 4165 further comprises folding of an edge of the left roof panel end 4110 with and edge of the right roof panel end 4130 to form a continuous seam (e.g., as described in more detail herein, for example, with reference to FIG. 38).

In some aspects, each engagement contour 4145 includes a plurality of notches in a surface of the contour, and each contoured edge 4155 of the solar panel frame includes a plurality of bumps in a surface of the contoured edge 4155.

Some examples of the methods and systems described herein further include receiving at least one bump being received by at least one notch when the engagement contour 4145 is interlocked with the corresponding contoured edge 4155 of the solar panel frame, whereby an engagement is formed that is separate from the interlock of the engagement contour 4145 with the contoured edge 4155 of the solar module frame.

In some aspects, the substantially planar surface 4165 is an exterior surface of a structure. In some aspects, the left roof panel 4105 and the right roof panel 4125 are roofing panels. In some aspects, the left roof panel 4105 and the right roof panel 4125 are cladding panels.

Figure 42:
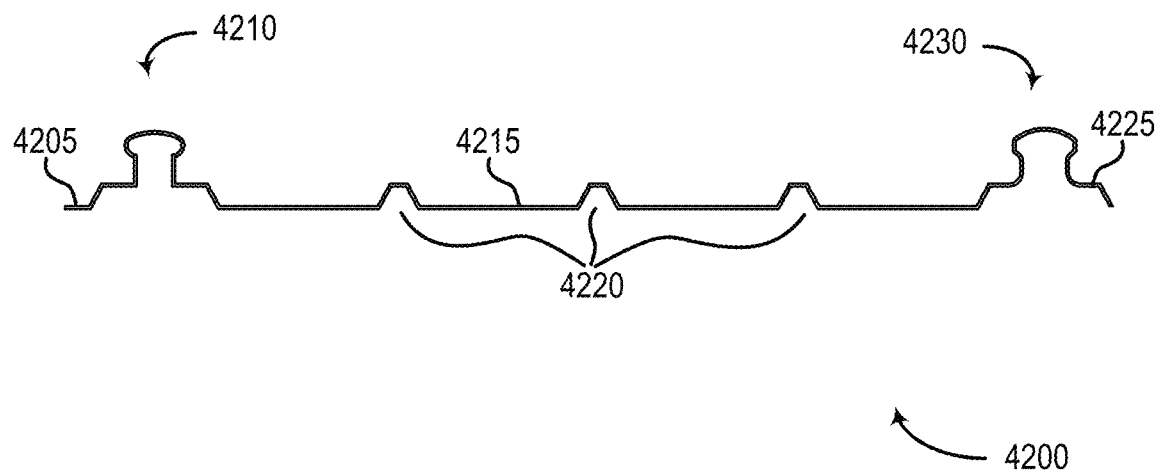
FIG. 42 shows an example of a sectional view of a roof panel installation system according to aspects of the present disclosure.

FIG. 42 shows an example of a sectional view of a roof panel installation system according to aspects of the present disclosure. Roof panel 4200 is an example of, or includes aspects of, the corresponding element described with reference to FIGS. 22, 23, 27, 28, 31-34, 38, 40, and 41. In one aspect, roof panel 4200 includes first end portion 4205, middle portion 4215, and second end portion 4225.

In one aspect, first end portion 4205 includes first profile 4210. In one aspect, middle portion 4215 includes ribs 4220. In one aspect, second end portion 4225 includes second profile 4230.

In FIG. 42, a sectional view of a toolless install roof panel 4200 is shown. Shown is a first end portion 4205, a second end portion 4225, and a middle portion 4215. As shown in FIG. 42, the middle portion 4215 of a toolless roof panel 4200 may have a corrugated configuration with raised parallel ribs 4220, and the ribs 4220 may act as support shelves for solar panel modules (e.g., to be installed solar panel modules). The corrugation may be any suitable type for the demanded strength and serviceability conditions of a given application. The ribs 4220 are configured to support the middle portions 4215 of the solar panel modules.

The panel includes the first end with a first profile 4210 and a second end with a second profile 4230. In the example shown, the first profile 4210 and the second profile 4230 may correspond to the profiles described herein (e.g., such as the profiles shown in FIG. 41, with the first profile 4210 corresponding to the first-installed left roof panel 4200 end, and the second profile 4230 corresponding to the second-installed right roof panel end that snap-locks over the first profile 4210).

In some aspects, the left roof panel 4200 middle portion 4215 and the right roof panel middle portion 4215 each include at least one secondary support member (e.g., ribs 4220) configured to support the corresponding solar module spanning over that panel.

Some examples of the methods, apparatuses, and systems described herein further include supporting of the corresponding solar module by the at least one secondary support member in response to interlocking the corresponding contoured edge of the frame.

Figure 43:
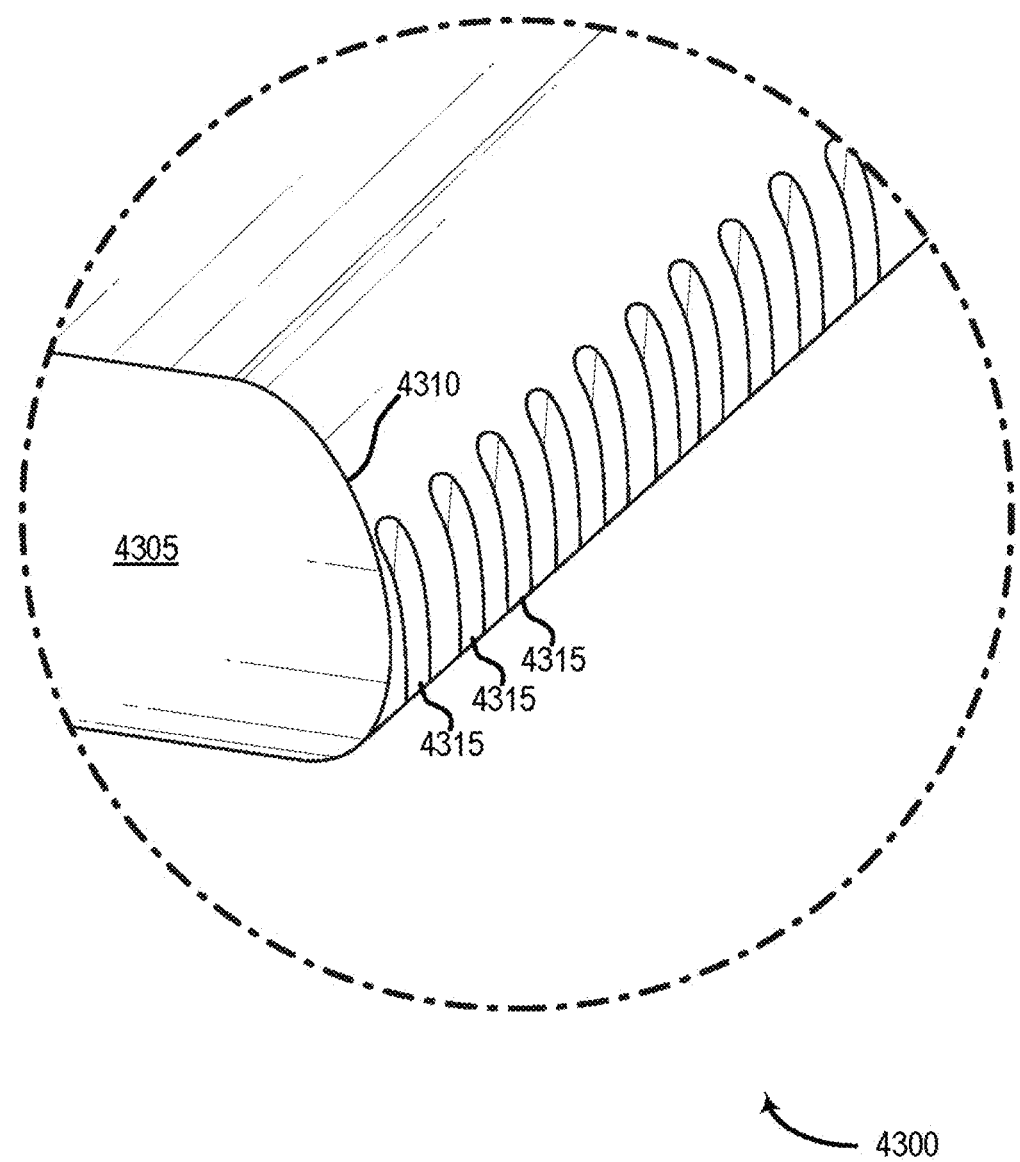
FIG. 43 shows an example of a detailed view of a solar panel module edge according to aspects of the present disclosure.

FIG. 43 shows an example of a detailed view of a solar panel module edge according to aspects of the present disclosure. Solar panel module 4300 is an example of, or includes aspects of, the corresponding element described with reference to FIGS. 20-23, 27, 28, 30, 31, 34, 37, 38, 40, and 41.

In one aspect, solar panel module 4300 includes edge frame 4305. In one aspect, edge frame 4305 includes contoured edge 4310. Contoured edge 4310 is an example of, or includes aspects of, the corresponding element described with reference to FIGS. 40 and 41. In one aspect, contoured edge 4310 includes notches 4315.

In the example of FIG. 43, a detail of an edge frame 4305 of an exemplary solar panel module 4300 for use in the toolless install system is shown.

Figure 44:
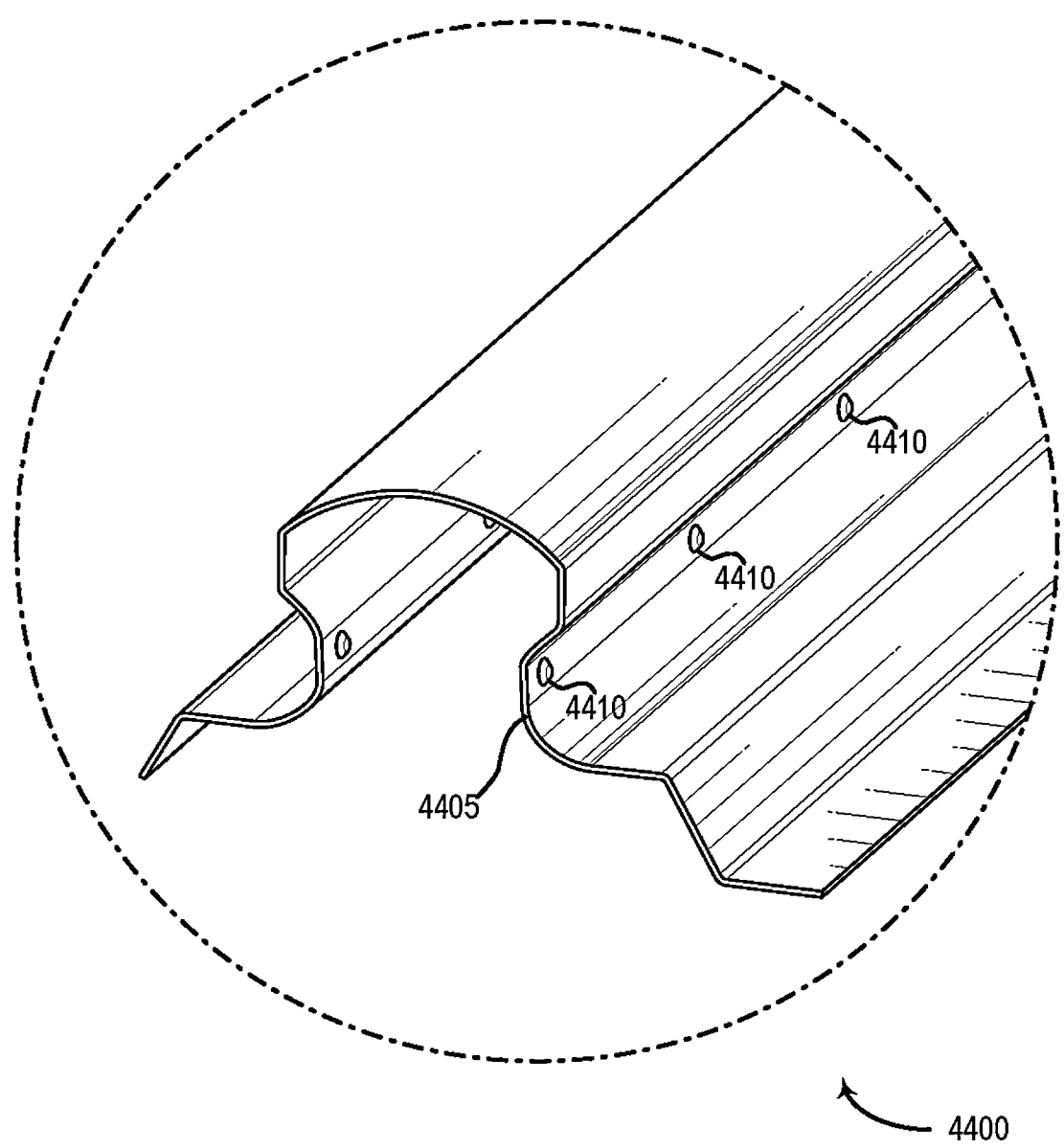
FIG. 44 shows an example of a detailed view of a roof panel end portion according to aspects of the present disclosure.

The end of the solar panel module 4300 that is received by the concave indentation in the roof panel (e.g., as described in more detail herein, for example, with reference to FIGS. 41 and 42) may include an edge frame 4305 with a convex surface generally matching the concave indentation. The convex surface of the edge frame 4305 may, in some examples, also includes a plurality of narrow vertical notches 4315 that are closely spaced along the edge (e.g., as shown in FIG. 44). Some of the vertical notches 4315 may receive corresponding bumps on the corresponding roofing panel ends (e.g., as shown in FIG. 44). In the example of FIG. 43, the spacing of the notches 4315 may be smaller than the bump spacing to allow for greater flexibility in matching the notches 4315 to the bumps. In some cases, other suitable notch shapes or notch configurations may be used by analogy, without departing from the scope of the present disclosure.

FIG. 44 shows an example of a detailed view of a roof panel end portion according to aspects of the present disclosure. Roof panel end 4400 is an example of, or includes aspects of, the corresponding element described with reference to FIG. 41. In one aspect, roof panel end 4400 includes engagement contour 4405. Engagement contour 4405 is an example of, or includes aspects of, the corresponding element described with reference to FIGS. 40 and 41. In one aspect, engagement contour 4405 includes bumps 4410.

A perspective detail illustration of an end portion of a roof panel (e.g., a second end portion of a roof panel) is shown in FIG. 44. As described herein, a concave engagement contour 4405 may include regularly-spaced, and generally circular, bumps 4410. The bumps 4410 may be received by corresponding notches in a convex edge frame surface of a solar panel module. The engagement of the bumps 4410 with the notches may prevent the solar panel module edge from sliding laterally along the concave engagement contour 4405 (e.g., due to thermal expansion or other horizontal forces).

In some aspects, the examples described with reference to FIGS. 40-44 may utilize solar panel modules that are precisely dimensioned, with interlocking frames and indexing features to assure solar panel module to solar panel module row alignment horizontally across the solar panel module/solar array. Such embodiments may use a press-in, snap-fit design (to which, in some examples, an adhesive may be added for security without detriment to performance) with module level electronics pre-installed (e.g., such that the system is essentially a tool-less, snap in, "plug-and-play" system that can be delivered at low cost and installed, uninstalled and expanded or reduced by the consumer in most cases once a roofing system is in place).

The toolless embodiments of FIGS. 40-44 may reduce manufacturing costs and shipping volume, while also eliminating electrical grounding requirements for the module frame and offering tool-free installation. Moreover, the innovative aspects of FIGS. 40-44 are not limited to execution in metals, but also may be adapted to any material having suitable physical properties (e.g., such as fiberglass and various plastics including plexiglass and vinyl). Having the solar panel module electronics preinstalled, tool-less install and no racking required may reduce onsite labor, especially labor on the roof, which increases the safety of solar panel installation jobs.

Figure 45:
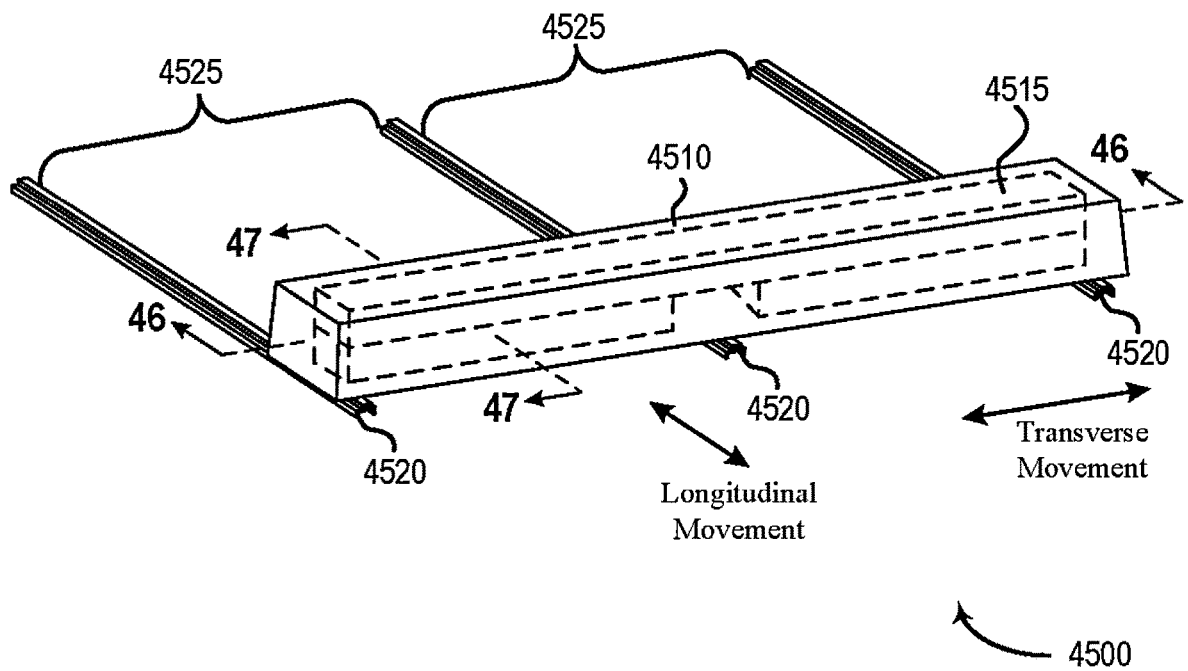
FIGS. 45 through 49 show examples of a solar panel cleaning system according to aspects of the present disclosure.

FIG. 45 shows an example of a solar panel cleaning system 4500 according to aspects of the present disclosure. Solar panel cleaning system 4500 is an example of, or includes aspects of, the corresponding element described with reference to FIGS. 46-49. In one aspect, solar panel cleaning system 4500 includes cleaning apparatus 4505, cover 4510, fluid tank 4515, weathercap rail 4520, and solar panel row 4525.

Cleaning apparatus 4505 is an example of, or includes aspects of, the corresponding element described with reference to FIGS. 46-48. Cover 4510 is an example of, or includes aspects of, the corresponding element described with reference to FIGS. 46 and 48. Fluid tank 4515 is an example of, or includes aspects of, the corresponding element described with reference to FIGS. 46-48. Weathercap rail 4520 is an example of, or includes aspects of, the corresponding element described with reference to FIGS. 46-49. Solar panel row 4525 is an example of, or includes aspects of, the corresponding element described with reference to FIG. 49.

Figure 46:
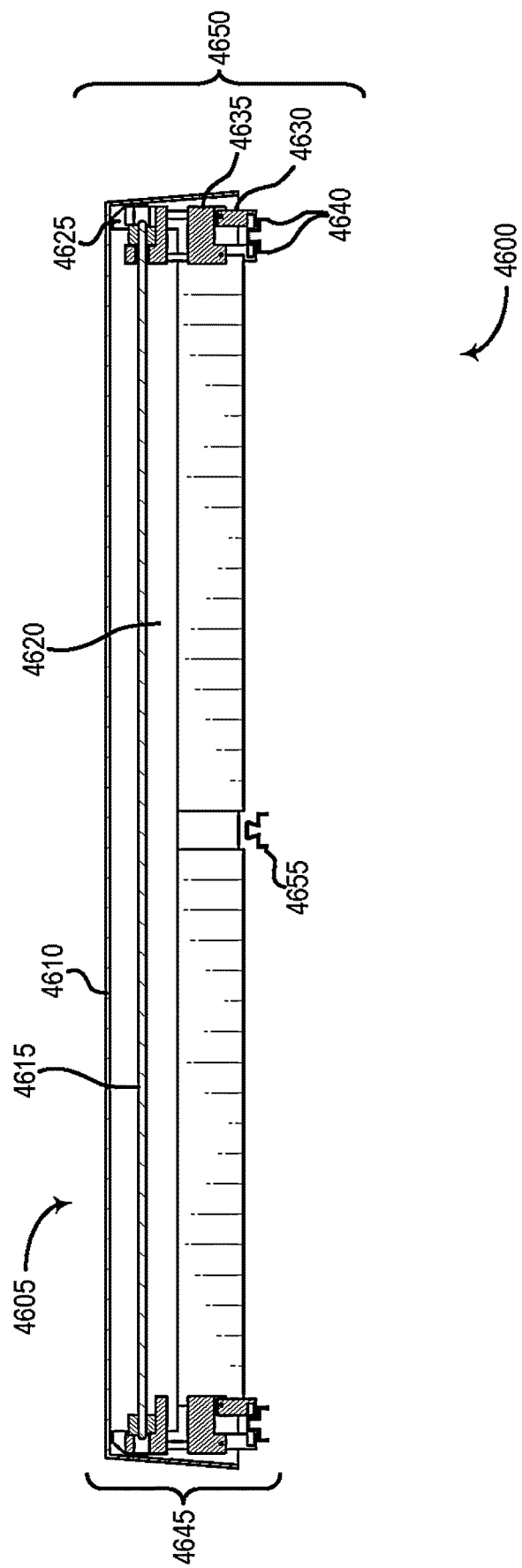

FIG. 46 shows an example of a solar panel cleaning system 4600 according to aspects of the present disclosure. Solar panel cleaning system 4600 is an example of, or includes aspects of, the corresponding element described with reference to FIGS. 45, and 47-49. In one aspect, solar panel cleaning system 4600 includes cleaning apparatus 4605, cover 4610, rod 4615, fluid tank 4620, gripper base 4625, gripper element 4630, actuator plate 4635, wheel 4640, first gripper assembly 4645, second gripper assembly 4650, and weathercap rail 4655.

Cleaning apparatus 4605 is an example of, or includes aspects of, the corresponding element described with reference to FIGS. 45, 47, and 48. Cover 4610 is an example of, or includes aspects of, the corresponding element described with reference to FIGS. 45 and 48. Rod 4615 is an example of, or includes aspects of, the corresponding element described with reference to FIG. 47. Fluid tank 4620 is an example of, or includes aspects of, the corresponding element described with reference to FIGS. 45, 47, and 48. Gripper base 4625 is an example of, or includes aspects of, the corresponding element described with reference to FIGS. 47 and 48. Gripper element 4630 is an example of, or includes aspects of, the corresponding element described with reference to FIGS. 47 and 48. Wheel 4640 is an example of, or includes aspects of, the corresponding element described with reference to FIGS. 47 and 48. First gripper assembly 4645 is an example of, or includes aspects of, the corresponding element described with reference to FIGS. 47 and 49. Second gripper assembly 4650 is an example of, or includes aspects of, the corresponding element described with reference to FIG. 49. Weathercap rail 4655 is an example of, or includes aspects of, the corresponding element described with reference to FIGS. 45, and 47-49.

Figure 47:
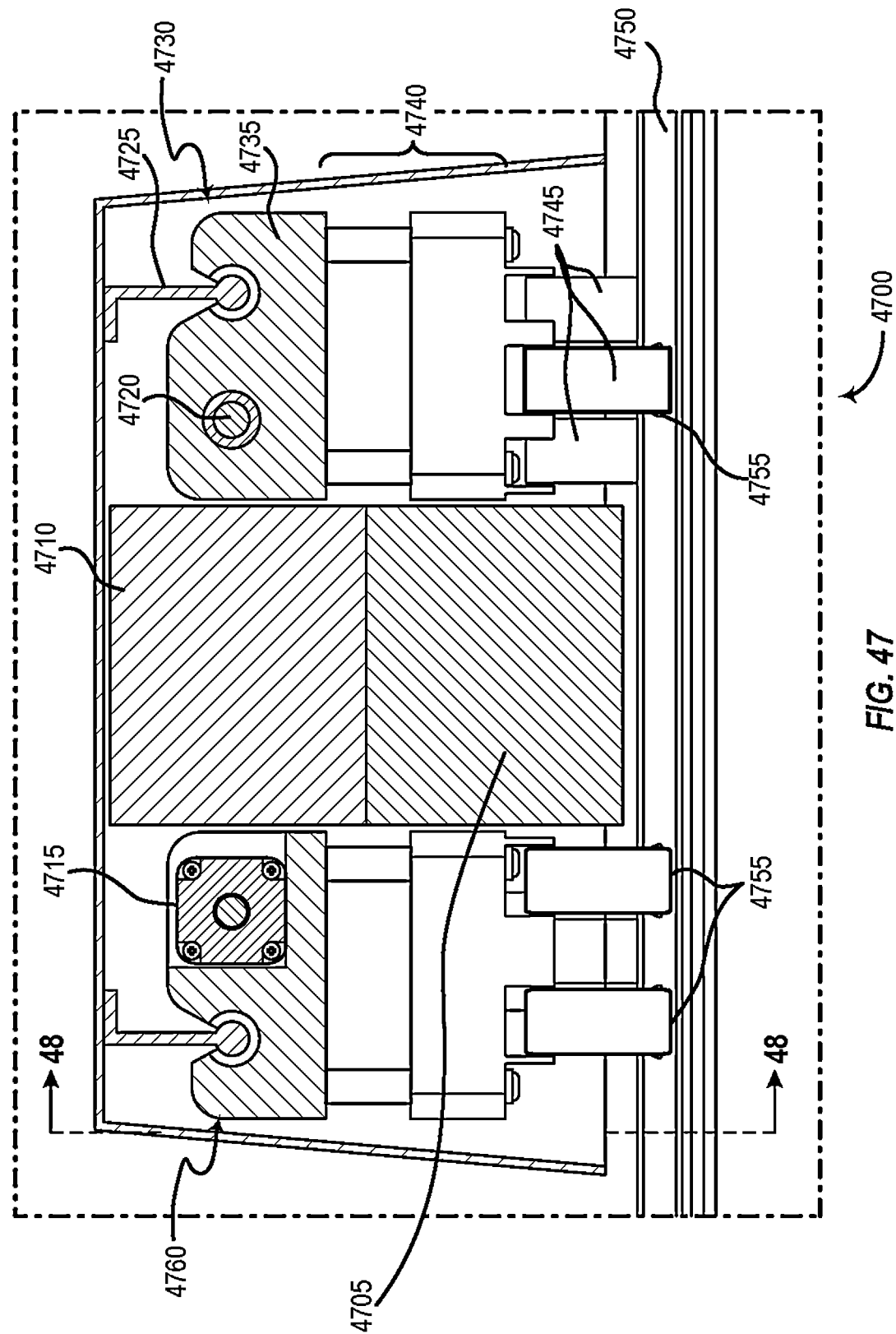

FIG. 47 shows an example of a solar panel cleaning system 4700 according to aspects of the present disclosure. Solar panel cleaning system 4700 is an example of, or includes aspects of, the corresponding element described with reference to FIGS. 45, 46, 48, and 49. In one aspect, solar panel cleaning system 4700 includes cleaning apparatus 4705, fluid tank 4710, motor 4715, rod 4720, rail 4725, first gripper assembly 4730, gripper base 4735, actuator 4740, gripper element 4745, weathercap rail 4750, wheel 4755, and third gripper assembly 4760.

Cleaning apparatus 4705 is an example of, or includes aspects of, the corresponding element described with reference to FIGS. 45, 46, and 48. Fluid tank 4710 is an example of, or includes aspects of, the corresponding element described with reference to FIGS. 45, 46, and 48. Rod 4720 is an example of, or includes aspects of, the corresponding element described with reference to FIG. 46. Rail 4725 is an example of, or includes aspects of, the corresponding element described with reference to FIG. 48. First gripper assembly 4730 is an example of, or includes aspects of, the corresponding element described with reference to FIGS. 46 and 49. Gripper base 4735 is an example of, or includes aspects of, the corresponding element described with reference to FIGS. 46 and 48. Actuator 4740 is an example of, or includes aspects of, the corresponding element described with reference to FIG. 48. Gripper element 4745 is an example of, or includes aspects of, the corresponding element described with reference to FIGS. 46 and 48. Weathercap rail 4750 is an example of, or includes aspects of, the corresponding element described with reference to FIGS. 45, 46, 48, and 49. Wheel 4755 is an example of, or includes aspects of, the corresponding element described with reference to FIGS. 46 and 48. Third gripper assembly 4760 is an example of, or includes aspects of, the corresponding element described with reference to FIGS. 48 and 49.

Figure 48:
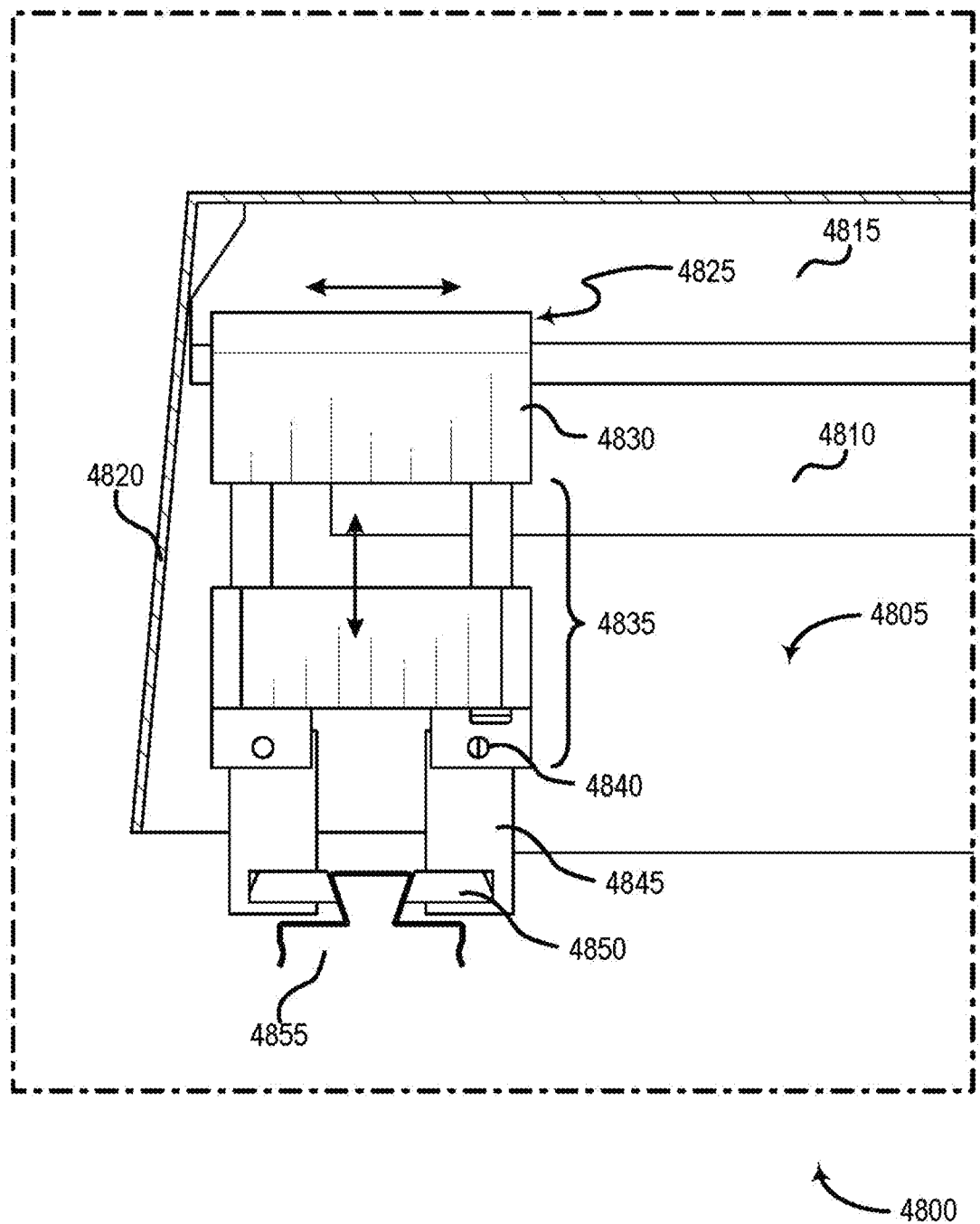

FIG. 48 shows an example of a solar panel cleaning system 4800 according to aspects of the present disclosure. Solar panel cleaning system 4800 is an example of, or includes aspects of, the corresponding element described with reference to FIGS. 45-47, and 49. In one aspect, solar panel cleaning system 4800 includes cleaning apparatus 4805, fluid tank 4810, rail 4815, cover 4820, third gripper assembly 4825, and weathercap rail 4855.

Cleaning apparatus 4805 is an example of, or includes aspects of, the corresponding element described with reference to FIGS. 45-47. Fluid tank 4810 is an example of, or includes aspects of, the corresponding element described with reference to FIGS. 45-47. Rail 4815 is an example of, or includes aspects of, the corresponding element described with reference to FIG. 47. over 4820 is an example of, or includes aspects of, the corresponding element described with reference to FIGS. 45 and 46. Third gripper assembly 4825 is an example of, or includes aspects of, the corresponding element described with reference to FIGS. 47 and 49. In one aspect, third gripper assembly 4825 includes gripper base 4830, actuator 4835, pin 4840, gripper element 4845, and wheel 4850. Gripper base 4830 is an example of, or includes aspects of, the corresponding element described with reference to FIGS. 46 and 47. Actuator 4835 is an example of, or includes aspects of, the corresponding element described with reference to FIG. 47. Gripper element 4845 is an example of, or includes aspects of, the corresponding element described with reference to FIGS. 46 and 47. Wheel 4850 is an example of, or includes aspects of, the corresponding element described with reference to FIGS. 46 and 47. Weathercap rail 4855 is an example of, or includes aspects of, the corresponding element described with reference to FIGS. 45-47, and 49.

FIGS. 45-48 illustrate one or more aspects of described solar panel cleaning systems 4800 (e.g., where solar panel modules are omitted for clarity). In some examples, solar panel cleaning systems 4800 may removably and movably couple to a plurality of parallel weathercaps of a solar panel mounting system. Each weathercap (e.g., each weathercap rail 4855) may include an upper rail 4815 profile that is configured for allowing the cleaning system to move along the rail 4815 (e.g., longitudinally). Each weathercap also may provide for removable detaching of the cleaning system from the rail 4815. The cleaning system/rail 4815 interaction is described in more detail below.

In some aspects, the cleaning system may be illustrated and described as spanning over two solar panel module widths when in the cleaning position. Generally, the system may be expanded to span over more than two modules by analogy, without departing from the scope of the present disclosure. A cleaning system in the example of FIGS. 45-48 may be coupled to the outer weathercaps when in the cleaning position, and the cleaning system may span over the middle weathercap without coupling to it when in the cleaning position. The middle weathercap may be utilized as a temporary support when the cleaning system moves transversely to position over the next set of solar panel modules to be cleaned. In the present example, the two modes of locomotion of the cleaning system (longitudinal and transverse) may be distinct (e.g., may not overlap).

The chassis comprises the plurality of gripper assemblies, the rods, and the rails 4815. The example of FIGS. 45-48 may include four gripper assemblies, two coupled to each of the outer weathercaps when in the cleaning position. Each gripper assembly may be supported by, and may be movably coupled to, the weathercap (e.g., where each gripper assembly may extend upwards from the weathercap). Each pair of gripper assemblies aligned across the panel widths (e.g., a first gripper assembly and a second gripper assembly as shown in FIG. 46) is connected by a horizonal rail 4815 and a horizontal rod that is substantially parallel to the rod. Each gripper assembly may be slidably coupled to the corresponding rod and rail 4815 for transverse motion of the gripper assembly with respect to the rod and rail 4815.

The cover 4820 is coupled to and supported by the chassis via the rails 4815 (e.g., as shown in FIG. 47). The cover 4820 comprises a general box shape that encloses the chassis on the sides and on the top, but is open on the bottom, whereby the cleaning apparatus 4805 mounted to the chassis located inside the cover 4820 provides cleaning to the solar panel modules below via the bottom opening. A fluid tank 4810 configured to hold fluid for cleaning and fluidly coupled to the cleaning apparatus 4805 may be coupled to the cover 4820 in the present example. The fluid tank 4810 and the cleaning apparatus 4805 are shown in schematic form for illustrative purposes. However, many types of suitable cleaning apparatus 4805 mechanisms may be implemented by analogy, without departing from the scope of the present disclosure. In some examples, the fluid tank 4810 may be incorporated into the cleaning apparatus 4805.

Example gripper assemblies are shown in more detail in FIGS. 47 and 48. Each gripper assembly may include an upper gripper base 4830, a lower plurality of gripper elements 4845, and an actuator 4835 connecting the gripper base 4830 and the plurality of gripper elements 4845. At least one gripper element 4845 may be pivotally coupled to a lower end of the actuator 4835 (e.g., as shown in FIG. 48). The pivotal coupling shown in FIG. 48 is a pin 4840 connection, but any connection suitable for pivoting the gripper element 4845 away from the weathercap rail 4855 profile may be implemented.

A horizontal wheel 4850 is coupled to a lower end of each gripper element 4845 such that the wheel 4850 rotates about a generally vertical axis. An angled profile of the wheel 4850 may match with, and engage with, the rail 4815 profile of the weathercap (e.g., as shown in FIG. 48). The profile of the wheels 4850/weathercap rail 4855 is such that the gripper element 4845 is supported on the weathercap rail 4855 while still able to move along the rail 4815 when the wheels 4850 are rotated by at least one motor. In the embodiment shown, each gripper assembly includes three gripper-wheel 4850 assemblies. The wheels 4850 mechanically engage the weathercap rail 4855 profile such that the cleaning system can generate adequate downforce for mechanical cleaning action (e.g. utilizing rotating brush(es) and squeegee) to effectively clean the surface of the solar panel module.

Each gripper assembly may include a motor coupled to the gripper base 4830 and the rod. The motor is configured to move the gripper assembly along the rod (transversely). The motor is coupled to one or more batteries for providing power to the motor. The actuator 4835 is configured to move the gripper/wheel 4850 assemblies between the lower position shown in FIGS. 46-48 and an upper position such that the gripper-wheel 4850 assembly clears the weathercap rails 4855 so that the gripper assembly can be moved from one rail 4815 to another parallel rail 4815.

While the wheels 4850 are shown engaging with the weathercap rail 4855 profile, it should be understood that other engagement profiles shown and described herein may be utilized as rail 4815 profiles for attachment and movement of the cleaning system. For example, the second profile of the toolless panel system described herein may be modified to accommodate a cleaning system attachment.

Figure 49:
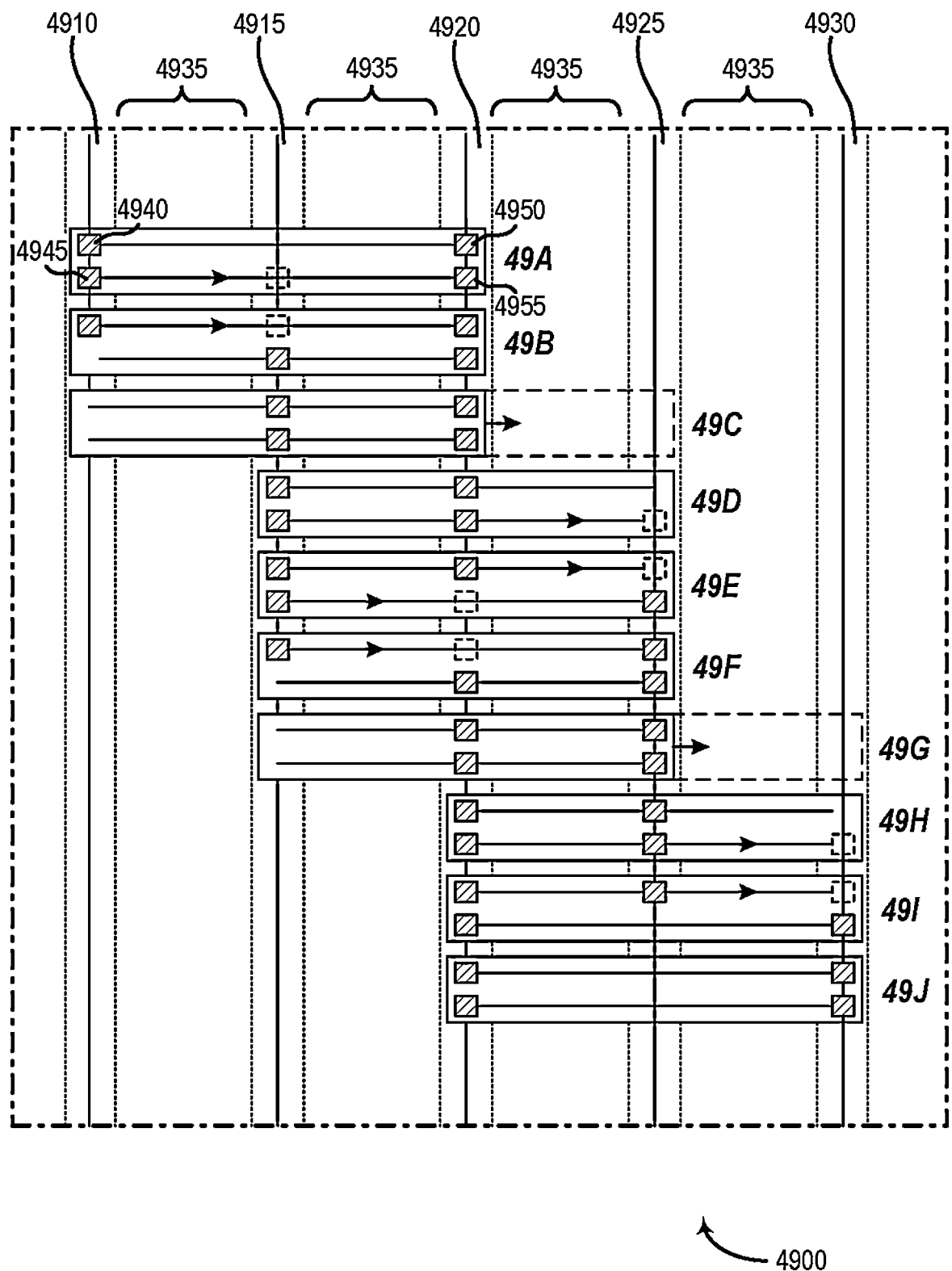

FIG. 49 shows an example of a solar panel cleaning system 4900 according to aspects of the present disclosure.

FIG. 49 shows an example solar panel cleaning diagram illustrating one or more aspects of solar panel cleaning systems 4900 and techniques described herein. For instance, FIG. 49 illustrates aspects of transverse solar panel cleaning movement utilizing solar panel cleaning system 4900 examples described with reference to FIGS. 45-48. Solar panel cleaning system 4900 is an example of, or includes aspects of, the corresponding element described with reference to FIGS. 45-48. In one aspect, solar panel cleaning system 4900 includes weathercap rail 4905, solar panel row 4935, first gripper assembly 4940, second gripper assembly 4945, third gripper assembly 4950, and fourth gripper assembly 4955.

Weathercap rail 4905 is an example of, or includes aspects of, the corresponding element described with reference to FIGS. 45-48. In one aspect, weathercap rail 4905 includes first weathercap rail 4910, second weathercap rail 4915, third weathercap rail 4920, fourth weathercap rail 4925, and fifth weathercap rail 4930. Solar panel row 4935 is an example of, or includes aspects of, the corresponding element described with reference to FIG. 45. First gripper assembly 4940 is an example of, or includes aspects of, the corresponding element described with reference to FIGS. 46 and 47. Second gripper assembly 4945 is an example of, or includes aspects of, the corresponding element described with reference to FIG. 46. Third gripper assembly 4950 is an example of, or includes aspects of, the corresponding element described with reference to FIGS. 47 and 48.

In some aspects, FIG. 49 shows a method for moving the solar panel cleaning system 4900 from a first cleaning position (e.g., where the solar panel cleaning system 4900 spans a first set of solar panel rows 4935), to a second cleaning position (e.g., where the solar panel spans an adjacent set of solar panel rows 4935).

In the initial state (e.g., in the first cleaning position), the solar panel cleaning system 4900 is in a position for cleaning the first set of two adjacent solar panel rows 4935. First gripper assembly 4940 and second gripper assembly 4945 are coupled to first weathercap rail 4910. Third gripper assembly 4950 and fourth gripper assembly 4955 are coupled to third weathercap rail 4920.

Initially, the cleaning apparatus may be in a first position. In step 49A, second gripper assembly 4945 is uncoupled from first weathercap rail 4910, moved to the right, and coupled to second weathercap rail 4915.

In step 49B, first gripper assembly 4940 is uncoupled from first weathercap rail 4910, moved to the right, and coupled to second weathercap rail 4915.

In step 49C, the cover/carriage assembly is moved from the initial position of spanning over second weathercap rail 4915 to the position of spanning over third weathercap rail 4920 (e.g., generally positioned between second weathercap rail 4915 and fourth weathercap rail 4925).

In step 49D, fourth gripper assembly 4955 is uncoupled from third weathercap rail 4920, moved to the right, and coupled to fourth weathercap rail 4925.

In step 49E, second gripper assembly 4945 is uncoupled from second weathercap rail 4915, moved to the right, and coupled to third weathercap rail 4920. Also, third gripper assembly 4950 is uncoupled from third weathercap rail 4920, moved to the right, and coupled to fourth weathercap rail 4925.

In step 49F, first gripper assembly 4940 is uncoupled from second weathercap rail 4915, moved to the right, and coupled to third weathercap rail 4920.

In step 49G, the cover/carriage assembly is moved from the position of spanning over third weathercap rail 4920 to the position of spanning over fourth weathercap rail 4925 (i.e. generally positioned between weathercaps 3 and 5).

In step 49H, fourth gripper assembly 4955 is uncoupled from fourth weathercap rail 4925, moved to the right, and coupled to fifth weathercap rail 4930.

In step 49I, third gripper assembly 4950 is uncoupled from fourth weathercap rail 4925, moved to the right, and coupled to fifth weathercap rail 4930. The final second cleaning position is shown in step 49J, with the solar panel cleaning system 4900 in the second cleaning position for cleaning the second set of two adjacent solar panel rows 4935 (e.g., a cleaning apparatus may move from a first position to a second position via steps 49A through 49J, as described in more detail herein). First gripper assembly 4940 and second gripper assembly 4945 are coupled to third weathercap rail 4920. Third gripper assembly 4950 and fourth gripper assembly 4955 are coupled to fifth weathercap rail 4930.

Methods and systems for cleaning solar panels of a solar panel system installed on an exterior surface are described. One or more aspects of the method include attaching a solar panel cleaning system 4900 to the solar panel system, wherein the solar panel cleaning system 4900 comprises a cleaning apparatus, wherein the solar panel system includes a plurality of parallel weathercap rails 4905, wherein the parallel rails alternate with rows of solar panels, wherein the attaching is a movable attachment whereby the solar panel cleaning system 4900 is configured for movement along the direction of the rails; moving of the solar panel cleaning system 4900 along the direction of the rails, whereby the cleaning apparatus is moved over the solar panels in one row; and activating the cleaning apparatus, whereby the solar panels in the one row are cleaned.

Figure 50:
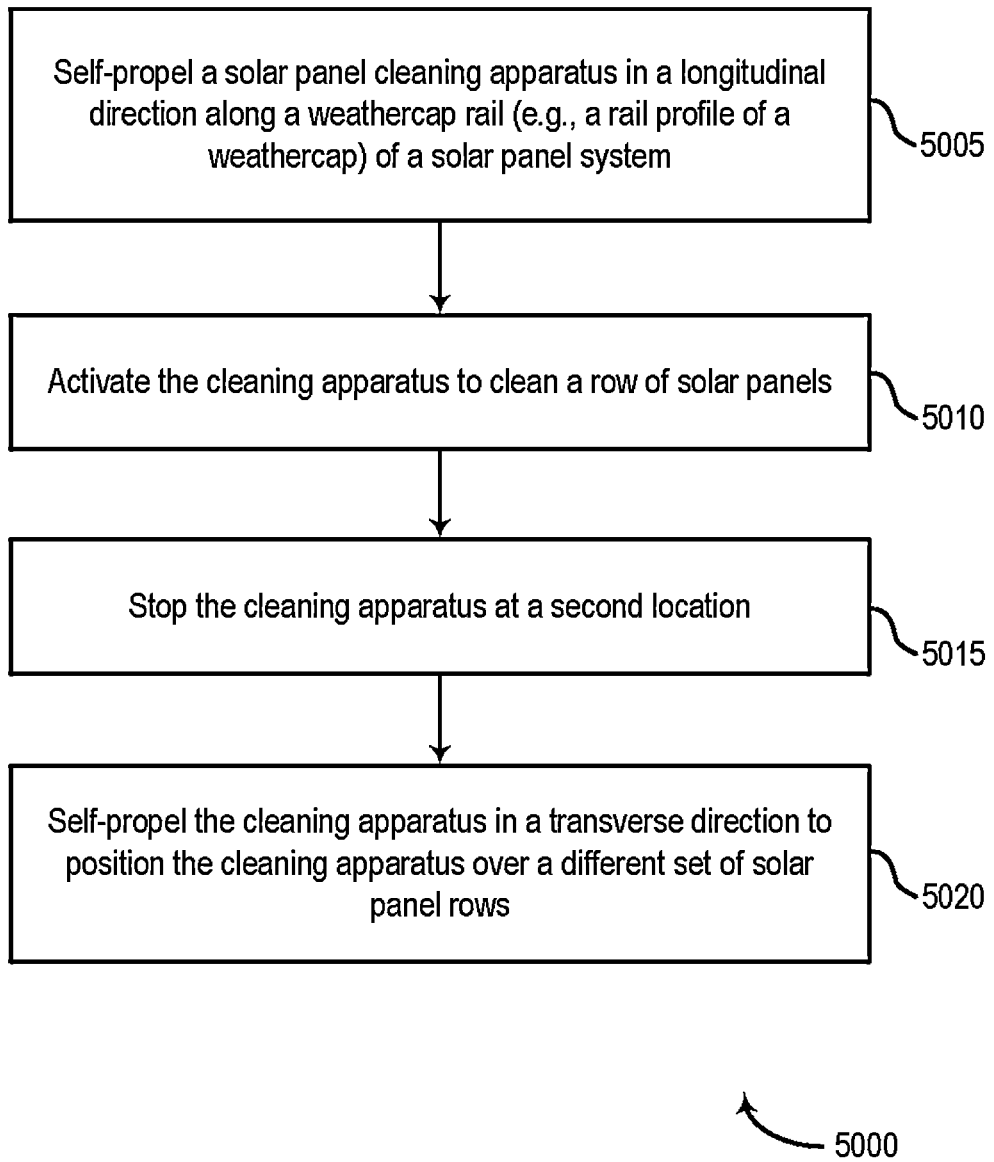
FIG. 50 shows an example of a method for cleaning solar panels of a solar panel system installed on an exterior surface according to aspects of the present disclosure.

FIG. 50 shows an example of a method 5000 for solar energy systems according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some cases, initially, the solar panel cleaning system is installed above two rows of solar panel modules. For instance, the solar panel cleaning system shown in FIGS. 45-48 may be installed over a first set of two adjacent solar panel rows 4935.

At operation 5005, the solar panel cleaning system 4900 is self-propelled in the longitudinal direction. In the embodiment shown, the self-propelling is effected by a motor coupled to the plurality of wheels engaged with a weathercap rail 4905 (e.g., the rail profile of the weathercap). In some aspects, all wheels may be configured for moveable coupling along the rails, however, not all wheels may be powered (e.g., some wheels may be powered, while others may movably guide the solar panel cleaning system along the weathercap rails).

At operation 5010 (e.g., during the period while the cleaning system is moving from a first location to a second location, although not necessarily while the cleaning system is in motion), the cleaning apparatus may be activated to clean the solar panel module. In some examples, the activation at operation 5010 may be a manual activation (e.g., via user interaction), an automatic activation (e.g., based on a timer or other sensors for triggering activation), etc.

At operation 5015, the solar panel cleaning system may stop at a second location.

At operation 5020, the solar panel cleaning system is self-propelled transversely such that the solar panel cleaning system is positioned over a different set of solar panel rows. For instance, after the longitudinal moving period (e.g., after one or more solar panel rows 4935 are cleaned), self-propelled moving of the solar panel cleaning portion (e.g., transversely) may position the solar panel cleaning system over a different set of solar panel rows for cleaning. In some examples, the transverse movement may be effected by at least one motor for coupling/uncoupling of the gripper assemblies, moving of the gripper assemblies laterally, and moving of the cover/carriage laterally.

In some cases, the operations 5005 through 5020 may refer to, or may be performed by, a solar panel cleaning system (e.g., a cleaning apparatus) as described with reference to FIGS. 45-49.

Referring again to FIGS. 45-50, during cleaning operations, the cover may function to reduce (e.g., contain) the splatter and spray coming from the operation of the cleaning apparatus. In some examples, the cleaning operation includes coordinated operation of a rotating brush or brushes and squeegee of the cleaning system, the fluid tank, and at least one spray nozzle of the cleaning apparatus. The rotating brushes may be actuated mechanically by either the engagement of the wheels turning against the rail profile or by a separate electric motor and could be optionally supplied by a hose for rinse water.

Efficient and effective cleaning of solar panel modules may include a wet process and mechanical action (e.g., such as a brush, a rotating brush, etc.). By providing a continuous rail (e.g., weathercap rails 4905) between solar panel rows 4935, the weathercap rail 4905 design may be configured to accommodate solar panel cleaning apparatuses specifically designed for that purpose (e.g., such as the solar panel cleaning systems 4900 described herein). In some cases, the weathercap rail 4905 design can be modified for various types of cleaning system, such as friction-fit, roller-actuated brushes (e.g., for manual operation of rotary brushes hooked up to a garden-type hose for use on small residential arrays), robotic cleaners (e.g., with electric motors position sensors and sophisticated automation for commercial installations), etc.

In some aspects, such an ability to self-clean may be useful for solar carports where the top of the carport may be viewed from an adjacent building or the ground. For instance, solar arrays collect dust and often appear dirty after a short time. Conventionally, cleaning operations are difficult, dangerous, manual affairs which include the use of long handled pool brushes and squeegees and power washers with workers operating from up-and-over type aerial lifts. During the operation, cleaning water flows right through the system onto the cars below or on to the pavement creating a mess and causing extensive disruption to the parking activity. Alternatively, in some cases, a subsequent weather event (e.g., rain) may adversely carry water, dirt, debris, etc. that has accumulated on solar panel systems soiling onto vehicles underneath a carport solar system (e.g., in cases where the solar system is not efficiently cleaned). Additionally, such rain events may not fully clean the solar panels which leads to production losses due to the stuck-on soiling. Pollen, bird droppings, dust, etc. can create aesthetic nuisances as well as lost electrical production.

With the solar panel cleaning systems 4900 described herein, cleaning can happen anytime and often, rain or shine, keeping the solar generator in top appearance without impacting parking access or quality, and gray water can be diverted to catchments for appropriate watering applications or other reuse, resulting from cleaning water recycling and rainwater capture.

In some embodiments, the solar panel cleaning system 4900 may be installed on non-roof applications described herein (e.g., vertical solar panel installation system embodiments). For such applications (e.g., panel cleaning systems on a curtainwall), the solar panel cleaning system 4900 may be modified to include a cogged/geared/textured engagement at the drive rollers and a rail connection may be implemented.

Figure 51:
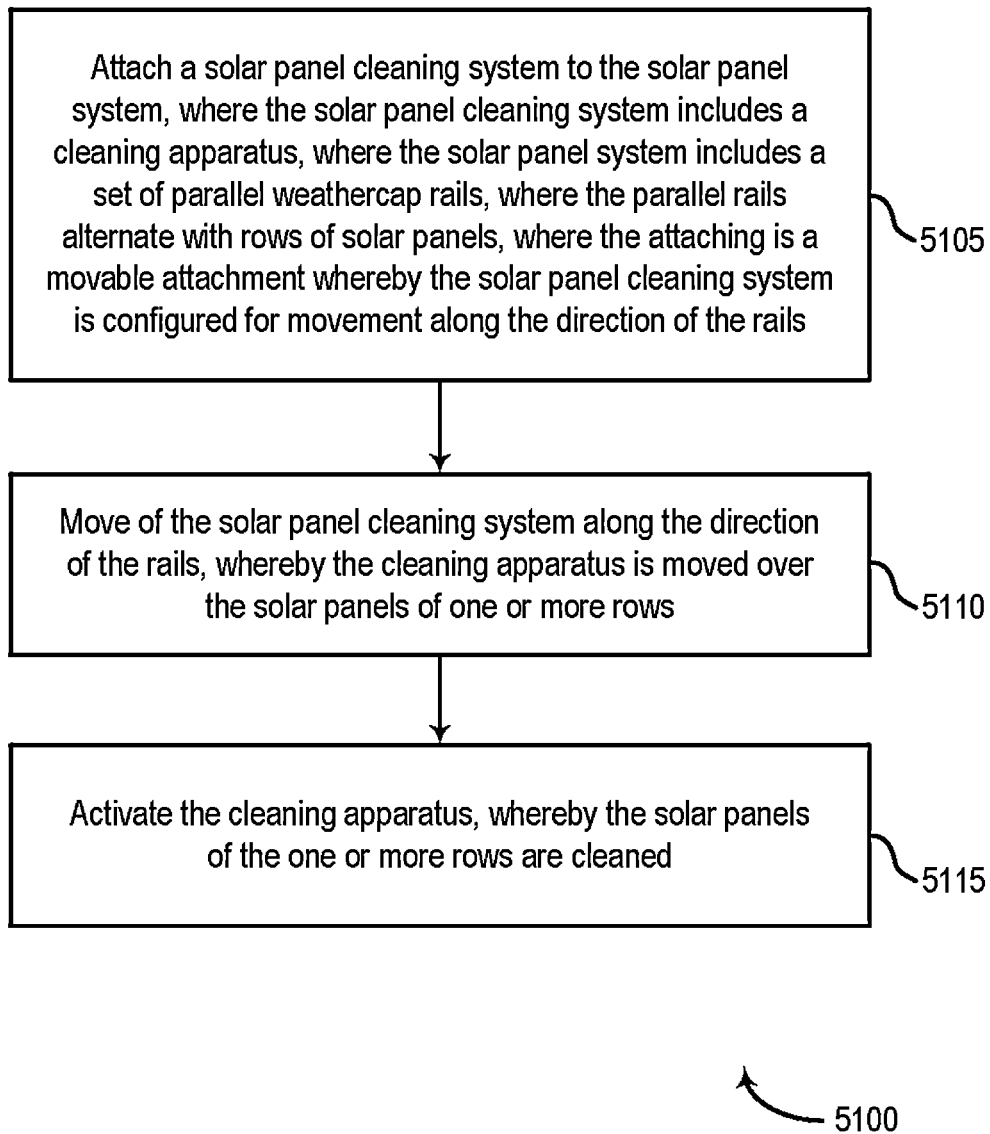
FIG. 51 shows an example of a method for cleaning solar panels of a solar panel system installed on an exterior surface according to aspects of the present disclosure.

FIG. 51 shows an example of a method 5100 for solar energy systems according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 5105, the system attaches a solar panel cleaning system to the solar panel system, where the solar panel cleaning system includes a cleaning apparatus, where the solar panel system includes a set of parallel weathercap rails, where the parallel rails alternate with rows of solar panels, where the attaching is a movable attachment whereby the solar panel cleaning system is configured for movement along the direction of the rails. In some cases, the operations of this step refer to, or may be performed by, a solar panel cleaning system as described with reference to FIGS. 45-49. In some cases, the operations of this step refer to, or may be performed by, a cleaning apparatus as described with reference to FIGS. 45-48.

At operation 5110, the system moves of the solar panel cleaning system along the direction of the rails, whereby the cleaning apparatus is moved over the solar panels in one row. In some cases, the operations of this step refer to, or may be performed by, a solar panel cleaning system as described with reference to FIGS. 45-49. In some cases, the operations of this step refer to, or may be performed by, a cleaning apparatus as described with reference to FIGS. 45-48.

At operation 5115, the system activates the cleaning apparatus, whereby the solar panels in the one row are cleaned. In some cases, the operations of this step refer to, or may be performed by, a solar panel cleaning system as described with reference to FIGS. 45-49. In some cases, the operations of this step refer to, or may be performed by, a cleaning apparatus as described with reference to FIGS. 45-48.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While all of the fundamental characteristics and features of the combined metal roof panel and solar panel mounting components of the device herein enabling the method herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for solar panel installation, comprising:
an integral left panel configured for coupling onto a substantially planar surface and including a left panel first end, a left panel second end opposite to the left panel first end, and a left panel middle portion connecting the left panel first end and the left panel second end, the left panel first end comprising a first profile comprising a vertically symmetric shape and the left panel second end comprising a second profile comprising a vertically symmetric shape comprising a left engagement contour on a left side of the shape and a right engagement contour on a right side of the shape, wherein the first profile is different from the second profile;
an integral right panel configured for coupling onto the substantially planar surface and including a right panel first end, a right panel second end opposite to the right panel first end, and a right panel middle portion connecting the right panel first end and the second panel second end, the right panel first end comprising the first profile and the right panel second end comprising the second profile;
wherein the left panel second end and the right panel first end are configured for the second profile of the left panel second end to snap-lock over the first profile of the right panel first end to form a continuous panel joint projecting outward from the substantially planar surface, wherein the left engagement contour is configured to interlock with a contoured end of a frame of a left solar panel module spanning over at least a portion of the left panel and the right engagement contour is configured to interlock with a contoured end of a frame of a right solar panel module spanning over at least a portion of the right panel.

2. The system for solar panel installation of claim 1, wherein the left panel second end and the right panel first end each include a support shelf located below the respective engagement contour and configured to support a lower edge of the corresponding frame when that solar panel module is spanning over the respective panel.

3. The system for solar panel installation of claim 1, wherein the left panel middle portion and the right panel middle portion each include at least one secondary support member configured to support the corresponding solar panel module spanning over that panel.

4. The system for solar panel installation of claim 1, wherein the first profile includes a first bulb shape and the second profile includes a second bulb shape, wherein the forming of the a continuous panel joint further comprises the second bulb shape snap-locking over the first bulb shape.

5. The system for solar panel installation of claim 1, wherein each contoured end of the respective frame comprises a convex surface, and wherein each engagement contour comprises a concave surface.

6. The system for solar panel installation of claim 1, wherein each contoured end of the respective frame comprises a concave surface, and wherein each engagement contour comprises a convex surface.

7. The system for solar panel installation of claim 1, wherein each engagement contour includes a plurality of notches in a surface of the respective engagement contour, and each contoured end of each frame includes a plurality of bumps in a surface of the corresponding contoured end, wherein the plurality of bumps and the plurality of notches are configured such that at least one bump of the plurality of bumps is received by at least one notch of the plurality of notches when each engagement contour is interlocked with the each contoured end of the corresponding frame and forms an engagement separate from the interlock of each engagement contour with the contoured edge of the corresponding frame.

8. The system for solar panel installation of claim 1, wherein the substantially planar surface is an exterior surface of a structure.

9. The system for solar panel installation of claim 8, where the left panel and the right panel are roofing panels.

10. The system for solar panel installation of claim 8, where the left panel and the right panel are cladding panels.

11. A method for solar panel installation, comprising;
coupling an integral left panel to a substantially planar surface, the left panel including a left panel first end, a left panel second end opposite to the left panel first end, and a left panel middle portion connecting the left panel first end and the left panel second end, the left panel first end comprising a first profile comprising a vertically symmetric shape and the left panel second end comprising a second profile comprising a vertically symmetric shape comprising a left engagement contour on a left side of the shape and a right engagement contour on a right side of the shape, wherein the first profile is different from the second profile;

coupling an integral right panel to the substantially planar surface, the right panel including a right panel first end, a right panel second end opposite to the right panel first end, and a right panel middle portion connecting the right panel first end and the second panel second end, the right panel first end comprising the first profile and the right panel second end comprising the second profile;

snap-locking the second profile of the left panel second end shape over the first profile of the right panel first end to form a continuous panel joint projecting outward from the substantially planar surface;

interlocking a contoured edge of a frame of a left solar panel module with the left engagement contour such that the contoured edge of the frame of the left solar panel is coupled to the left engagement contour and the left solar panel module is spanning over at least a portion of the left panel; and interlocking a contoured edge of a frame of a right solar panel module with the right engagement contour such that the contoured edge of the frame of the right solar panel is coupled to the right engagement contour and the right solar panel module is spanning over at least a portion of the right panel.

12. The method for solar panel installation of claim 11, wherein the left panel middle portion and the right panel middle portion each include at least one secondary support member configured to support the corresponding solar panel module spanning over the respective panel, further including the step of supporting of the corresponding solar panel module by the at least one secondary support member in response to interlocking the corresponding contoured edge of each frame.

13. The method for solar panel installation of claim 11, wherein the first profile includes a first bulb shape and the second profile includes a second bulb shape, wherein the forming of the continuous panel joint further comprises the second bulb shape snap-locking over the first bulb shape.

14. The method for solar panel installation of claim 11, wherein each contoured end of the respective frame comprises a convex surface, and wherein each engagement contour comprises a concave surface.

15. The method for solar panel installation of claim 11, wherein each contoured end of the respective frame comprises a concave surface, and wherein each engagement contour comprises a convex surface.

16. The method for solar panel installation of claim 11, wherein each engagement contour includes a plurality of notches in a surface of the respective engagement contour, and each contoured end of the frame includes a plurality of bumps in a surface of the corresponding contoured end, the method further comprising the step of at least one bump of the plurality of bumps being received by at least one notch of the plurality of notches when each engagement contour is interlocked with each contoured end of the corresponding frame, whereby an engagement is formed that is separate from the interlock of each engagement contour with the contoured edge of the corresponding frame.

17. The method for solar panel installation of claim 11, wherein the substantially planar surface is an exterior surface of a structure.

18. The method for solar panel installation of claim 11, wherein the left panel and the right panel are roofing panels.

19. The method for solar panel installation of claim 11, wherein the left panel and the right panel are cladding panels.

20. The method for solar panel installation of claim 11, wherein the left panel second end and the right panel first end each include a support shelf located below the respective engagement contour and configured to support a lower edge of the corresponding frame, further including the step of supporting the lower edge of the corresponding frame on the corresponding support shelf in response to interlocking the corresponding contoured edge of the corresponding frame.

* * * * *